US007282529B2

(12) United States Patent
Tamoto et al.

(10) Patent No.: US 7,282,529 B2
(45) Date of Patent: Oct. 16, 2007

(54) COATING LIQUID FOR AN ELECTROGRAPHIC PHOTORECEPTOR AND A METHOD OF PREPARATION USING A BALL MILL

(75) Inventors: Nozomu Tamoto, Shizuoka-ken (JP); Tetsuro Suzuki, Shizuoka-ken (JP); Hiroshi Tamura, Shizuoka-ken (JP); Tatsuya Niimi, Shizuoka-ken (JP); Akihiko Matsuyama, Kanagawa-ken (JP); Eiji Kurimoto, Shizuoka-ken (JP); Hidetoshi Kami, Shizuoka-ken (JP)

(73) Assignee: Ricoh Company Limited, Tokyo (JP)

( * ) Notice: Subject to any disclaimer, the term of this patent is extended or adjusted under 35 U.S.C. 154(b) by 370 days.

(21) Appl. No.: 10/625,570

(22) Filed: Jul. 24, 2003

(65) Prior Publication Data

US 2005/0100804 A1 May 12, 2005

Related U.S. Application Data

(62) Division of application No. 09/985,347, filed on Nov. 2, 2001, now Pat. No. 6,790,572.

(30) Foreign Application Priority Data

| | | | |
|---|---|---|---|
| Nov. 8, 2000 | (JP) | ............................. | 2000-340884 |
| Nov. 10, 2000 | (JP) | ............................. | 2000-342902 |
| Aug. 27, 2001 | (JP) | ............................. | 2001-255906 |
| Oct. 10, 2001 | (JP) | ............................. | 2001-312206 |

(51) Int. Cl.
*C08K 5/09* (2006.01)

(52) U.S. Cl. ...................... 524/300; 524/322; 524/430; 524/439

(58) Field of Classification Search ................ 524/300, 524/322, 430, 439
See application file for complete search history.

(56) References Cited

U.S. PATENT DOCUMENTS

| | | | | |
|---|---|---|---|---|
| 3,736,134 | A | | 5/1973 | Gosselink et al. |
| 4,559,288 | A | * | 12/1985 | Nakao et al. ................. 430/60 |
| 4,663,259 | A | | 5/1987 | Fujimura et al. |
| 4,740,441 | A | | 4/1988 | Otomura |
| 4,766,048 | A | | 8/1988 | Hisamua |
| 4,820,620 | A | | 4/1989 | Carolla |
| 4,942,104 | A | | 7/1990 | Kitajima et al. |
| 5,008,172 | A | | 4/1991 | Rokutanzono et al. |
| 5,008,706 | A | | 4/1991 | Ohmori et al. |
| 5,028,502 | A | | 7/1991 | Yuh et al. |
| 5,100,453 | A | | 3/1992 | Richards |
| 5,105,222 | A | * | 4/1992 | Ohta et al. .................. 399/159 |
| 5,215,843 | A | * | 6/1993 | Aizawa ....................... 430/65 |
| 5,312,709 | A | * | 5/1994 | Kadokura et al. ............ 430/62 |
| 5,339,138 | A | | 8/1994 | Mishima et al. |
| 5,363,176 | A | | 11/1994 | Ishihara et al. |
| 5,411,827 | A | | 5/1995 | Tamura et al. |
| 5,496,671 | A | | 3/1996 | Tamura et al. |
| 5,547,790 | A | | 8/1996 | Umeda et al. |
| 5,578,405 | A | | 11/1996 | Ikegami et al. |
| 5,677,094 | A | | 10/1997 | Umeda et al. |
| 5,679,488 | A | | 10/1997 | Itami et al. |
| 5,702,855 | A | | 12/1997 | Ikegami et al. |
| 5,723,243 | A | | 3/1998 | Sasaki et al. |
| 5,747,204 | A | | 5/1998 | Anzai et al. |
| 5,789,128 | A | | 8/1998 | Adachi et al. |
| 5,804,343 | A | | 9/1998 | Umeda et al. |
| 5,834,145 | A | | 11/1998 | Yoshinaga et al. |
| 5,840,454 | A | | 11/1998 | Nagai et al. |
| 5,846,680 | A | | 12/1998 | Adachi et al. |
| 5,853,935 | A | | 12/1998 | Suzuki et al. |
| 5,871,876 | A | | 2/1999 | Ikuno et al. |
| 5,910,561 | A | | 6/1999 | Adachi et al. |
| 5,928,828 | A | | 7/1999 | Suzuki |
| 5,932,381 | A | | 8/1999 | Akao et al. |
| 5,942,363 | A | | 8/1999 | Tanaka et al. |
| 5,948,579 | A | | 9/1999 | Mashimo et al. |
| 5,976,746 | A | | 11/1999 | Tamaka et al. |

(Continued)

FOREIGN PATENT DOCUMENTS

EP 0 655 654 5/1995

(Continued)

OTHER PUBLICATIONS

JPO machine translation for JP 2000-019764.*

(Continued)

*Primary Examiner*—Edward J. Cain
(74) *Attorney, Agent, or Firm*—Oblon, Spivak, McCelland, Maier & Neustadt, P.C.

(57) ABSTRACT

An electrophotographic photoreceptor including an electroconductive substrate, a photosensitive layer located overlying the electroconductive substrate, and optionally a protective layer overlying the photosensitive layer, wherein an outermost layer of the photoreceptor includes a filler, a binder resin and an organic compound having an acid value of from 10 to 700 mgKOH/g. The photosensitive layer can be the outermost layer. A coating liquid for an outermost layer of a photoreceptor including a filler, a binder resin, an organic compound having an acid value of from 10 to 700 mgKOH/g and plural organic solvents. A method for preparing a photoreceptor including forming a photosensitive layer, and coating the coating liquid on the photosensitive layer. An image forming method and apparatus and a process cartridge using the photoreceptor are also provided.

11 Claims, 7 Drawing Sheets

U.S. PATENT DOCUMENTS

| | | | | |
|---|---|---|---|---|
| 5,999,773 | A | 12/1999 | Yasutomi et al. | |
| 6,026,262 | A | 2/2000 | Kinoshita et al. | |
| 6,027,846 | A | 2/2000 | Shimada et al. | |
| 6,030,733 | A | 2/2000 | Kami et al. | |
| 6,030,736 | A | 2/2000 | Ikegami et al. | |
| 6,045,959 | A | 4/2000 | Katayama et al. | |
| 6,066,428 | A | 5/2000 | Katayama et al. | |
| 6,069,224 | A | 5/2000 | Adachi et al. | |
| 6,077,635 | A | 6/2000 | Okado et al. | |
| 6,087,055 | A | 7/2000 | Niimi | |
| 6,093,784 | A | 7/2000 | Tamura et al. | |
| 6,118,964 | A | 9/2000 | Kojima et al. | |
| 6,132,911 | A | 10/2000 | Niimi | |
| 6,136,483 | A | 10/2000 | Suzuki et al. | |
| 6,187,492 | B1 | 2/2001 | Ri et al. | |
| 6,187,494 | B1 | 2/2001 | Kawamura et al. | |
| 6,191,249 | B1 | 2/2001 | Tanaka et al. | |
| 6,210,848 | B1 | 4/2001 | Nagai et al. | |
| 6,218,533 | B1 | 4/2001 | Niimi | |
| 6,243,552 | B1 | 6/2001 | Murata | |
| 6,249,304 | B1 | 6/2001 | Sawayama et al. | |
| 6,300,027 | B1 | 10/2001 | Chambers et al. | |
| 6,319,878 | B1 | 11/2001 | Ina et al. | |
| 6,322,940 | B1 | 11/2001 | Nishigaki et al. | |
| 6,326,112 | B1 | 12/2001 | Tamura et al. | |
| 6,329,020 | B1 * | 12/2001 | Patzschke et al. | 427/407.1 |
| 6,366,751 | B1 | 4/2002 | Shakuto et al. | |
| 6,406,826 | B1 | 6/2002 | Suzuki et al. | |
| 6,432,596 | B2 | 8/2002 | Ikuno et al. | |
| 6,444,387 | B2 | 9/2002 | Ri et al. | |
| 6,468,706 | B2 | 10/2002 | Matsuda et al. | |
| 6,492,081 | B2 | 12/2002 | Morikawa et al. | |
| 6,858,362 | B2 * | 2/2005 | Tamoto et al. | 430/59.6 |
| 2002/0011177 | A1 | 1/2002 | Yamamori et al. | |
| 2002/0048711 | A1 | 4/2002 | Ito et al. | |
| 2004/0180280 | A1 * | 9/2004 | Ikegami et al. | 430/73 |
| 2004/0197688 | A1 * | 10/2004 | Tamoto et al. | 430/66 |

FOREIGN PATENT DOCUMENTS

| | | | | |
|---|---|---|---|---|
| JP | 43-16198 | | | 7/1968 |
| JP | 44-834 | | | 1/1969 |
| JP | 49-10258 | | | 3/1974 |
| JP | 53-13344 | | | 11/1978 |
| JP | 55-157747 | | | 12/1980 |
| JP | 56083743 | A | * | 7/1981 |
| JP | 57-30846 | | | 2/1982 |
| JP | 57154246 | A | * | 9/1982 |
| JP | 57157253 | A | * | 9/1982 |
| JP | 2-4275 | | | 1/1990 |
| JP | 04240656 | A | | 8/1992 |
| JP | 4-281461 | | | 10/1992 |
| JP | 4-295855 | | | 10/1992 |
| JP | 8-292585 | | | 11/1996 |
| JP | 9-281718 | | | 10/1997 |
| JP | 2000019764 | A | * | 1/2000 |
| JP | 2000-66434 | | | 3/2000 |
| JP | 2000352832 | A | | 12/2000 |

OTHER PUBLICATIONS

DERWENT abstract for JP 04318855.*
Derwent Abstracts, AN 1992-336267, JP 04-240656, Aug. 27, 1992.
U.S. Appl. No. 11/480,517, filed Jul. 5, 2006, Yanagawa et al.
U.S. Appl. No. 10/625,570, filed Jul. 24, 2003, Tamoto et al.
U.S. Appl. No. 11/317,048, filed Dec. 27, 2005, Nagai et al.
U.S. Appl. No. 11/245,135, filed Oct. 7, 2005, Nagai et al.
U.S. Appl. No. 11/272,826, filed Nov. 15, 2005, Kawasaki et al.
U.S. Appl. No. 11/172,989, filed Jul. 5, 2005, Li et al.
U.S. Appl. No. 11/217,407, filed Sep. 2, 2005, Toda et al.
U.S. Appl. No. 11/007,784, filed Dec. 9, 2004, Kondo et al.
U.S. Appl. No. 11/030,307, filed Jan. 7, 2005, Kami et al.
U.S. Appl. No. 11/016,708, filed Dec. 21, 2004, Kitajima et al.
U.S. Appl. No. 10/944,003, filed Sep. 20, 2004, Yanagawa et al.
U.S. Appl. No. 10/927,050, filed Aug. 27, 2004, Nimi et al.
U.S. Appl. No. 10/827,376, filed Apr. 20, 2004, Tamoto et al.
U.S. Appl. No. 10/625,408, filed Jul. 23, 2003, Tamoto et al.
U.S. Appl. No. 10/792,607, filed Mar. 4, 2004, Ikegami et al.

* cited by examiner

COATING LIQUID FOR AN ELECTROGRAPHIC PHOTORECEPTOR AND A METHOD OF PREPARATION USING A BALL MILL

This application is a of application Ser. No. 09/985,347 Filed on Nov. 2, 2001 now U.S. Pat. No. 6,790,572.

BACKGROUND OF THE INVENTION

1. Field of the Invention

The present invention relates to an electrophotographic photoreceptor. In addition, the present invention relates to an electrophotographic image forming method and apparatus using the photoreceptor. Further, the present invention relates to a process cartridge for electrophotographic image forming apparatus, which includes the photoreceptor.

2. Discussion of the Background

Recently the growth of information processing system using electrophotography is remarkable. In particular, digital copiers capable of recording digital information using light after converting information to digital signals have been drastically improving in recording qualities and reliability. In addition, the technique has been applied to full color laser printers and copiers by being combined with a high speed recording technique. In the light of this background, a need exists for a photoreceptor which not only produces high quality images but also has high durability.

As the photoreceptor used for such laser printers and digital copiers, photoreceptors using an organic photosensitive material have been widely used because of having advantages such as good productivity and low pollution.

Specific examples of the organic photoreceptors include the photoreceptors including one of the following photosensitive layers:

(1) organic photoconductive resin layers typified by a poly-N-vinylcarbazole resin;

(2) charge transfer complex type photosensitive layers typified by a combination of poly-N-vinylcarbazole (PVK) with 2,4,7-trinitrofluorenon (TNF);

(3) pigment dispersion type photosensitive layers typified by a combination of phthalocyanine and a binder resin; and (4) functionally-separated photosensitive layer typified by a combination of a charge generation material and a charge transport material.

Among these photoreceptors, the functionally-separated photoreceptors attract considerable attention now.

The electrophotographic image forming methods typically include the following processes:

(1) charging an electrophotographic photoreceptor in a dark place (charging process);

(2) irradiating the charged photoreceptor with imagewise light to form an electrostatic latent image thereon (light irradiating process);

(3) developing the latent image with a developer including a toner mainly constituted of a colorant and a binder to form a toner image thereon (developing process);

(4) optionally transferring the toner image onto an intermediate transfer medium (first transfer process);

(5) transferring the toner image onto a receiving material such as a receiving paper ((second) transfer process);

(6) heating the toner image to fix the toner image on the receiving material (fixing process); and (7) cleaning the surface of the photoreceptor (cleaning process).

The mechanism of forming an electrostatic latent image in the functionally-separated photosensitive layer, which has a charge generation layer and a charge transport layer formed on the charge generation layer, is as follows:

(1) when the photosensitive layer is exposed to light after being charged, light passes through the transparent charge transport layer and then reaches the charge generation layer;

(2) the charge generation material included in the charge generation layer absorbs the light and generates a charge carrier such as electrons and positive holes;

(3) the charge carrier is injected into the charge transport layer and transported through the charge transport layer, which is caused by the electric field formed by the charge on the photosensitive layer;

(4) the charge carrier finally reaches the surface of the photosensitive layer and neutralizes the charge thereon, resulting in formation of an electrostatic latent image on the photosensitive layer.

However, photosensitive layers of organic photoreceptors are easily abraded when the photoreceptors are repeatedly used. When a photosensitive layer is largely abraded, various image quality problems such that the potential of the charged photoreceptor decreases; the photosensitivity thereof deteriorates; background fouling occurs in the resultant images; and image density decreases tend to occur. Therefore the abrasion of photoreceptors have been a big problem to be solved.

In addition, currently electrophotographic image forming apparatus become smaller and smaller in size. Therefore the diameter of photoreceptors used for such miniaturized image forming apparatus also becomes smaller and smaller. Accordingly a need exists for a photoreceptor having good durability.

In attempting to impart good durability to an organic photoreceptor, the following methods have been proposed:

(1) a protective layer having lubricating property is formed as an outermost layer of the photoreceptor;

(2) a crosslinked protective layer is formed as an outermost layer of the photoreceptor; and (3) a protective layer including a filler is formed as an outermost layer of the photoreceptor.

In particular, the method (3) is effective. However, when an electrical insulating filler is included in a protective layer, the resistance of the protective layer increase, resulting in increase of residual potential of the resultant photoreceptor. The increase of residual potential is mainly caused by increase of the resistance of the protective layer and increase of the number of charge trap sites therein due to addition of the filler having high insulating property. In contrast, when an electroconductive filler is used, the resistance of the protective layer decreases, and thereby the residual potential of the protective layer hardly increase. However, a problem tends to occur such that the resultant images have unclear outlines, i.e., blurred images are produced.

In attempting to solve such a blurred image problem, a method is proposed in which a photoreceptor having a protective layer including an electroconductive filler is heated by a drum heater to decrease moisture in the photoreceptor. By heating the photoreceptor, the formation of blurred images can be avoided but the diameter of the photoreceptor becomes large because a drum heater has to be provided in the photoreceptor. Therefore, this technique cannot be used for small-size photoreceptors typically provided in current small image forming apparatus. In other words, a photoreceptor having a small-diameter and good durability has not yet been developed. In addition, when a drum heater is provided, the resultant image forming apparatus becomes large in size. Further, the image forming apparatus have other drawbacks such that it is needed for the image forming apparatus to continuously work the heater, resulting in increase of power consumption, and it takes a long warm-up time.

When a photoreceptor has a high residual potential due to use of a filler having high insulating property, the potential of a lighted area of the photoreceptor increases, resulting in deterioration of image density and half toner reproducibility of the resultant images. In order to avoid such problems, the potential of dark areas needs to be increased. However, when the dark-area potential is increased, the electric field strength is increased, and therefore not only undesired images such as background fouling are produced, but also the life of the photoreceptor is shortened.

In attempting to avoid increase of residual potential, methods in which a photoconductive protective layer is formed have been disclosed in Japanese Patent Publications Nos. (hereinafter JPPs) 44-834, 43-16198 and 49-10258. However, imagewise light is absorbed by the protective layer, and therefore the quantity of light which reaches the photosensitive layer decreases, resulting in decrease of the photosensitivity of the photoreceptor. Therefore, this method is of little effect.

Japanese Laid-Open Patent Publication No. (hereinafter JOP) 57-30846 discloses a method in which a metal or a metal oxide having an average particle diameter not greater than 0.3 μm is included as a filler in a protective layer to prepare a transparent protective layer, resulting in prevention of increase of residual potential. However, its effect of preventing increase of residual potential is not insufficient, and therefore the problem cannot be solved.

This is because the increase of residual potential is caused by charge trapping due to the added filler and uneven dispersion of the filler rather than deterioration of charge generation efficiency. Even when a filler having an average particle diameter not greater than 0.3 μm is used, the transparency of the resultant protective layer decreases if the filler aggregates. On the contrary, when a filler having an average particle diameter not less than 0.3 μm is used, a transparent protective layer can be formed if the filler is uniformly dispersed.

In addition, JOP 4-281461 discloses a method in which a charge transport material is included in a protective layer together with a filler in attempting to prepare a photoreceptor capable of preventing increase of residual potential while having a good mechanical strength. To include a charge transport material in a protective layer improves the charge mobility and therefore the increase of residual potential can be improved to some extent. However, when a filler is added, residual potential is remarkably increased, which is caused by the increase of resistance of the protective layer and the number of charge trap sites in the protective layer. Therefore, there is a limit to improvement of the increase of residual potential only by increasing the charge mobility. Accordingly, the demand for a photoreceptor having good durability cannot be satisfied only by this method.

In addition, in attempting to improve the increase of residual potential, a method in which a Lewis acid is included in a protective layer (JOP 53-133444); a method in which an organic proton acid is included in a protective layer (JOP 55-157748); and a method in which an electron accepting material is included in a protective layer (JOP 2-4275), have been disclosed.

It is considered that these methods are aimed to improve the charge injection at the interface between the protective layer and the charge transport layer, and portions having a low resistance are formed in the protective layer, such that the charge can reach the surface of the protective layer, resulting in decrease of residual potential. The residual potential increase problem can be improved to some extent by these methods, but the increase of residual potential of a durable photoreceptor having a protective layer including a filler cannot be avoided by these methods because the reason for the residual potential increase problem occurred for such a durable photoreceptor is different from the reason for the residual potential increase problem improved by these methods mentioned above. In addition, when an organic acid is included in a protective layer in combination with a filler, the dispersion of the filler in the protective layer tends to deteriorate and therefore the resultant images are blurred. Thus, these methods produce adverse effects.

JOP 2000-66434 discloses a method in which a wax having an acid value not greater than 5 mgKOH/g is included in a protective layer. However, the effect of adding a filler in the outermost layer is not described in JOP 2000-66434. In addition, as can be understood from the below-mentioned description, a satisfactory effect cannot be exerted by this method against a photoreceptor including a filler in the outermost layer to improve its durability.

Japanese Patent No. 2,884,812 (i.e., JOP 4-295855) discloses a method that a layer including a graft copolymer resin having an acid value of from 30 to 260 mgKOH/g is formed on the surface of a photosensitive layer. Increase of residual potential can be prevented. However, this technique intends to improve the lubrication property and releasability of the surface of the photoreceptor, and in addition the photoreceptor does not include a filler in the outermost layer, which is different from the photoreceptor of the present invention. Further, the durability of the photoreceptor is not discussed therein.

Namely, the outermost layer consists of a graft polymer, and therefore the construction of the outermost layer is different from the outermost layer of the photoreceptor of the present invention, in which a filler is included to improve the durability thereof.

In addition, JOP 9-281718 discloses a photoreceptor having a photosensitive layer which includes a titanylphthalocyanine, a polycarbonate and a resin having an acid value of from 1 to 50 mgKOH/g. This technique intends to heighten the γ-properties of a single-layer photoreceptor. Therefore, the photoreceptor is different from the photoreceptor of the present invention, in which a protective layer including a filler is formed on a photosensitive layer. Namely, the durability of the photoreceptor is not discussed therein.

On the other hand, blurred images are also produced due to ozone and NOx. It is known that antioxidants are effective at improving the blurred images of this kind. JOP 8-292585 discloses a method in which at least one antioxidant selected from hindered phenol derivatives and hindered amine derivatives is included in the photoreceptor to reduce the chance that blurred images are produced. It is know that this method is effective at improving the blurred images caused by reactive gasses such as ozone and NOx. However, residual potential of the resultant photoreceptor increases. In particular, when a filler is included in an outermost layer, residual potential seriously increases, resulting in deterioration of initial image qualities. Therefore this technique cannot be used for a photoreceptor having a protective layer including a filler because residual potential thereof seriously increases and high quality images cannot be produced.

Thus, a photoreceptor having a protective layer including a filler is known. In addition, a method in which an acid is added to the protective layer to reduce residual potential is also known. However, a technique by which serious increase of residual potential due to addition of a filler in a protective layer can be improved has not been discovered. Therefore there is a desire for a photoreceptor capable of producing high quality images while having good durability.

In order to produce high quality images on photoreceptors in which a filler is included in the outermost layer to improve their durability, it is needed to prevent formation of blurred images and increase of residual potential. In addition, it is also important that charges in photoreceptors linearly move toward the surface of the photoreceptors without being obstructed by the filler included therein. Therefore, it is needed that the filler in the protective layer is well dispersed therein. When the filler included in a protective layer agglomerates, movement of the charges injected into the protective layer from the photosensitive layer are obstructed by the filler when the charges move toward the surface of the protective layer. Therefore a toner image formed of scattered toner particles is formed, resulting in deterioration of resolution of the toner image.

In addition, when imagewise light irradiates such a protective layer including an agglomerated filler, the light is scattered by the filler, resulting in deterioration of light-transmittance, and thereby resolution of the resultant image deteriorates.

Further, the dispersion of a filler included in a protective layer largely influences the abrasion resistance of the photoreceptor. When a filler seriously agglomerates (i.e., a filler is poorly dispersed), not only the abrasion resistance of the resultant photoreceptor deteriorates but also uneven abrasion tends to occur. Therefore a desired durability cannot be imparted to the resultant photoreceptor.

Therefore, in order to provide a photoreceptor in which a filler is included in a protective layer to improve the durability of the photoreceptor and which can produce high quality images, it is important not only to prevent occurrence of blurred images and increase of residual potential but also to improve dispersion of the filler in the protective layer. Namely, it is important not to form aggregates of the filler used, i.e., to prepare a coating liquid in which the filler is well dispersed.

However, a solution by which these problems are solved at the same time has not been discovered. Namely, when a filler is included in an outermost layer of a photoreceptor to improve its durability, blurred images tend to be produced and residual potential tends to increase, and therefore a problem in that high quality images cannot be produced still remains. As mentioned above, a drum heater has to be provided in an image forming apparatus to prevent such a blurred image problem. However, a drum heater cannot be provided in a small-sized photoreceptor, which is especially desired to have good durability. Therefore, there is no small-size photoreceptor having good durability and capable of producing high quality images. To install a drum heater is an obstruction to a small-size image forming apparatus and having low electric power consumption.

SUMMARY OF THE INVENTION

Accordingly, an object of the present invention is to provide a durable photoreceptor which can stably produce high quality images without blurring wile preventing increase of residual potential even when repeatedly used for a long period of time.

Another object of the present invention is to provide an image forming method by which high quality images can be stably produced at a high speed for a long period of time without frequently changing the photoreceptor.

A further object of the present invention is to provide a small-size image forming apparatus and a process cartridge by which high quality images can be stably produced at a high speed for a long period of time without frequently changing the photoreceptor.

Briefly these objects and other objects of the present invention as hereinafter will become more readily apparent can be attained by an electrophotographic photoreceptor including at least an electroconductive substrate, one or more photosensitive layers formed overlying the substrate and optionally a protective layer formed overlying the photosensitive layer, wherein the outermost layer includes at least a filler, a binder resin and an organic compound having an acid value of from 10 to 700 mgKOH/g.

The outermost layer is defined as the layer furthest away from the substrate. The photosensitive layer can be the outermost layer. "Overlying" can include direct contact and allow for intermediate layers.

A layer such as an undercoat layer may be formed between the substrate and the photosensitive layer. In addition, a layer such as intermediate layer may be formed between the photosensitive layer and the protective layer.

It is preferable that the organic compound having an acid value in the specified range has at least one hydrophilic group. More preferably the hydrophilic group is a carboxyl group. The organic compound is preferably an unsaturated polycarboxylic acid type wetting dispersant. The number average molecular weight of the organic compound is preferably from 300 to 30,000.

The photoreceptor preferably satisfies the following relationship:

$$0.1 \leqq (A \times B/C) \leqq 20$$

wherein A represents the content of the organic compound having an acid value of from 10 to 700 mgKOH/g in the outermost layer in units of grams; B represents the acid value of the organic compound in units of mgKOH/g; and C represents the content of the filler in the outermost layer in units of grams.

The filler preferably includes an inorganic pigment. The inorganic pigment is preferably a metal oxide, which preferably has a specific resistance (i.e., resistivity) not less than $10^{10}$ Ω·cm. The pH of the metal oxide at its isoelectric point is preferably not less than 5.

It is preferable that the surface of the inorganic pigment is subjected to a treatment preferably using a material selected from the group consisting of titanate coupling agents and aluminum coupling agents. The ratio (Ws/Wf) of a weight (Ws) of the surface treating agent to a weight (Wf) of the filler is from 0.02 to 0.30. The average primary particle diameter of the filler is preferably form 0.01 to 0.9 μm.

The content of the filler is preferably from 0.1 to 50% by weight base on total solid components of the outermost layer.

The binder resin preferably includes a resin selected from the group consisting of polycarbonate resins and polyarylate resins. In addition, a charge transport polymer can be used as the binder resin.

The outermost layer preferably includes an antioxidant, which is preferably a compound having both a hindered phenol structure and a hindered amine structure therein.

In another aspect of the present invention, a coating liquid for an outermost layer of a photoreceptor is provided which includes a filler, a binder resin, a compound having an acid value of from 10 to 700 mgKOH/g, and a mixture of two or more organic solvents. It is preferable that the coating liquid is dispersed by a ball mill containing alumina balls as a dispersion element.

In yet another aspect of the present invention, a method for preparing a photoreceptor is provided in which the coating liquid mentioned above is coated by a spray coating method. The outermost layer is preferably formed by performing spray coating at least twice.

In a further aspect of the present invention, an image forming method is provided which includes the steps of charging a photoreceptor, irradiating the photoreceptor with light to form an electrostatic latent image thereon, developing the latent image with a developer to form a toner image, and transferring the toner image on a receiving material, wherein the photoreceptor is the photoreceptor mentioned above.

In a still further aspect of the present invention, an image forming apparatus is provided which includes a photoreceptor, a charger configured to charge the photoreceptor, an image irradiator configured to irradiate the photoreceptor with light to form an electrostatic latent image on the photoreceptor, an image developer configured to develop the latent image with a developer to form a toner image thereon, and a transferer configured to transfer the toner image on a receiving material optionally via an intermediate transfer medium, wherein the photoreceptor is the photoreceptor of the present invention.

Preferably the image irradiator irradiates the photoreceptor using a laser diode or a light emitting diode. In addition, the charger is preferably a charging roller, and the charger is preferably a proximity charging roller, which charges the photoreceptor while a small gap is formed between the charger and the photoreceptor and a DC voltage overlapped with an AC voltage is applied.

The toner preferably includes a lubricant, and/or the image forming apparatus further has a lubricant applying device configured to apply a lubricant, such as zinc stearate and fluorine-containing compounds, to the surface of the photoreceptor.

The image forming apparatus may be a tandem type image forming apparatus having four photoreceptors in which cyan, magenta, yellow and black images are formed on the respective photoreceptor in parallel to form a full color image. In this case, an intermediate transfer medium is preferably used.

In a still further aspect of the invention, a process cartridge is provided which includes at least a photoreceptor and a housing, wherein the photoreceptor is the photoreceptor of the present invention.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when-considered in connection with the accompanying drawings in which like reference characters designate like corresponding parts throughout and wherein.

DETAILED DESCRIPTION OF THE INVENTION

Figure 1:
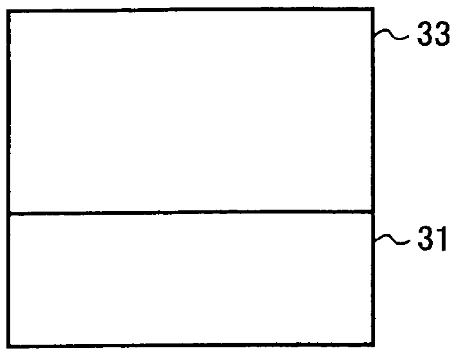
FIGS. 1 to 5 are schematic views illustrating the cross sections of typical embodiments of the photoreceptor of the present invention.

As mentioned above, it is known that a filler is included in an outermost layer of a photoreceptor to impart high durability to the photoreceptor, i.e., to improve the abrasion resistance of the photoreceptor. However, the method has drawbacks such that residual potential increases, and image qualities deteriorate, e.g., blurred images are produced.

As a result of the present inventors' investigation, it is found that by including a highly insulative filler in an outermost layer, production of blurred images can be avoided, and increase of residual potential, which is caused by adding the highly insulative filler, can be avoided by including an organic compound having an acid value of from 10 to 700 mgKOH/g. In addition, the dispersion of the filler is also improved by adding such an organic compound, the resultant photoreceptor can produce high quality images. Thus, the present invention is made.

In the present invention, increase of residual potential can be prevented by using an organic filler having an acid value of from 10 to 700 mgKOH/g together with a highly insulative filler. Increase of residual potential is mainly caused by addition of such a filler. In particular, when the filler is a hydrophilic metal oxide having many polar groups, the tendency is strengthened. In addition, when the filler is highly insulative, the tendency is further strengthened.

One of the reasons why increase of residual potential can be prevented by adding an organic compound having an acid value of from 10 to 700 mgKOH/g is considered to be that the resistance of the layer (the filler) is decreased by adding such an organic compound. In addition, another reason is considered to be that when the organic compound is a wetting dispersant having a hydrophilic group, the compound can be adsorbed on the polar groups present on the surface of the filler, which serves as charge trap sites, and thereby serious-increase of residual potential can be avoided.

By adding an organic compound having an acid value of from 10 to 700 mgKOH/g, dispersion of the filler used together with the organic compound can be improved as well as reduction of residual potential. In particular, when the filler is a hydrophilic metal oxide, the effect can be enhanced. By improving dispersion of the filler in the outermost layer, imagewise light irradiated to the outermost layer to form a latent image is hardly scattered by the outermost layer, and thereby images having high resolution and good evenness can be produced.

In addition, by adding such an organic compound, the following effects are also exerted:

(1) the reproducibility of dot toner images can be improved, resulting in improvement of resolution of the resultant images;

(2) the abrasion resistance of the outermost layer can be improved and uneven abrasion can be avoided;

(3) production of coating defects can be avoided;

(4) life of the coating liquid can be prolonged, resulting in improvement of qualitative stability of the resultant photoreceptor; etc.

Therefore, according to the present invention, an electrophotographic photoreceptor which can produce high quality images while having high durability (i.e., high quality images can be stably produced even when repeatedly used), and a coating liquid for the outermost layer of the photoreceptor, are provided. In addition, according to the present invention, an electrophotographic image forming method and apparatus, and a process cartridge for an image forming apparatus, by which high quality images can be stably produced even when images are repeatedly produced, are provided.

The present invention will be explained in detail.

As mentioned above, when a filler is included in an outermost layer of a photoreceptor to improve the abrasion resistance of the photoreceptor, residual potential of the photoreceptor typically increases. In addition, blurred images are formed and resolution is decreased and therefore image qualities deteriorate. Therefore, it is difficult to provide a photoreceptor having good durability and capable of producing high quality images. This is because the blurred image problem can be prevented by heightening the resistance of the outermost layer, and residual potential can be decreased by decreasing the resistance of the outermost layer, resulting in trade-off therebetween.

However, by the present invention, the abrasion resistance can be improved, increase of residual potential can be prevented and in addition dispersion of the filler in the outermost layer can be improved and thereby a photoreceptor having high durability and capable of producing high quality images can be provided. The increase of residual potential is caused mainly by polar groups present on the surface of the filler and the high resistance filler in the outermost layer. One of the reasons why the increase of residual potential can be prevented is considered that by including an organic compound having an acid value of from 10 to 700 mgKOH/g in the outermost layer, the resistance of the filler can be decreased. In particular, when the organic compound is a wetting dispersant having a hydrophilic group such as a carboxyl group, the effect can be dramatically enhanced.

Namely, the increased residual potential of a photoreceptor having an outermost layer including a filler to improve the abrasion resistance can be decreased by adding such an organic compound in the outermost layer. When such an organic compound is added to a layer including no filler, there is no effect on the residual potential of the layer.

In particular, when a polycarboxylic acid is used as the organic compound, the effect can be further enhanced. The reason is considered to be that the polycarboxylic acid is adsorbed on the surface of the filler used. When the polycarboxylic acid is adsorbed on the filler, the dispersion of the filler in the layer can also be improved. Polycarboxylic acid compounds can exert the effect more effectively than other organic acids. Therefore polycarboxylic acids are preferably used in the present invention.

When fillers having a low resistance or acidic fillers are used, a chance that blurred images are produced increases but residual potential of the photoreceptor hardly increases. Therefore, such fillers have been used for conventional photoreceptors. Namely, conventional photoreceptors have a drawback such that blurred images tend to be produced.

To the contrary, in the present invention a filler which has a relatively high resistance and which is basic is used, and therefore the blurred image problem can be prevented. However, the residual potential of the resultant photoreceptor tends to increase. The increased residual potential can be decreased by adding a polycarboxylic acid compound therein. Thus, a photoreceptor which has a low residual potential and which hardly produce blurred images can be provided.

In the present invention, the effect can be exerted by using a combination of a filler (in particular, a highly insulative filler) with a polycarboxylic acid compound. By using such a combination, increase of residual potential and blurred image problems can be prevented while the filler is dispersed uniformly in the outermost layer. Therefore a photoreceptor having high durability and which can produce high quality images can be provided.

In order to improve the abrasion resistance of an outermost layer, to prevent the blurred image problem and to form a uniform outermost layer without coating defects, it is preferable to use a metal oxide, and more preferably a metal oxide having high insulating property, as the filler in the outermost layer. However, metal oxides typically have polar groups on the surface thereof. Therefore the residual potential of the resultant photoreceptor tends to increase. Accordingly electroconductive metal oxides have been typically used for the outermost layers of conventional photoreceptors, while the blurred image problem-is-prevented by providing a drum heater which heats the photoreceptors to remove moisture from the photoreceptor.

Organic compounds having an acid value of from 10 to 700 mgKOH/g for use in the present invention, and preferably wetting dispersants having a hydrophilic group such as a carboxyl group, have an affinity to hydrophilic metal oxides. In particular, when such an organic compound is adsorbed on the polar groups present on the surface of the filler used, which polar groups serve as trap sites, the residual potential of the resultant photoreceptor can be effectively and dramatically decreased.

The thus decreased residual potential can be maintained even after long repeated use. Therefore the photoreceptor has good durability. Since the residual potential (i.e., the potential of a lighted area of the photoreceptor) is decreased, the potential of a dark area of the photoreceptor can be set so as to be relatively low. Therefore, the electric field strength can be decreased, and thereby a chance of producing undesired images can be reduced. Accordingly the photoreceptor has good durability.

In order to prevent production of blurred images which are caused by ozone and NOx included in an atmosphere surrounding the photoreceptor, an additive such as antioxidants is typically included in the photoreceptor. To add an antioxidant in a photoreceptor increases the residual potential of the photoreceptor. However, the photoreceptor of the present invention has an excess ability to decrease the residual potential, and therefore even-when such an antioxidant is added, the increase of the residual potential can be prevented while the blurred image problem is prevented. Therefore, the photoreceptor of the present invention has good durability.

By using a combination of a filler with an organic compound having an acid value of from 10 to 700 mgKOH/g, the dispersion of the filler in the resultant layer can also be improved. When a hydrophilic inorganic filler, which typically has a poor affinity to organic solvents and binder resins, the filler tends to agglomerate in the coating liquid and the resultant layer. In particular, when metal oxides are used as the filler, this agglomeration problem tends to occur although metal oxides are advantageous in view of abrasion resistance, light scattering and film quality of the resultant layer.

By including an organic compound having an acid value of from 10 to 700 mgKOH/g (in particular, a wetting dispersant having a hydrophilic group such as a carboxyl group), the affinity of the added inorganic filler to organic solvents and binder resins can be improved. Therefore, the dispersion of the filler in the resultant layer can dramatically be enhanced.

In order to improve the dispersion of a filler in a layer, it is important to wet the filler with the solvent and binder resin used, resulting in stabilization of the filler. By including an organic compound having an acid value of from 10 to 700 mgKOH/g (in particular, a wetting dispersant having a hydrophilic group such as a carboxyl group), the hydrophilic group is adsorbed on the polar groups present on the surface of the filler while the hydrophobic group of the wetting dispersant has an affinity to the binder resin, and thereby the wettability of the filler is dramatically improved, resulting in improvement of dispersion of the filler. In addition, the agglomeration of the filler in the coating liquid can also be prevented and therefore the life of the coating liquid can be prolonged.

When a basic filler is used as the filler, an organic compound having an acid value of from 10 to 700 mgKOH/g is adsorbed on the filler more effectively than in the case in which an acidic filler is used. Therefore the dispersion of the filler can be dramatically improved. In particular, in the present invention, when a metal oxide having a pH not less than at the isoelectric point thereof is used as the filler, dispersion of the filler can be dramatically improved and in addition the effect on decrease of residual potential can be effectively enhanced. Therefore, it is preferable to use such a metal oxide as the filler. Basic fillers are advantageous against acidic fillers because the resultant photoreceptor hardly produce blurred images.

As can be understood from the above description, by using a combination of a basic filler with an organic compound having an acid value of from 10 to 700 mgKOH/g, the following effects can be exerted:

(1) dispersion of the filler in the coating liquid and the resultant layer can be improved;

(2) increase of residual potential of the resultant photoreceptor can be prevented; and (3) the blurred image problem can be prevented, and thereby high quality images can be produced.

Since dispersion of the filler in the resulting outermost layer is improved in the present invention, the charges injected to the outermost layer can easily reach the surface of the outermost layer. Therefore, the resultant electrostatic latent image consists of high resolution dot images, and the resultant toner image has high resolution. Therefore images having good resolution can be produced.

To the contrary, when the filler in the outermost layer is agglomerated, straight movement of the charges injected to the layer is obstructed by the agglomerated filler, resulting in deterioration of resolution of the resultant images.

In addition, by improving dispersion of the filler in the outermost layer, scattering of light used for recording images can be prevented. Namely, the light transmittance of the outermost layer can be improved, resulting in improvement of photosensitivity and prevention of uneven density images. In addition, the resultant outermost layer has good abrasion resistance, good resistance to uneven abrasion and less coating defects. Since the outermost layer has high light transmittance, the photoreceptor can be used for image forming apparatus using light having a relatively short wavelength for recording images. Namely, by using a visible laser for recording latent images on such a photoreceptor, it is possible to produce images having excellent image qualities. In addition, since the filler stably dispersed in a coating liquid, an outermost layer in which the filler is uniformly dispersed can be stably formed, and thereby a photoreceptor having good durability and capable of producing high quality images even when repeatedly used for a long period of time can be stably produced.

Next, the photoreceptor of the present invention will be explained referring to drawings.

FIG. 1 is a schematic view illustrating the cross section of an embodiment of the photoreceptor of the present invention.

In FIG. 1, a single-layer photosensitive layer 33 including a charge generation material (hereinafter a CGM) and a charge transport material (hereinafter a CTM) as main components is formed on an electroconductive substrate 31. The photosensitive layer 33, which is the outermost layer of this photoreceptor, includes a filler, a binder resin and an organic compound having an acid value of from 10 to 700 mgKOH/g as well as the CGM and CTM. The filler may be included uniformly in the photosensitive layer 33 or included such that the concentration of the filler increase in the upward direction of the photosensitive layer 33.

Figure 2:
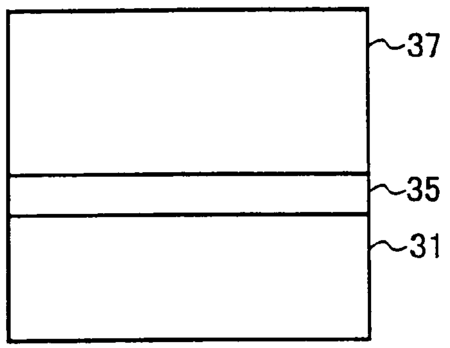

FIG. 2 is a schematic view illustrating the cross section of another embodiment of the photoreceptor of the present invention.

In FIG. 2, a charge generation layer (hereinafter a CGL) 35 including a CGM as a main component and a charge transport layer (hereinafter a CTL) 37 including a CTM as a main component are overlaid on an electroconductive substrate 31 in this order.

The CTL 37, which is the outermost layer of this photoreceptor, includes a filler, a binder resin and an organic compound having an acid value of from 10 to 700 mgKOH/g as well as the CTM. The filler may be included uniformly in the CTL 37 or included such that the concentration of the filler increases in the upward direction of the CTL 37.

Figure 3:
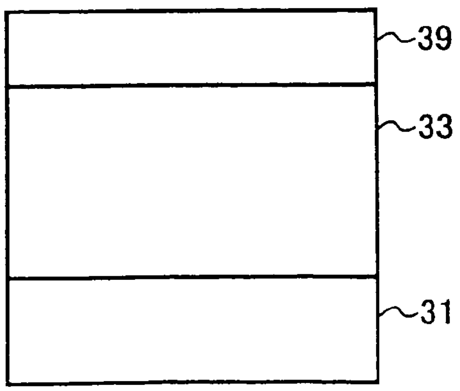

FIG. 3 is a schematic view illustrating the cross section of yet another embodiment of the photoreceptor of the present invention.

In FIG. 3, a photosensitive layer 33 which includes a CGM and a CTM as main components is formed on an electroconductive substrate 31, and a protective layer 39 is formed on the photosensitive layer 33. The protective layer 39, which is the outermost layer of this photoreceptor, includes at least a filler, a binder resin and an organic compound having an acid value of from 10 to 700 mgKOH/g.

Figure 4:
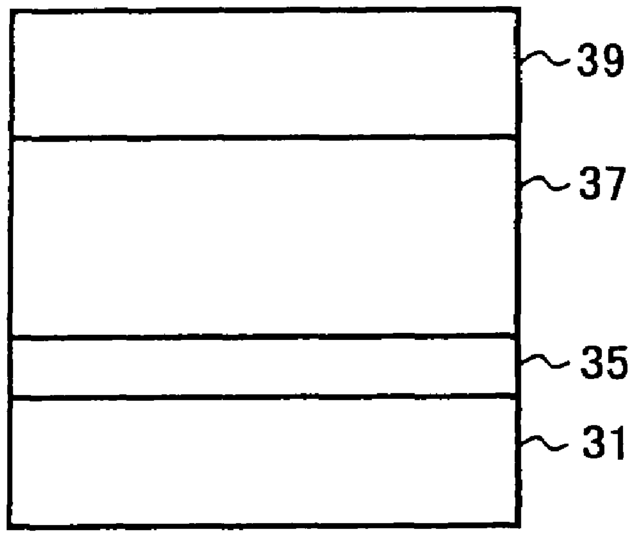

FIG. 4 is a schematic view illustrating the cross section of a further embodiment of the photoreceptor of the present invention.

In FIG. 4, a CGL 35 including a CGM as a main component and a CTL 37 including a CTM as a main component are overlaid on an electroconductive substrate 31 in this order. In addition, a protective layer 39 is formed on the CTL 37. In this case, the protective layer 39, which is the outermost layer of the photoreceptor, includes at least a filler, a binder resin and an organic compound having an acid value of from 10 to 700 mgKOH/g.

Figure 5:
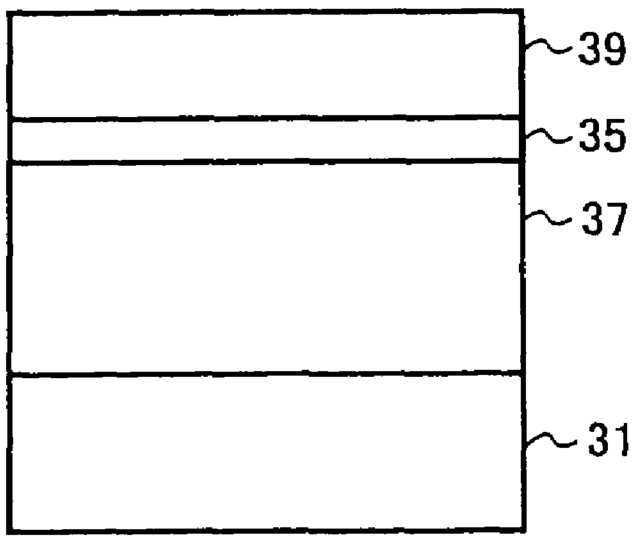

FIG. 5 is a schematic view illustrating the cross section of a still further embodiment of the photoreceptor of the present invention.

In FIG. 5, a CTL 37 including a CTM as a main component and a CGL 35 including a CGM as a main component are overlaid on an electroconductive substrate 31 in this order. In addition, a protective layer 39 is formed on the CGL 35. In this case, the protective layer 39, which is the outermost layer of this photoreceptor, includes at least a filler, a binder resin and an organic compound having an acid value of from 10 to 700 mgKOH/g.

Suitable materials for use as the electroconductive substrate 31 include materials having a volume resistance not greater than $10^{10}$ Ω·cm. Specific examples of such materials include plastic cylinders, plastic films or paper sheets, on the surface of which a metal such as aluminum, nickel, chromium, nichrome, copper, gold, silver, platinum and the like, or a metal oxide such as tin oxides, indium oxides and the like, is deposited or sputtered. In addition, a plate of a metal such as aluminum, aluminum alloys, nickel and stainless steel can be used. A metal cylinder can also be used as the substrate 31, which is prepared by tubing a metal such as aluminum, aluminum alloys, nickel and stainless steel by a method such as impact ironing or direct ironing, and then treating the surface of the tube by cutting, super finishing, polishing and the like treatments. Further, endless belts of a metal such as nickel, stainless steel and the like, which have been disclosed, for example, in Japanese Laid-Open Patent Publication No. 52-36016, can also be used as the substrate 31.

Furthermore, substrates, in which a coating liquid including a binder resin and an electroconductive powder is coated on the supports mentioned above, can be used as the substrate 31. Specific examples of such an electroconductive powder include carbon black, acetylene black, powders of metals such as aluminum, nickel, iron, nichrome, copper, zinc, silver and the like, and metal oxides such as electroconductive tin oxides, ITO and the like. Specific examples of the binder resin include known thermoplastic resins, thermosetting resins and photo-crosslinking resins, such as polystyrene, styrene-acrylonitrile copolymers, styrene-butadiene copolymers, styrene-maleic anhydride copolymers, polyesters, polyvinyl chloride, vinyl chloride-vinyl acetate copolymers, polyvinyl acetate, polyvinylidene chloride, polyarylates, phenoxy resins, polycarbonates, cellulose acetate resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like resins.

Such an electroconductive layer can be formed by coating a coating liquid in which an electroconductive powder and a binder resin are dispersed or dissolved in a proper solvent such as tetrahydrofuran, dichloromethane, methyl ethyl ketone, toluene and the like solvent, and then drying the coated liquid.

In addition, substrates, in which an electroconductive resin film is formed on a surface of a cylindrical substrate using a heat-shrinkable resin tube which is made of a combination of a resin such as polyvinyl chloride, polypropylene, polyesters, polyvinylidene chloride, polyethylene, chlorinated rubber and fluorine-containing resins, with an electroconductive material, can also be used as the substrate 31.

Next, the photosensitive layer of the photoreceptor of the present invention will be explained.

In the present invention, the photosensitive layer may be a single-layered photosensitive layer or a multi-layered photosensitive layer.

At first, the multi-layered photosensitive layer including the CGL 35 and the CTL 37 will be explained.

The CGL 35 includes a CGM as a main component. In the CGL 35, known charge generation materials can be used. Specific examples of such CGMs include azo pigments such as monoazo pigments, disazo pigments, asymmetric disazo pigments and trisazo pigments; phthalocyanine pigments such as titanyl phthalocyanine, copperphthalocyanine, vanadylphthalocyanine, hydroxygallium phthalocyanine and metal free phthalocyanine; perylee pigments, perynone pigments, indigo pigments, pyrrolopyrrole pigments, anthraquinone pigments, quinacridone pigments, quinone type condensed polycyclic compounds, squaric acid type dyes, and the like pigments and dyes. These CGMs can be used alone or in combination.

Suitable binder resins, which are optionally mixed in the CGL coating liquid, include polyamide, polyurethane, epoxy resins, polyketone, polycarbonate, silicone resins, acrylic resins, polyvinyl butyral, polyvinyl formal, polyvinyl ketone, polystyrene, polysulfone, poly-N-vinylcarbazole, polyacrylamide, polyvinyl benzal, polyester, phenoxy resins, vinyl chloride-vinyl acetate copolymers, polyvinyl acetate, polyphenylene oxide, polyamides, polyvinyl pyridine, cellulose resins, casein, polyvinyl alcohol, polyvinyl pyrrolidone, and the like resins.

The content of the binder resin in CGL 35 is preferably from 0 to 500 parts by weight, and preferably from 10 to 300 parts by weight, per 100 parts by weight of the charge generation material included in the CGL 35.

The CGL 35 can be prepared, for example, by the following method:

(1) a CGM is mixed with a proper solvent optionally together with a binder resin;

(2) the mixture is dispersed using a ball mill, an attritor, a sand mill or a supersonic dispersing machine to prepare a coating liquid; and (3) the coating liquid is coated on an electroconductive substrate and then dried to form a CGL.

A binder resin can be mixed before or after the dispersion process.

Suitable solvents for use in the CGL coating liquid include isopropanol, acetone, methyl ethyl ketone, cyclohexanone, tetrahydrofuran, dioxane, ethyl cellosolve, ethyl acetate, methyl acetate, dichloromethane, dichloroethane, monochlorobenzene, cyclohexane, toluene, xylene, ligroin, and the like solvents. In particular, ketone type solvents, ester type solvents and ether type solvents are preferably used. These solvents can be used alone or in combination.

The CGL coating liquid includes a CGM, a solvent and a binder resin as main components, but may include additives such as sensitizers, dispersants, surfactants and silicone oils.

The CGL coating liquid can be coated by a coating method such as dip coating, spray coating, bead coating, nozzle coating, spinner coating and ring coating methods. The thickness of the CGL 35 is preferably from 0.01 to 5 μm, and more preferably from 0.1 to 2 μm.

The CTL 37 can be formed, for example, by the following method:

(1) a CTM and a binder resin are dispersed or dissolved in a proper solvent to prepare a CTL coating liquid; and (2) the coating liquid is coated and dried to form a CTL.

The CTL coating liquid may include one or more additives such as plasticizers, leveling agents, antioxidants and the like, if desired.

CTMs are classified into positive-hole transport materials and electron transport materials.

Specific examples of the electron transport materials include electron accepting materials such as chloranil, bromanil, tetracyanoethylene, tetracyanoquinodimethane, 2,4,7-trinitro-9-fluorenon, 2,4,5,7-tetranitro-9-fluorenon, 2,4,5,7-tetanitroxanthone, 2,4,8-trinitrothioxanthone, 2,6,8-trinitro-4H-indeno[1,2-b]thiophene-4-one, 1,3,7-trinitrodibenzothiphene-5,5-dioxide, benzoquinone derivatives and the like.

Specific examples of the positive-hole transport materials include known materials such as poly-N-carbazole and its derivatives, poly-γ-carbazolylethylglutamate and its derivatives, pyrene-formaldehyde condensation products and their derivatives, polyvinyl pyrene, polyvinyl phenanthrene, polysilane, oxazole derivatives, oxadiazole derivatives, imidazole derivatives, monoarylamines, diarylamines, triarylamines, stilbene derivatives, α-phenyl stilbene derivatives, benzidine derivatives, diarylmethane derivatives, triarylmethane derivatives, 9-styrylanthracene derivatives, pyrazoline derivatives, divinyl benzene derivatives, hydrazone derivatives, indene derivatives, butadiene derivatives, pyrene derivatives, bisstilbene derivatives, enamine derivatives, and the like.

These CTMs can be used alone or in combination.

Specific examples of the binder resin for use in the CTL 37 include known thermoplastic resins and thermosetting resins, such as polystyrene, styrene-acryl-onitrile copolymers, styrene-butadiene copolymers, styrene-maleic anhydride copolymers, polyester, polyvinyl chloride, vinyl chloride-vinyl acetate copolymers, polyvinyl acetate, polyvinylidene chloride, polyarylate, phenoxy resins, polycarbonate, cellulose acetate-resins, ethyl cellulose resins, polyvinyl butyral resins, polyvinyl formal resins, polyvinyl toluene, poly-N-vinyl carbazole, acrylic resins, silicone resins, epoxy resins, melamine resins, urethane resins, phenolic resins, alkyd resins and the like. Among these resins, polycarbonate and polyarylate are preferable.

The content of the CTM in the CTL 37 is preferably from 20 to 300 parts by weight, and more preferably from 40 to 150 parts by weight, per 100 parts by weight of the binder resin included in the CTL 37. The thickness of the CTL 37 is preferably not greater than 25 μm in view of resolution of the resultant images and response (i.e., photosensitivity) of the resultant photoreceptor. In addition, the thickness of the CTL 37 is preferably not less than 5 μm in view of charge potential. The lower limit of the thickness changes depending on the image forming system for which the photoreceptor is used.

Suitable solvents for use in the CTL coating liquid include tetrahydrofuran, dioxane, toluene, dichloromethane, monochlorobenzene, dichloroethane, cyclohexanone, methyl ethyl ketone, acetone and the like solvents.

Next, the single-layered photosensitive layer 33 will be explained. The photosensitive layer 33 can be formed by coating a coating liquid in which a CGM, a CTL and a binder resin are dissolved or dispersed in a proper solvent, and then drying the coated liquid. As the CGM and CTM, the CGMs and CTLs mentioned above for use in the CGL 35 and CTL 37 can be used.

Suitable binder resins for use in the photosensitive layer 33 include the resins mentioned above for use in the CTL 37. The resins mentioned above for use in the CGL 35 can be added as a binder resin. In addition, the charge transport polymer materials can also be used as a binder resin.

The content of the CGM is preferably from 5 to 40 parts by weight, and more preferably from 10 to 30 parts by weight, per 100 parts by weight of the binder resin included in the photosensitive layer 33. The content of the CTM is preferably from 0 to 190 parts, and more preferably from 50 to 150 parts by weight, per 100 parts by weight of the binder resin included in the photosensitive layer 33.

The single-layered photosensitive layer 33 can be formed by coating a coating liquid in which a CGM, a binder and a CTM are dissolved or dispersed in a solvent such as tetrahydrofuran, dioxane, dichloroethane, cyclohexane, toluene, methyl ethyl ketone and acetone by a coating method such as dip coating, spray coating, bead coating and ring coating.

The photosensitive layer coating liquid may include additives such as plasticizers, leveling agents, antioxidants and lubricants. The thickness of the photosensitive layer 33 is preferably from about 5 to about 25 μm.

When the CTL 37 or photosensitive layer 33 is the outermost layer, the CTL 37 or photosensitive layer 33 further includes a filler, and an organic compound having an acid value of from 10 to 700 mgKOH/g. When a protective layer 39 is formed thereon, the protective layer includes a filler, a binder resin and an organic compound having an acid value of from 10 to 700 mgKOH/g.

As the filler added to the outermost layer of the photoreceptor to improve the abrasion resistance of the photoreceptor, organic fillers and inorganic fillers can be used. Suitable organic fillers include powders of fluorine-containing resins such as polytetrafluoroethylene, silicone resin powders, amorphous carbon powders, etc.

Specific examples of the inorganic fillers include powders of metals such as copper, tin, aluminum and indium; metal oxides such as silica, tin oxide, zinc oxide, titanium oxide, alumina, zirconia, indium oxide, antimony oxide, bismuth oxide, calcium oxide, tin oxide doped with antimony, indium oxide doped with tin; metal fluoride such as tin fluoride, calcium fluoride and aluminum fluoride; potassium titanate, boron nitride, etc.

Among these fillers, inorganic fillers are preferably used because of having high hardness and low light scattering property. Among the inorganic fillers, metal oxides are preferable because they can impart good abrasion resistance to the photoreceptor and thereby the resultant photoreceptor can produce high quality images. In addition, when metal oxides are used, the qualities of the coated film are good. Since the qualities of the coated film influence on the image qualities and abrasion resistance of the photoreceptor, to form a layer having good film qualities is needed to prepare a photoreceptor having good durability and capable of producing high quality images.

In order to avoid the blurred image problem, a filler having a high electrical insulating property is preferably used. When an electroconductive filler is included in the outermost layer of a photoreceptor, the resistance of the outermost layer decreases and charges formed on the outermost layer tend to move in the horizontal direction, resulting in occurrence of the blurred image problem. Therefore, filler shaving a resistivity not less than $10^{10}$ Ω·cm are preferably used in the photoreceptor of the present invention to avoid the blurred image problem (i.e., to form high resolution images) in the present invention. Specific examples of such fillers include alumina, zirconia, titanium oxide, silica, etc.

Fillers having a resistivity not greater than $10^{10}$ Ω·cm are not preferable in the present invention because the blurred image problem tends to occur.

It is possible to use two or more of these fillers to control the resistance of the outermost layer.

The pH of the filler included in the photoreceptor influences on the resolution of the images produced by the resultant photoreceptor and dispersion of the filler in the resultant layer. The reason is considered to be that an acid such as hydrochloric acid remaining in the metal oxide filler used influences such properties. When a large amount of an acid remains in the filler used, the blurred image problem tends to occur, and in addition dispersion of the filler in the resultant layer deteriorates.

The charge property of the filler (metal oxide) used also influences such properties. In general, particles dispersed in a liquid have a positive or negative charge. In order to neutralize the charge, ions having the opposite charge gather around the particles, resulting in formation of an electric double layer, and thereby the particles are stably dispersed in the liquid. The potential (i.e., zeta potential) in a point around a particle gradually decreases as the point gets away from the particle, and the potential of a point far away from the particle is zero. Therefore, the absolute value of the zeta potential increases, the repulsion of the particles increases, resulting in stabilization of the particles. To the contrary, as the zeta potential approaches zero, the particles tend to agglomerate, and thereby the particles become unstable.

The zeta potential largely changes depending on the pH of the dispersion system. At a pH, the zeta potential becomes zero, namely the dispersion system has an isoelectric point. Therefore, the pH of the dispersion system is preferably far away from the isoelectric point to increase the absolute value of the zeta potential, resulting in stabilization of the dispersion system.

In the present invention, the pH of the filler used is preferably not less than 5 at the isoelectric point because the blurred image problem can be avoided. It is observed by the present inventors that when a basic filler is used, the effect can be further enhanced. Fillers having a high pH (i.e., basic fillers) have a high zeta potential in an acidic dispersion system, and therefore dispersion and stability of the filler is increased when the filler is used in an acidic dispersion system.

In the preset invention, by using a combination of a filler having a pH not less than 5 at the isoelectric point with a wetting dispersant having an acid value of from 10 to 700 mgKOH/g, the wetting dispersant is effectively adsorbed on the filler, and thereby the dispersion and stability of the filler can be dramatically improved.

Among the organic compounds having an acid value of from 10 to 700 mgKOH/g for use in the present invention, wetting dispersants having a hydrophilic group such as a carboxyl group can be preferably used because of improving the wetting property of the filler used by being adsorbed on the filler. In particular, by using a basic metal oxide having a pH not less than 5 at the isoelectric point as the filler, the stability of the wetting property can be further improved. In addition, basic fillers have an advantage against acidic fillers such that the blurred image can be prevented. Thus, by using such a combination, a photoreceptor capable of producing high quality images can be provided.

Specific examples of the metal oxides having a pH not less than 5 at the isoelectric point include titanium oxide, zirconia, alumina, etc. In view of the basic property, alumina has a strongest basic-property, and zirconia has a stronger basic property than titanium oxide. Therefore it is preferable to use alumina as the filler.

Among alumina, α-form alumina having a hexagonal closest packing structure is preferable because of having high light transmittance, high heat stability and good abrasion resistance. Therefore, it is particularly preferable to use α-form alumina because the blurred image problem can be prevented and in addition the abrasion resistance, coating quality and light transmittance of the resultant photoreceptor can be improved.

In the present invention, the filler having a pH not less than 5 can be used alone or in combination. In addition, a combination of one or more fillers having a pH not less than 5 with one or more fillers having a pH less than 5 can be used. Specific examples of acidic fillers having a pH less than 5 include silica, etc.

The surface of these fillers are preferably coated with a surface treating agent to improve dispersion of the fillers. As mentioned above, when the dispersion of the filler used deteriorates, various problems occurs such that the transparency of the resultant layer decreases, coating defects are produced, the abrasion resistance of the layer deteriorates and uneven abrasion of the resultant layer occurs. Therefore, a photoreceptor having good durability and capable of producing high quality images cannot be prepared.

As the surface treating agent, known surface treating agents can be used. However, surface treating agents capable of maintaining the pH of the filler to be treated after the treatment are preferably used. The pH of a filler at the isoelectric point can be changed by treating the filler with a surface treating agent. Namely, when a filler is treated with an acidic surface treating agent, the isoelectric point moves to the acidic side. To the contrary, when a filler is treated with a basic surface treating agent, the isoelectric point moves to the basic side. Therefore, it is preferable to use a basic surface treating agent because dispersion of the filler can be improved and the blurred image can be prevented.

Suitable surface treating agents include titanate coupling agents, aluminum coupling agents, zircoaluminate coupling agents, etc. In addition, fillers treated with $Al_2O_3$, $TiO_2$, $ZrO_2$, silicones, aluminum stearate or their mixtures can also be preferably used because dispersion of the fillers can be improved and the blurred image can be prevented.

When a filler treated with a silane coupling agent is used, the blurred image problem tends to occur. However, by treating a filler with a combination of one or more of the above-mentioned treating agents with a silane coupling agent, there is a possibility that the blurred image problem is not caused. Fillers having a pH less than 5 can be used by being treated with one or more of the basic treating agents mentioned above.

The weight ratio (ST/F) of the surface treating agent (ST) to the filler (F) to be coated is from 2 to 30%, and preferable 3 to 20% although the preferable ratio changes depending on the average primary particle diameter of the filler. When the amount of the treating agent is too small, dispersibility of the filler cannot be improved. To the contrary, when the amount of the treating agent is too large, residual potential of the resultant photoreceptor tends to increase.

The average primary particle diameter of the filler included in the outermost layer is preferably from 0.01 to 0.9 μm, and more preferably from 0.1 to 0.5 μm in view of light transmittance and abrasion resistance of the resultant outermost layer. When the average primary particle diameter is too small, the filler tends to agglomerate and therefore abrasion resistance deteriorates. To the contrary, when the average primary particle diameter is too large, various problems occurs such that the filler tends to precipitate in the coating liquid, image qualities deteriorate and undesired images are produced.

The content of the filler in a layer is preferably from 0.1 to 50% by weight, and more preferably from 5 to 30% by weight. When the content is too low, the abrasion resistance is hardly improved.

When the content is too high, problems occur such that residual potential increases, the blurred image problem occurs, and resolution of the resultant images deteriorates. In addition, since the interaction between filler particles increases, dispersion of the filler deteriorates, and thereby the filler tends to be released from the layer, resulting in deterioration of the abrasion resistance.

When one or more of these fillers are included in the outermost layer, the resultant photoreceptor has good durability but the residual potential of the photoreceptor increases. In order to decrease the residual potential, an organic compound having an acid value of from 10 to 700 mgKOH/g is added to the outermost layer. The acid value is defined as the amount in units of milligrams of potassium hydroxide needed to neutralize carboxyl groups included in a compound of 1 gram. When such an organic compound is used, the organic compound may be a solid or a liquid in which the organic compound is dissolved in an organic solvent, etc.

Suitable compounds for use as the compound having an acid value of from 10 to 700 mgKOH/g include known organic fatty acids, resins and copolymers having a high acid value, etc., but are not limited thereto.

Specific examples of such compounds include saturated or unsaturated fatty acids and aromatic carboxylic acids such as lauric acid, stearic acid, arachidic acid, behenic acid, adipic acid, oleic acid, maleic acid, maleic anhydride, salicylic acid, phthalic acid, isophthalic acid, terephthalic acid; pyromellitic acid; and other carboxylic acids. However, when these compounds are used, there is occasionally a case that dispersion of the filler becomes unstable, and the resultant images is slightly blurred.

Polymers, copolymers and oligomers, which have a saturated or unsaturated hydrocarbon skeleton and which have also at least one carboxyl, group, can be preferably used as such an organic compound because not only increase of residual potential can be prevented but dispersion of the filler can be improved.

Specific examples of such polymers, copolymers and oligomers include saturated polyester, unsaturated polyester, unsaturated polyester having a carboxyl group on its end portion; polymers, copolymers and oligomers of acrylic acid, methacrylic acid, acrylate and methacrylate; styrene-acrylic acid copolymers, styrene-acrylic acid-acrylate copolymers, styrene-methacrylic acid copolymers, styrene-methacrylic acid-acrylate copolymers, styrene-maleic acid copolymers, styrene-maleic anhydride copolymers, etc.

In order to decrease the residual potential of the resultant photoreceptor and to improve the dispersion and stability of the filler used, organic compounds, in particular wetting dispersants, which have a hydrophobic group such as hydrocarbon groups and a hydrophilic group such as a carboxyl group and which have an acid value of from 10 to 700 mgKOH/g are preferably used. The reason why the increase of the residual potential can be prevented is considered to be that the compounds have a proper acid value and are easily adsorbed on the filler used.

When a filler is added to an outermost layer, the polar groups present on the surface of the filler serve as charge trap sites, resulting in increase of the residual potential of the resultant photoreceptor. When such a wetting dispersant as mentioned above is added thereto, the hydrophilic group (such as a carboxyl group) of the wetting dispersant tends to be adsorbed on the polar groups of the filler, resulting in decrease of the residual potential.

On the other hand, in order to improve dispersion of a filler in a layer including a binder resin, the affinity of the filler to the binder resin should be heightened to wet the filler with the binder resin. In addition, interaction between the filler particles should be decreased to improve the stability of the filler.

The wetting dispersants having the above-mentioned structure, i.e., a structure like a surfactant, which includes both a hydrophobic group and a hydrophilic group therein, are used, the hydrophilic group is adsorbed on the polar groups, which serve as trap sites, while the hydrophobic group has an affinity to the binder resin. Thus, the wettability of the filler can be improved. In addition, the molecules adsorbed on the filler cause electric repulsion and steric hindrance, resulting in prevention of contact of the filler particles, and thereby the dispersion stability of the filler can be improved.

Thus, wetting dispersants, which are defined to have both a wetting ability of improving the wettability of a filler and a dispersing ability of improving the dispersion stability of the filler, can be preferably used to impart both wettability and dispersion stability to the filler. When one of the wetting ability and dispersing ability is lacked, problems occur such that dispersion is not satisfactory, dispersion efficiency is not satisfactory and/or dispersion stability is not satisfactory.

These wetting dispersants have good ability to be adsorbed on a filler and a structure which can produce good steric hindrance effect, and therefore the filler used can be imparted with good dispersion stability. Therefore, such wetting dispersants are preferably used.

As the hydrophilic group, $—SO_3Na$, —COOK, —COONa, —COO—, —COOH, —OH, —O—, $—CH_2CH_2O—$, a quaternary ammonium salt group, etc. can be exemplified. In the present invention, when the hydrophilic group is a carboxyl group (i.e., —COOH), the wetting dispersant effectively imparts high dispersibility to the filler while not affecting the electrostatic properties of the resultant photoreceptor and the image qualities of images produced by the photoreceptor. Therefore wetting dispersants having a carboxyl group can be preferably used. The desired effect of the hydrophilic group such as a carboxyl group can be exerted even when one hydrophilic group is included in an organic molecular structure including a hydrophobic group such as hydrocarbon groups. However, when a polycarboxylic acid which has a number of carboxyl groups therein is used, the anionic property of the compound increases, and thereby the dispersion stability of the filler can be further improved and in addition, dispersion efficiency can be dramatically improved.

In addition, when a polycarboxylic acid is used, precipitation of the filler used can be prevented because the carboxyl groups in the polycarboxylic acid have an affinity to each other. Further, when a hydrophilic group such as a carboxyl group is located at the end position of the molecule of a wetting dispersant, the dispersant is easily adsorbed on the filler used. Therefore such wetting dispersants are preferably used in the present invention. In addition, addition of a wetting dispersant having a hydrophilic group at the end position thereof has an effect on prevention of precipitation of the filler used. Specific examples of such polycarboxylic type wetting dispersants include BYK-P104 manufactured by BYK CHEMIE Co., etc.

In addition, to allow a wetting dispersant to be effectively adsorbed on a filler improves dispersion of the filler and decreases residual potential, and in addition improves the abrasion resistance of the resultant outermost layer. The reason is considered to be as follows.

In general, since a filler has a poor affinity to a binder resin, i.e., the adhesion of the filler to the binder resin is poor, the filler tends to be easily released from the binder resin. By adding one or more of the wetting dispersants mentioned above, the affinity of the filler to the binder resin can be enhanced, resulting in prevention of releasing of the filler from the binder resin, and thereby the abrasion resistance of the resultant layer can be improved.

The molecular weight of the organic compound having an acid value of from 10 to 700 mgKOH/g, such as the wetting dispersants mentioned above, for use in the present invention is preferably from 300 to 30,000, and more preferably from 400 to 10,000 in number average molecular weight. Namely, polymers and oligomers are preferably used. When the molecular weight is too low, desired steric hindrance cannot be produced when the dispersant is adsorbed on a filler, resulting in increase of interaction between filler particles, and thereby the dispersion and dispersion stability of the filler are deteriorated. To the contrary, when the molecular weight is too high, wettability and an ability to be adsorbed on a filler deteriorate. In addition, plural filler particles are adsorbed on a wetting dispersant polymer, resulting in agglomeration of the filler particles.

The acid value of the organic compound for use in the present invention is preferably from 10 to 700 mgKOH/g, and more preferably from 30 to 400 mgKOH/g. When the acid value is too high, the resistance of the filler tends to be excessively decreased, resulting in occurrence of the blurred image problem. To the contrary, when the acid value is too low, the addition quantity has to be increased, and in addition increase of residual potential cannot be fully prevented. It is preferable that the addition quantity of the organic compound should be determined while considering the acid value of the organic compound. However, when organic compounds having different acid values in the range of from 10 to 700 mgKOH/g are used while the content of each organic compounds is constant, the residual potential decreasing effect does not necessarily depend on the acid value thereof. This is because the residual potential decreasing effect also depends on the ability of the compound to be absorbed on the filler.

The content of the organic-compound having an acid value of from 10 to 700 mgKOH/g in the outermost layer is preferably determined so as to satisfy the following relationship:

$$0.1 \leqq (A \times B/C) \leqq 20,$$

more preferably, the following relationship:

$$0.8 \leqq (A \times B/C) \leqq 15,$$

and even more preferably, the following relationship:

$$1.5 \leqq (A \times B/C) \leqq 8,$$

wherein A represents the content of the organic compound in units of grams, B represents the acid value of the organic compound in units of mgKOH/g, and C represents the content of the filler used in units of grams.

However, the organic compound should be added in a minimum amount such that the desired effects can be exerted.

When the content is too high, problems tend to occur such that dispersion of the filler used deteriorates and the blurred image problem occurs. When the content is too low, dispersion of the filler used and decrease of residual potential cannot be sufficiently improved.

As the binder resin for use in the protective layer 39, binder resins mentioned above for use in the CTL 37 can be used. Since dispersion of the filler used is influenced by the specie of the binder resin used, it is preferable to use a binder resin which does not adversely affect the dispersion of the filler used. When a filler having a basic isoelectric point is used, an acidic binder resin is preferably used to improve the dispersion of the filler. To the contrary, when a filler having an acidic isoelectric point is used, a basic binder resin is preferably-used-to improve the dispersion of the filler.

Even when the same filler is used in the outermost layer, the abrasion resistance of the layer changes depending on the binder resin used. Thus, binder resins largely influence filler dispersion of the resultant layer, residual potential and abrasion-resistance of the resultant-photoreceptor, and resolution of images produced by the resultant photoreceptor.

Specific examples of the binder resin for use in the protective layer include polymers and copolymers such as polyester, polycarbonate, acrylic resins, polyethyleneterephthalate, polybutyleneterephthalate, acrylic and methacrylic copolymers, styrene-acrylic copolymers, polyarylate, polyacrylate, polystyrene, epoxy resins, ABS resins, ACS resins, olefin-vinyl monomer copolymers, chlorinated polyether, aryl resins, phenolic resins, polyacetal, polyamide, polyamideimide, polyallysulfone, polybutylene, polyethersulfone, polyethylene, polyimide, polymethylpentene, polypropylene, polyphenyleneoxide, polysulfone, AS resins, butadiene-styrene copolymers, polyurethane, polyvinyl chloride, polyvinylidene chloride, etc. In addition, thermosetting resins and photo-crosslinking resins can also be used. Among these resins, polycarbonate resins and polyarylate are preferably used. Further, charge transport polymers can be preferably used as the binder resin to prepare a photoreceptor which has good durability and which can produce high quality images. The charge transport polymer will be explained later.

It is preferable to include a CTM in the protective layer 39 to improve the charge injection property and charge transport property of the layer and to prevent increase of residual potential and deterioration of photosensitivity of the resultant photoreceptor.

Specific examples of the CTM for use in the protective layer 39 include CTMs mentioned above for use in the CTL 37. In this case, it is preferable that the ionization potential of the CTM used in the protective layer 39 is equal to or less than the ionization potential of the CTM included in the photosensitive layer (or CTL) because the charge injection property of the protective layer can be improved and increase of residual potential and deterioration of photosensitivity can be prevented. Ionization potential of a CTM can be measured by a spectrographic method, an electrochemical method, or the like method.

The protective layer preferably includes a charge transport polymer, which has both a binder resin function and a charge transport function, because the resultant protective layer has good abrasion resistance and the resultant photoreceptor can produce high quality image. A charge transport polymer can be used alone as the binder resin. In addition, a charge transport polymer can be used in combination with one or more of the binder resins mentioned above and/or one or more of the low molecular weight CTMs mentioned above.

Suitable charge transport polymers include known charge transport polymer materials. Among these materials, polycarbonate resins having a triarylamine group in their main chain and/or side chain are preferably used. In particular, charge transport polymers having the following formulae of from (1) to (10) are preferably used:

(1)

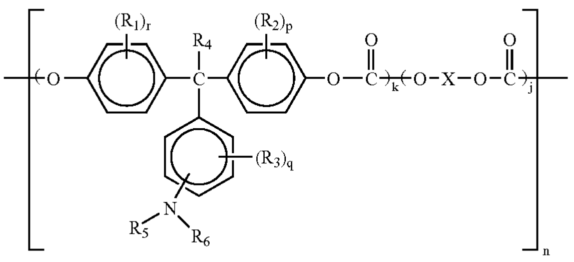

wherein $R_1$, $R_2$ and $R_3$ independently represent a substituted or unsubstituted alkyl group, or a halogen atom; $R_4$ represents a hydrogen atom, or a substituted or unsubstituted alkyl group; $R_5$, and $R_6$ independently represent a substituted or unsubstituted aryl group; r, p and q independently represent 0 or an integer of from 1 to 4; k is a number of from 0.1 to 1.0 and j is a number of from 0 to 0.9; n is an integer of from 5 to 5000; and X represents a divalent aliphatic group, a divalent alicyclic group or a divalent group having the following formula:

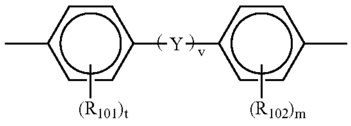

wherein $R_{101}$ and $R_{102}$ independently represent a substituted or unsubstituted alkyl group, a substituted or unsubstituted aryl group, or a halogen atom; t and m represent 0 or an integer of from 1 to 4; v is 0 or 1; and Y represents a linear alkylene group, a branched alkylene group, a cyclic alkylene group, —O—, —S—, —SO—, —$SO_2$—, —CO—, —CO—O—Z—O—CO— (Z represents a divalent aliphatic group), or a group having the following formula:

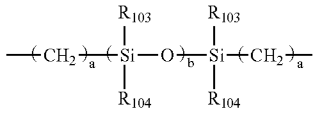

wherein a is an integer of from 1 to 20; b is an integer of from 1 to 2000; and $R_{103}$ and $R_{104}$ independently represent a substituted or unsubstituted alkyl group, or a substituted or unsubstituted aryl group, wherein $R_{101}$, $R_{102}$, $R_{103}$ and $R_{104}$ may be the same or different from the others.

(2)

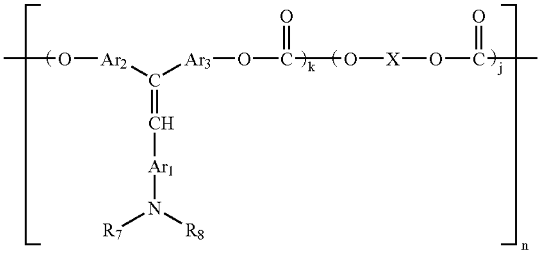

wherein $R_7$ and $R_8$ independently represent a substituted or unsubstituted aryl group; $Ar_1$, $Ar_2$ and $Ar_3$ independently represent an arylene group; and X, k, j and n are defined above in formula (1).

(3)

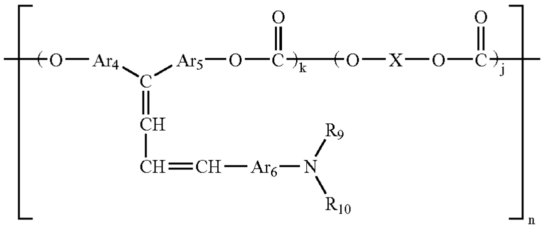

wherein $R_9$ and $R_{10}$ independently represent a substituted or unsubstituted aryl group; $Ar_4$, $Ar_5$ and $Ar_6$ independently represent an arylene group; and X, k, j and n are defined above in formula (1).

(4)

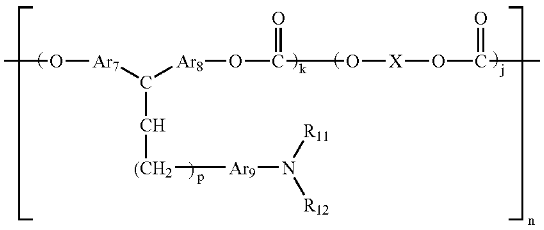

wherein $R_{11}$ and $R_{12}$ independently represent a substituted or unsubstituted aryl group; $Ar_7$, $Ar_8$ and $Ar_9$ independently represent an arylene group; p is an integer of from 1 to 5; and X, k, j and n are defined above in formula (1).

(5)

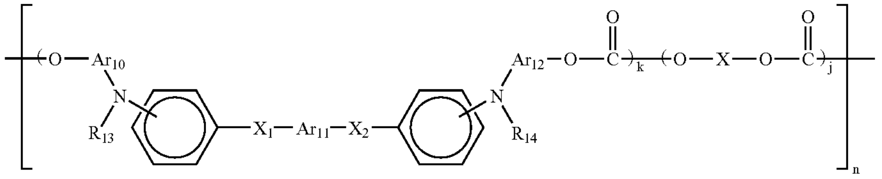

wherein $R_{13}$ and $R_{14}$ independently represent a substituted or unsubstituted aryl group; $Ar_{10}$, $Ar_{11}$ and $Ar_{12}$ independently represent an arylene group; $X_1$ and $X_2$ independently represent a substituted or unsubstituted ethylene group, or a substituted or unsubstituted vinylene group; and X, k, j and n are defined above in formula (1).

wherein $R_{19}$ and $R_{20}$ independently represent a hydrogen atom, or substituted or unsubstituted aryl group, and $R_{19}$ and $R_{20}$ optionally share bond connectivity to form a ring; $Ar_{17}$, $Ar_{18}$ and $Ar_{19}$ independently represent an arylene group; and X, k, j and n are defined above in formula (1).

(8)

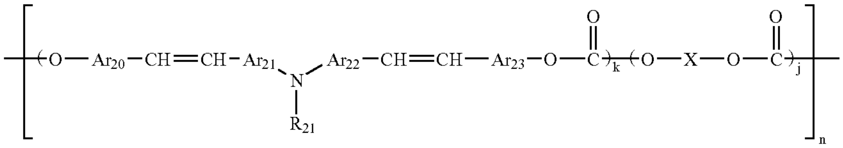

(6)

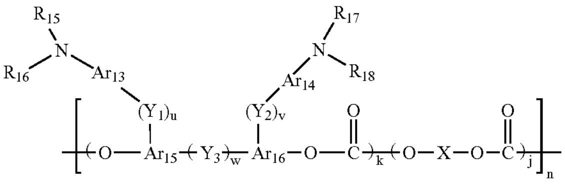

wherein $R_{15}$, $R_{16}$, $R_{17}$ and $R_{18}$ independently represent a substituted or unsubstituted aryl group; $Ar_{13}$, $Ar_{14}$, $Ar_{15}$ and $Ar_{16}$ independently represent an arylene group; $Y_1$, $Y_2$ and $Y_3$ independently represent a substituted or unsubstituted alkylene group, a substituted or unsubstituted cycloalkylene group, a substituted or unsubstituted alkyleneether group, an oxygen atom, a sulfur atom, or a vinylene group; u, v and w independently represent 0 or 1; and X, k, j and n are defined above in formula (1).

(7)

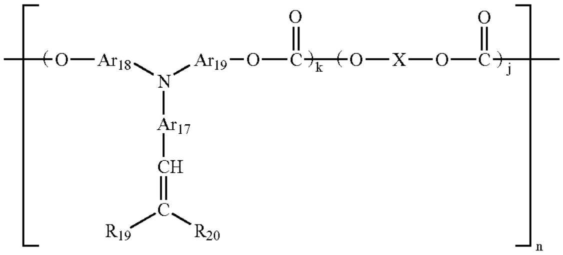

wherein $R_{21}$ represents a substituted or unsubstituted aryl group; $Ar_{20}$, $Ar_{21}$, $Ar_{22}$ and $Ar_{23}$ independently represent an arylene group; and X, k, j and n are defined above in formula (1).

(9)

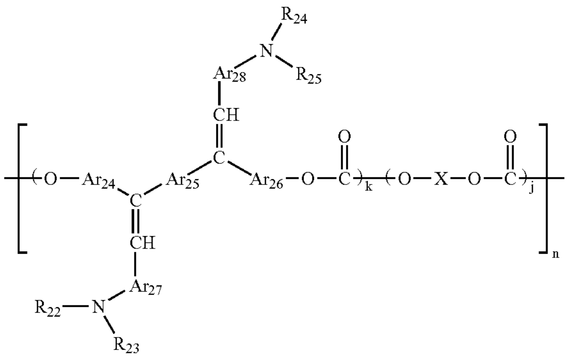

wherein $R_{22}$, $R_{23}$, $R_{24}$ and $R_{25}$ independently represent a substituted or unsubstituted aryl group; $Ar_{24}$, $Ar_{25}$, $Ar_{26}$, $Ar_{27}$ and $Ar_{28}$ independently represent an arylene group; and X, k, j and n are defined above in formula (1).

(10)

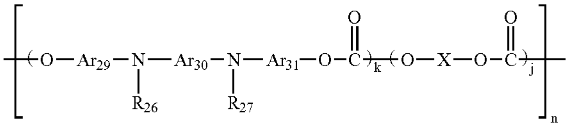

wherein $R_{26}$ and $R_{27}$ independently represent a substituted or unsubstituted aryl group; $Ar_{29}$, $Ar_{30}$ and $Ar_{31}$ independently represent an arylene group; and X, k, j and n are defined above in formula (1).

Specific compounds of the polycarbonate having a triarylamine group in their main chain and/or side chain are as follows but are not limited thereto:

Specific compound 1

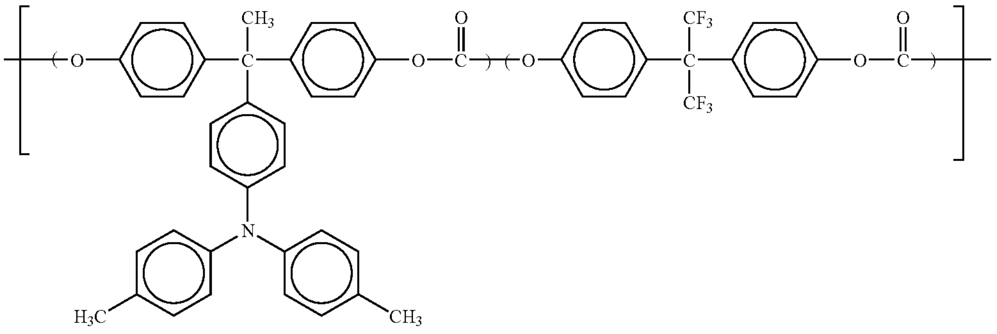

Specific compound 2

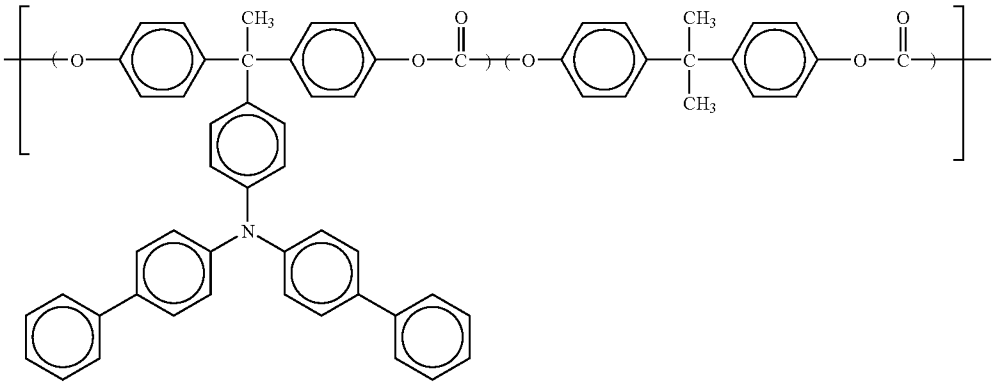

Specific compound 3

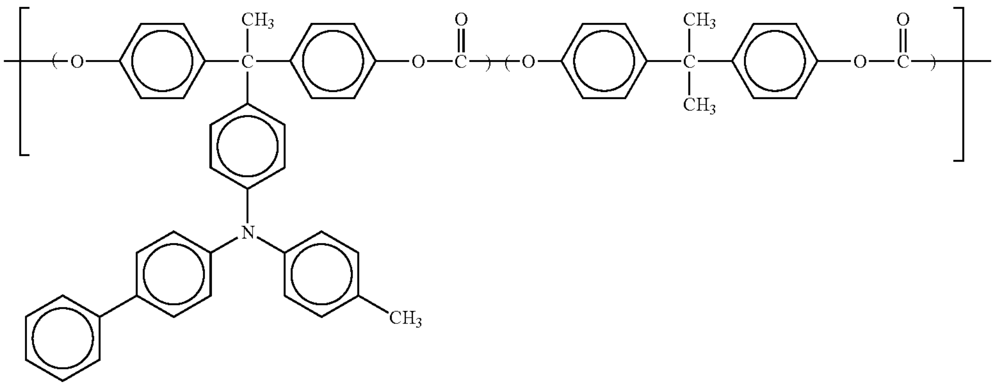

-continued
Specific compound 4
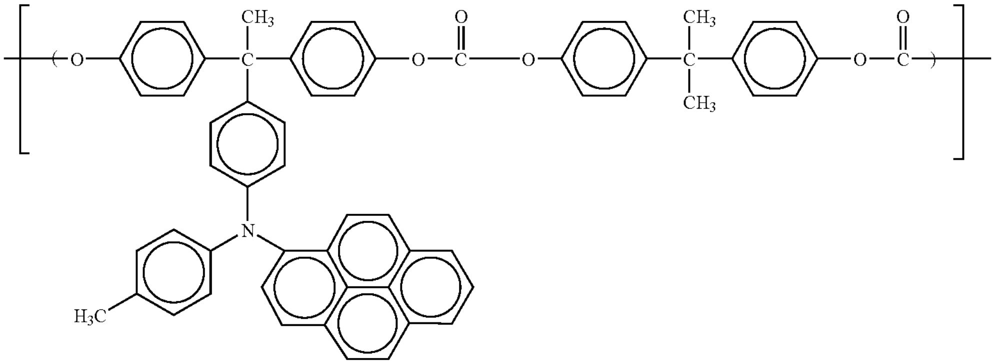
Specific compound 5
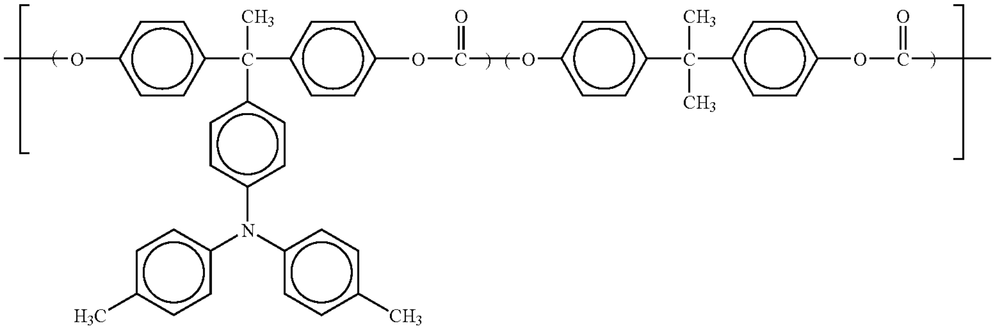
Specific compound 6
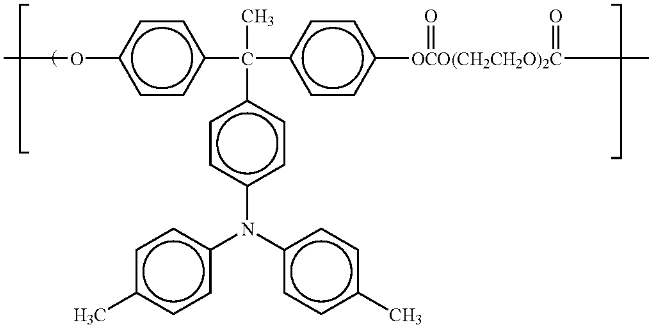
Specific compound 7
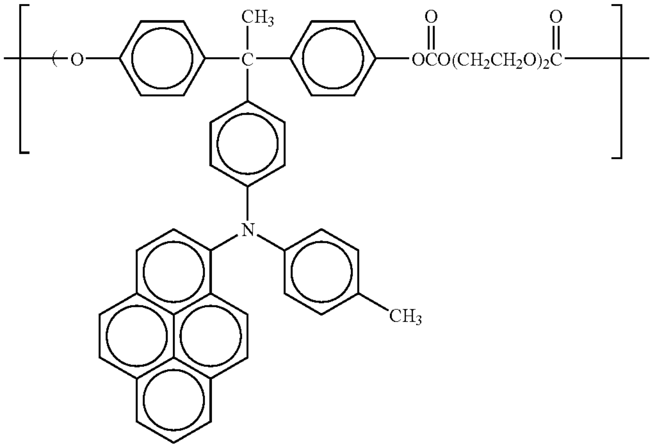

-continued
Specific compound 8
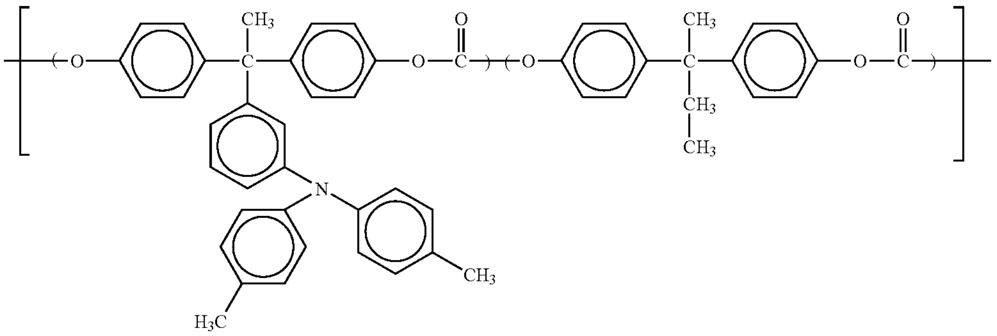
Specific compound 9
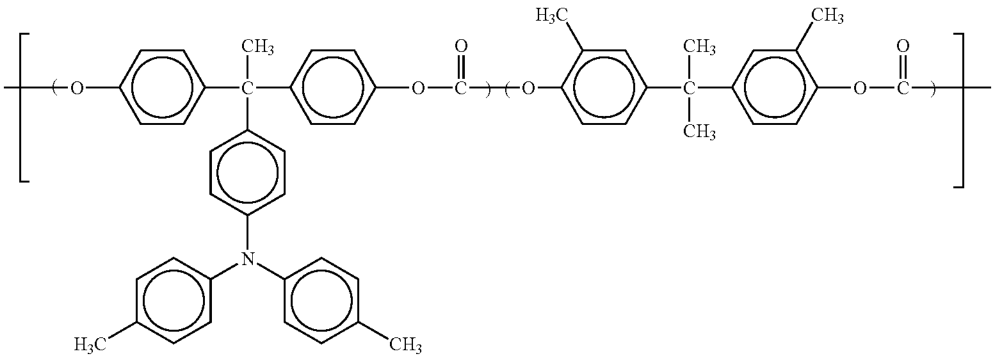
Specific compound 10
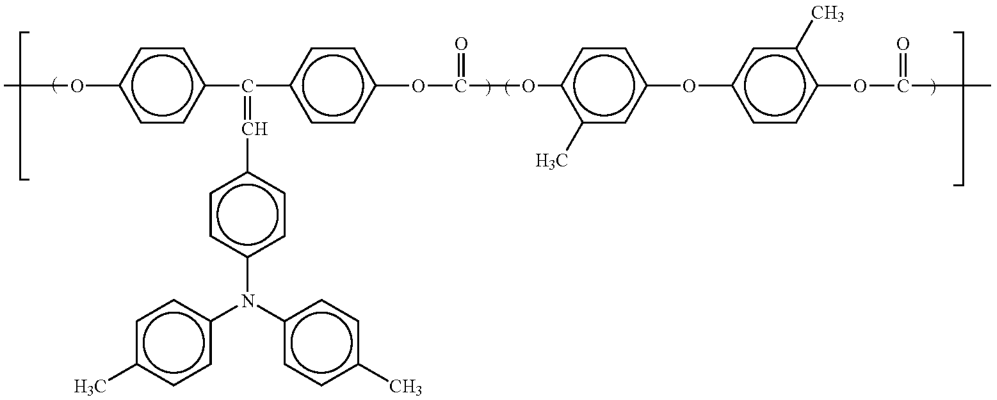
Specific compound 11
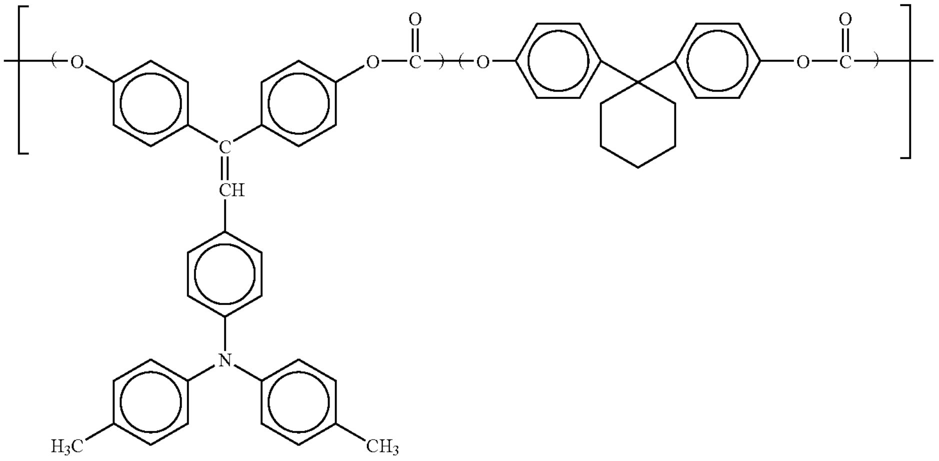

-continued
Specific compound 12
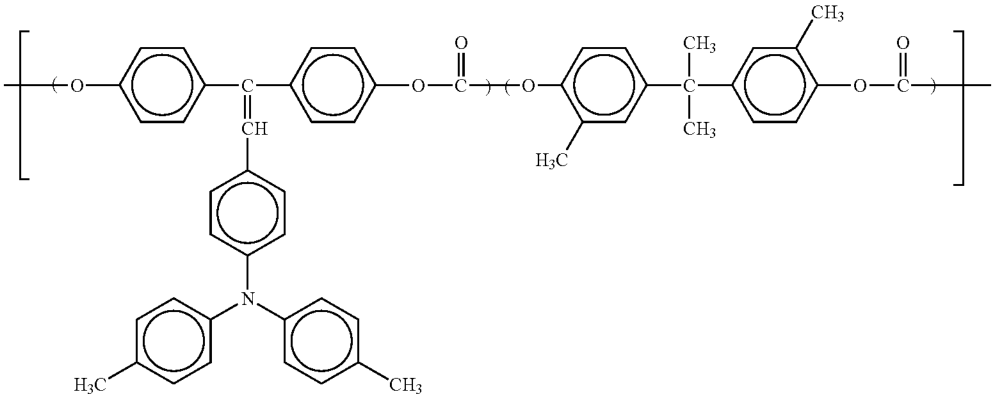
Specific compound 13
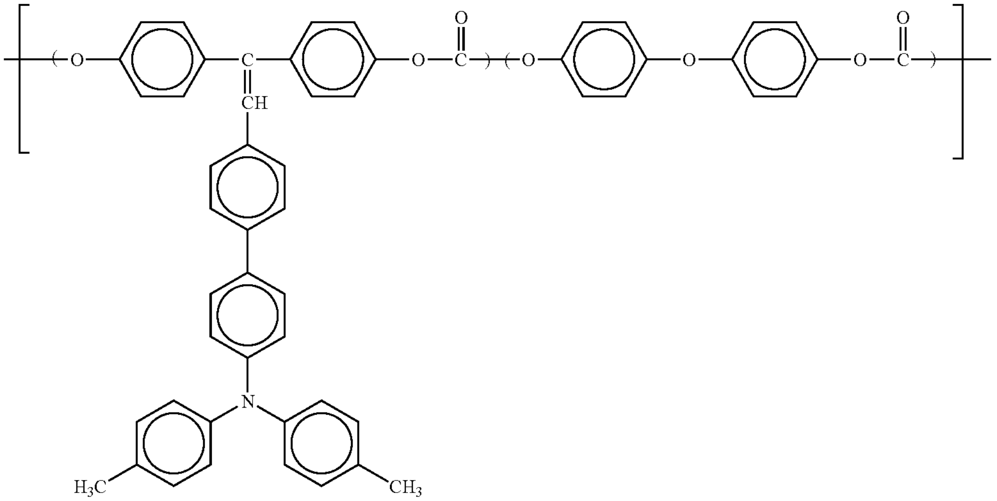
Specific compound 14
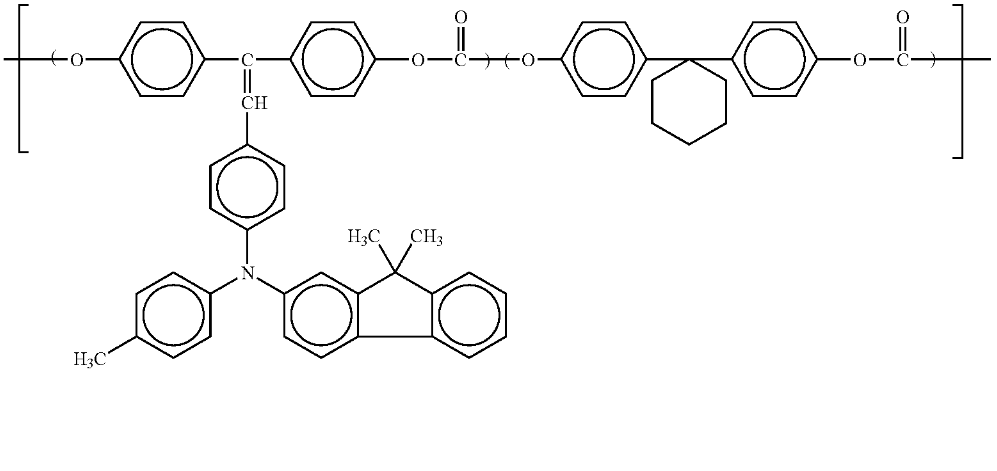

-continued
Specific compound 15
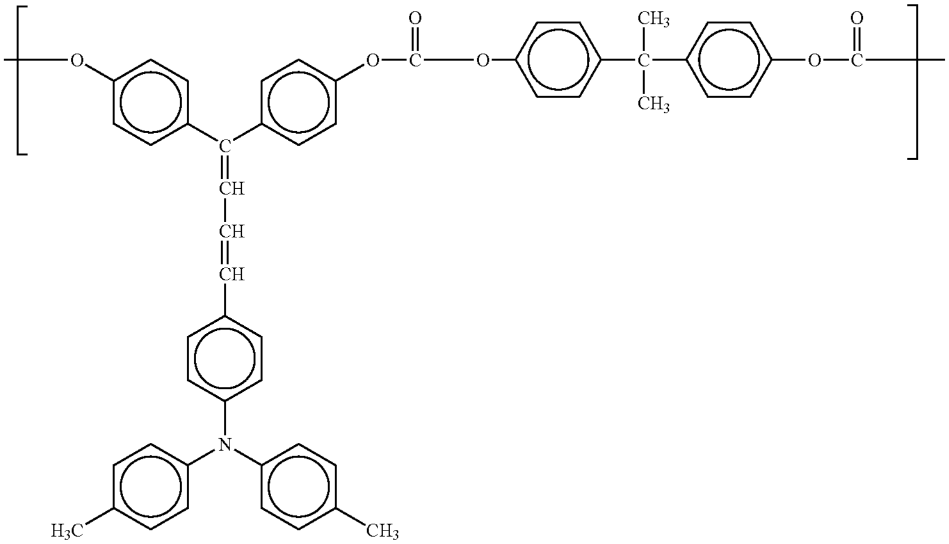
Specific compound 16
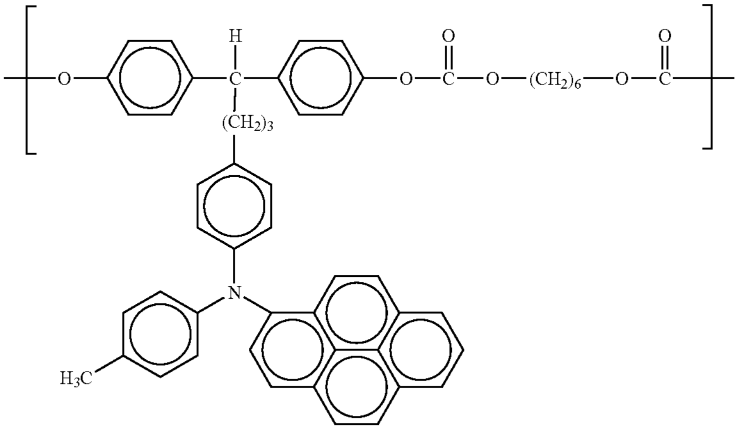
Specific compound 17
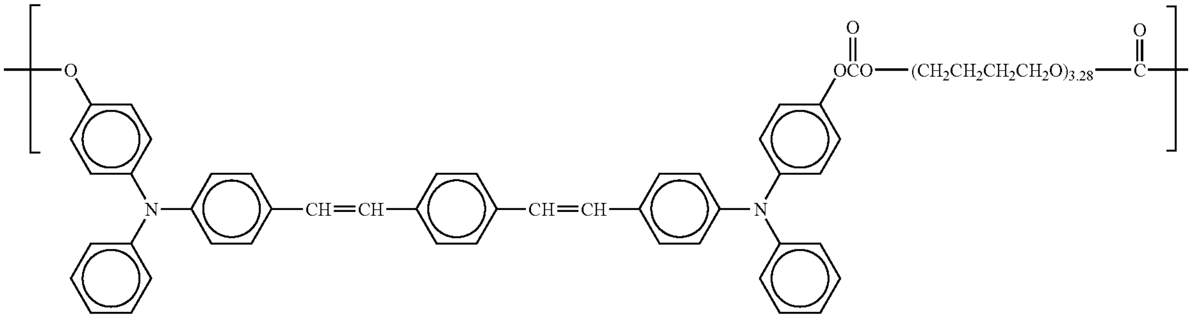
Specific compound 18
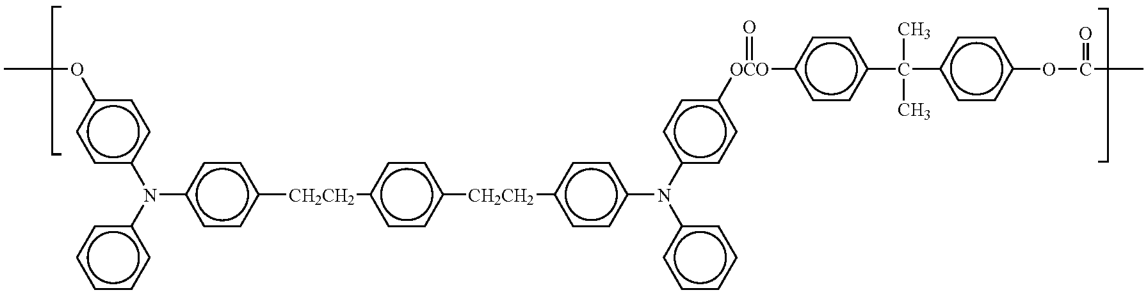

-continued
Specific compound 19
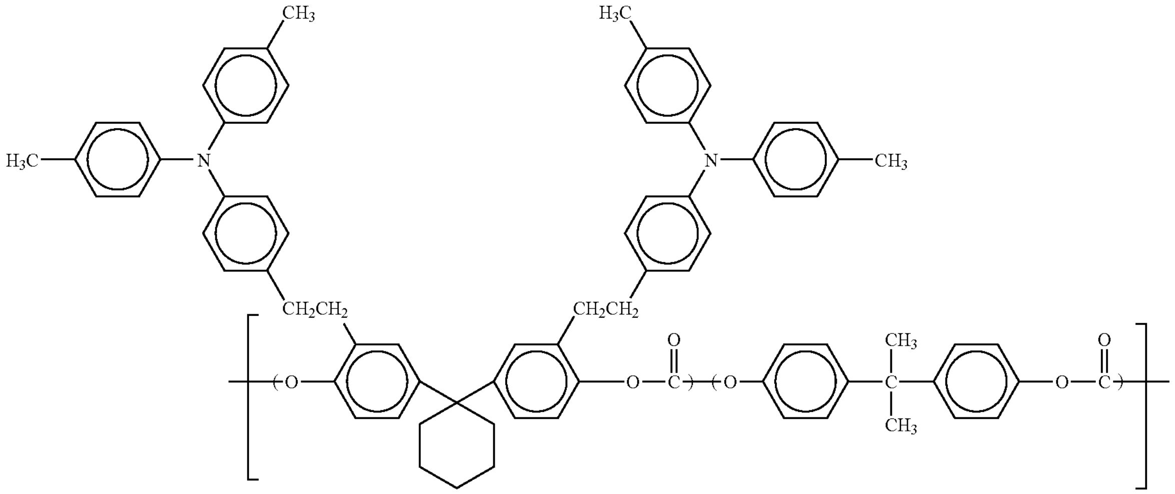
Specific compound 20
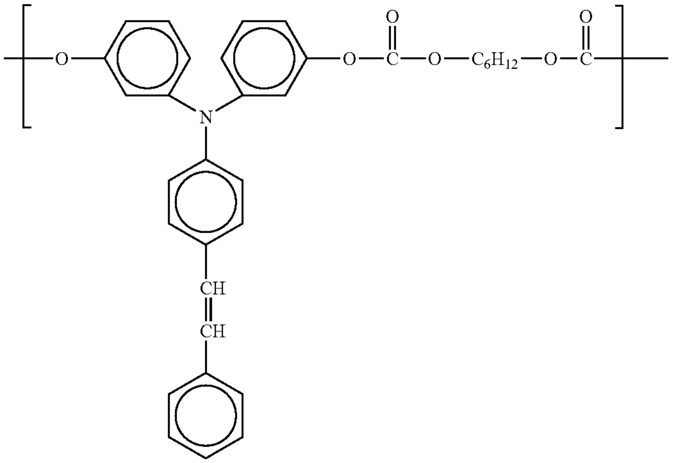
Specific compound 21
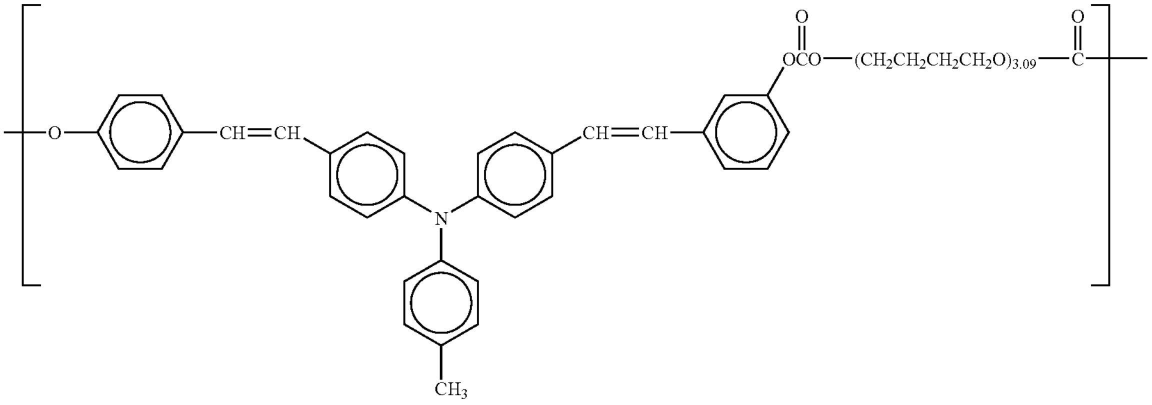

-continued
Specific compound 22
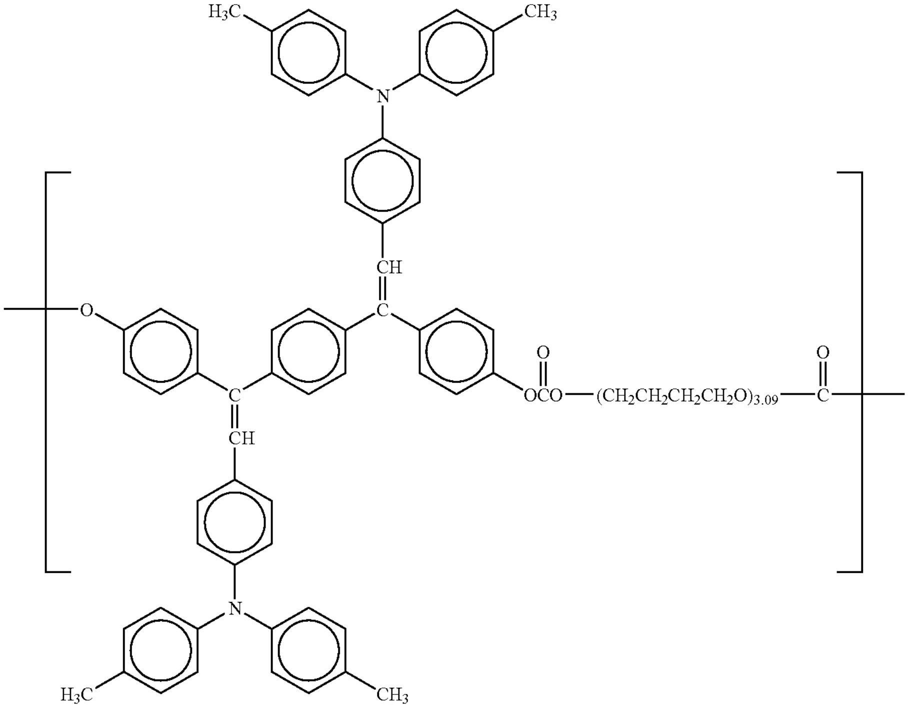
Specific compound 23
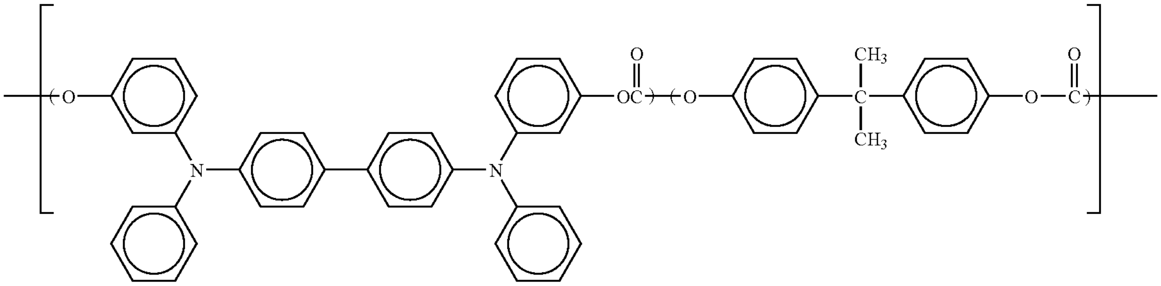
Specific compound 24
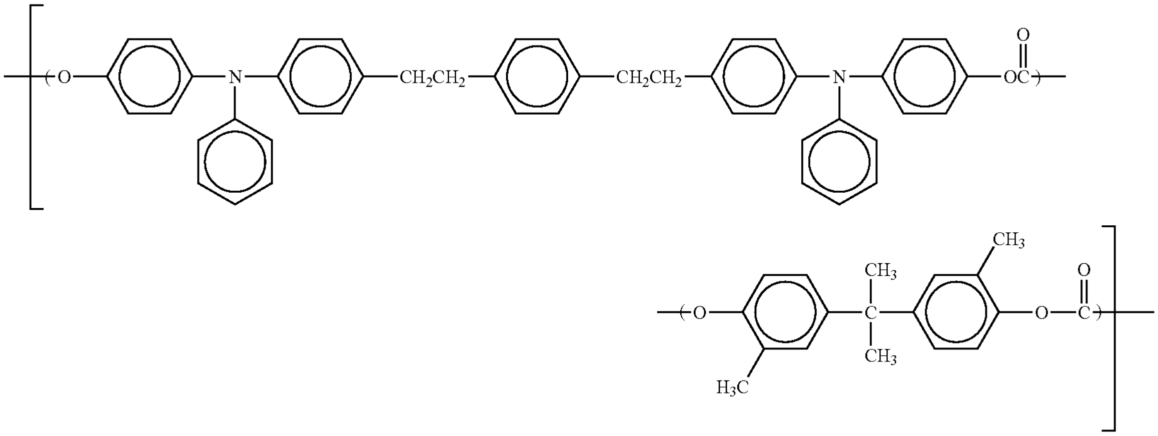

-continued
Specific compound 25
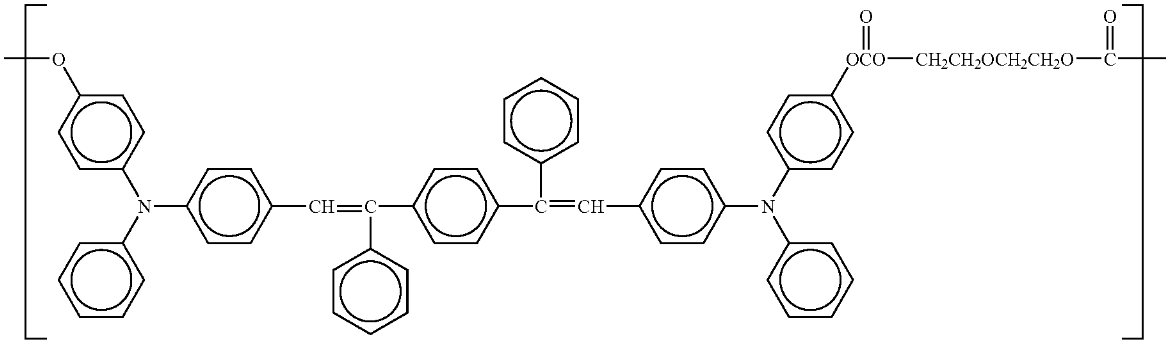
Specific compound 26
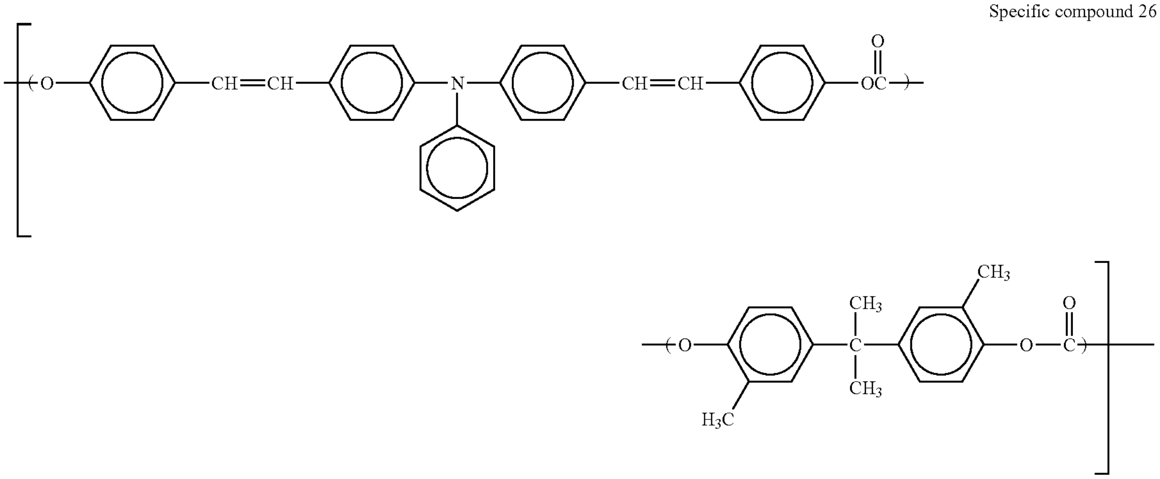
Specific compound 27
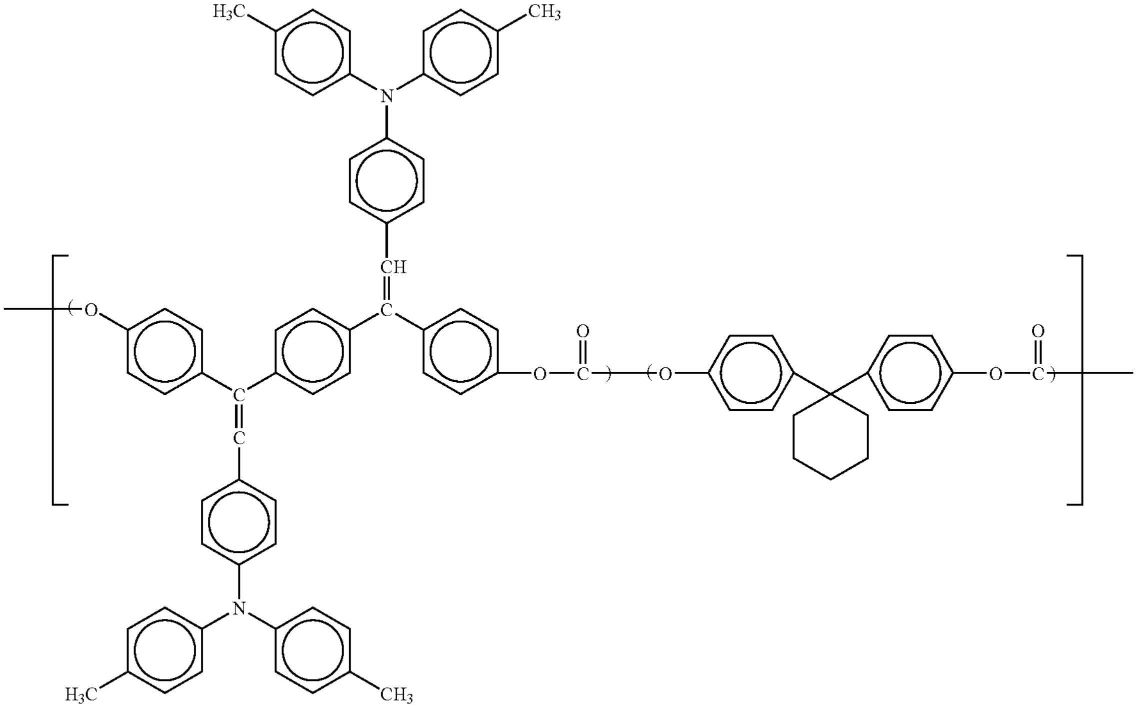

-continued
Specific compound 28
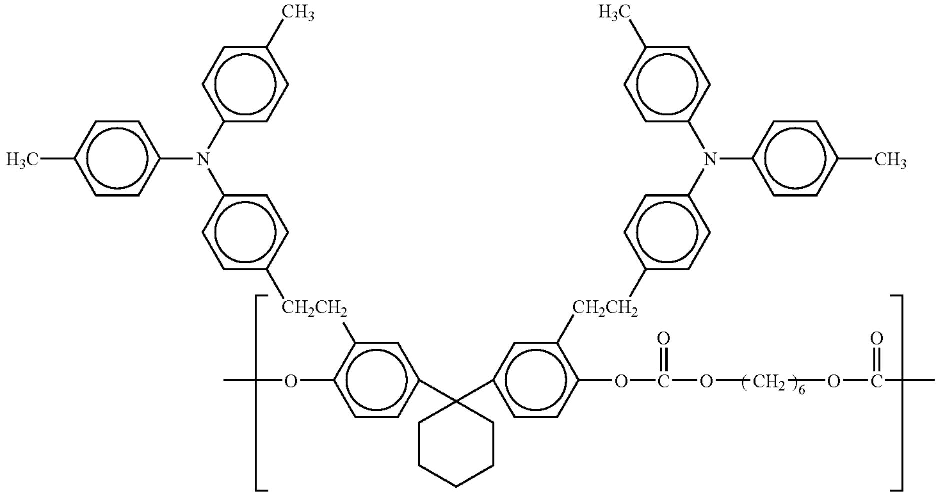
Specific compound 29
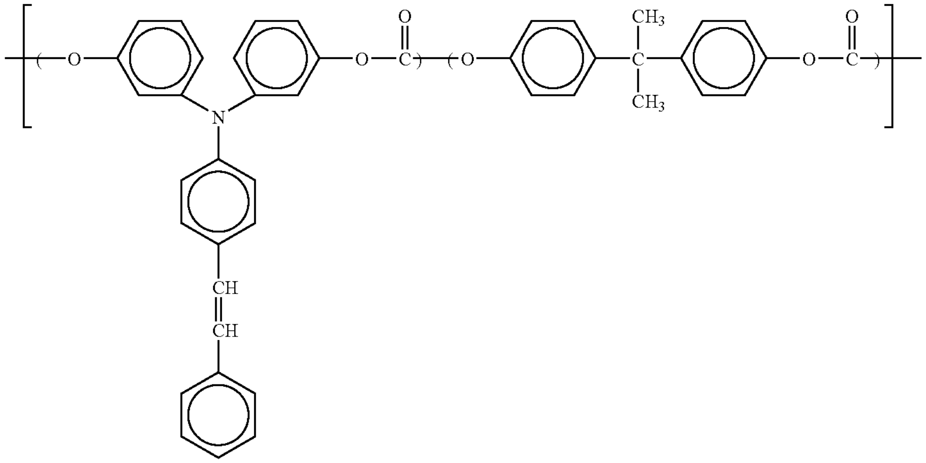
Specific compound 30
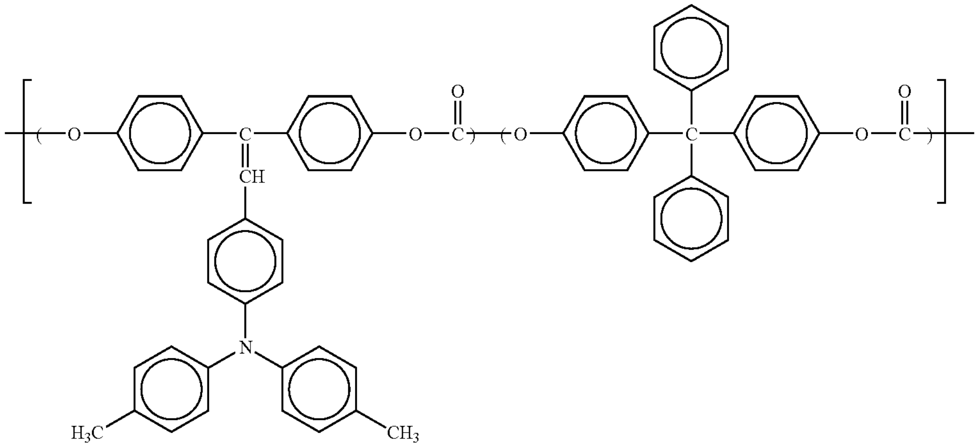

-continued

Specific compound 31

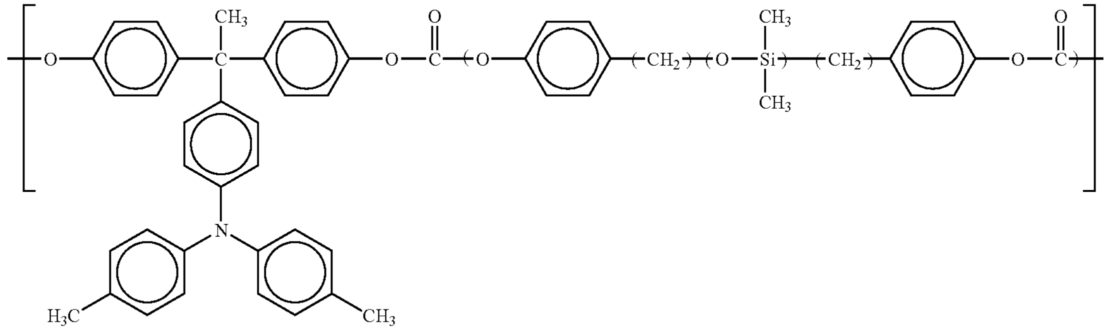

These charge transport polymers having a triarylamine group in their main chain and/or side chain include homopolymers, random copolymers, alternating copolymers, and block copolymers. Since these charge transport polymers are used as a binder resin, the polymers are needed to have a film formability. Therefore, the polystyrene-conversion weight average molecular weight thereof, which can be measured by a gel permeation chromatography method, is preferably from 10,000 to 500,000, and more preferably from 50,000 to 400,000.

These charge transport polymers have been disclosed in JOPs 8-269183, 9-71642, 9-104746, 9-272735, 11-29634, 9-235367, 9-87376, 9-110976, 9-268226, 9-221544, 9-227669, 9-157378, 9-302084, 9-302085, and 2000-26590.

The thickness of the protective layer is preferably 0.1 to 10 μm, and more preferably from 2 to 6 μm. When the thickness is too thin, satisfactory durability cannot be necessarily obtained. When the thickness is too thick, there is a case in which the residual potential increases and/or the resolution of the produced images deteriorates.

The protective layer 39 may include one or more additives such as plasticizers, leveling agents, lubricants, etc.

The outermost layer of the photoreceptor of the present invention preferably includes an antioxidant. Suitable antioxidants for use in the outermost layer include known antioxidants, ultraviolet absorbents and photo-stabilizers, such as phenol compounds, hindered phenol compounds, hindered amine compounds, paraphenylenediamine compounds, hydroquinone compounds, sulfur-containing organic compounds, phosphorus-containing organic compounds, benzophenone compounds, salicylate compounds, benzotriazole compounds, quenchers (metal complexes), etc.

Among these antioxidants, compounds having both a hindered phenol structure and a hindered amine structure are preferably used to prevent the resultant photoreceptor from being deteriorated by an active gas such as ozone and NOx and to stably produce good images.

The hindered phenol structure is defined as a structure in which a bulky atomic group is present on both ortho positions of the hydroxyl group of phenol. The hindered amine structure is defined as a structure in which a bulky atomic group is present near the nitrogen atom of an amine. Aromatic amines and aliphatic amines are included in hindered amines. In the present invention hindered amines including a 2,2,6,6-tetramethylpiperidine structure are more preferably used.

The reason why these compounds prevent the resultant photoreceptor from being deteriorated by an active gas is not clear, but is considered to be as follows. Since a bulky atomic group is present, steric hindrance is produced and thereby the heat vibration of the nitrogen atom of the amine structure or the hydroxyl group of the phenol structure can be prevented and the radical state of the compound can be stabilized. Therefore the influence of the active gases can be prevented.

In the present invention, known compounds having both a hindered phenol structure and a hindered amine structure can be used. Among such compounds, 1-[2-{3-(3,5-di-t-butyl-4-hydroxyphenyl)propionyloxy}ethyl]-4-{3-(3,5-di-t-butyl-4-hydroxylphenyl) propionyloxy}-2, 2, 6, 6-tetramethylpyridine, whose formula is shown below as a formula (11), is preferably used because of being useful for preventing deterioration of resolution due to ozone and NOx gases.

(11)

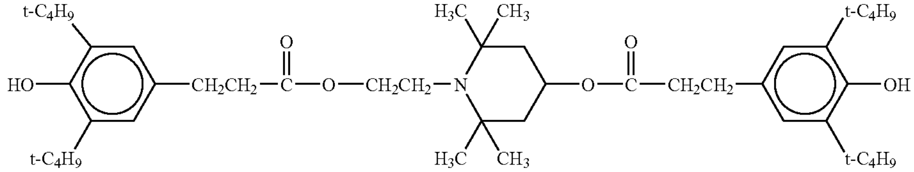

When a filler is included in an outermost layer of a photoreceptor, active gasses such as ozone and NOx gases tend to be adsorbed on the filler and therefore the blurred image problem occurs more frequently than in the case of a photoreceptor having an outermost layer including no filler. By including such a compound having the above-mentioned formula in the outermost layer, the blurred image problem can be prevented. Namely, by using such a compound together with a filler, image qualities can be further improved.

The content of the compound having both a hindered phenol structure and a hindered amine structure is preferably from 0.1 to 20% by weight, and more preferably from 1 to 15% by weight, based on the weight of the filler used. When the content is too low, the effect on preventing the blurred image problem due to active gasses such as ozone and NOx gasses is decreased when the photoreceptor is repeatedly used. To the contrary, when the content is too high, problems such that abrasion resistance deteriorates and residual potential increases tend to occur.

In the outermost layer of the photoreceptor of the present invention, the content of the compound having both a hindered phenol structure and a hindered amine structure is preferably not less than the organic compound having an acid value of from 10 to 700 mgKOH/g to enhance the effect to prevent the blurred image problem due to active gasses and products generated due to corona discharging.

When the coating liquid for the outermost layer is prepared, a filler is preferably dispersed in an organic solvent together with an organic compound having an acid value of from 10 to 700 mgKOH/g using a dispersion device such as ball mills, attritors, sand mills, shakers or supersonic dispersion machines. Among these dispersion devices, ball mills are preferable because the filler is effectively contacted with the organic compound having the specific acid value and impurities are hardl mixed from outside.

Suitable organic solvents for use in the outermost layer coating liquid include tetrahydrofuran, dioxane, toluene, dichloromethane, monochlorobenzene, dichloroethane, cyclohexanone, methyl ethyl ketone, acetone, etc. A solvent having high viscosity is preferable when a coating liquid is prepared, and a volatile solvent is preferable in view of drying. Therefore it is preferable to select a solvent fulfilling such requirements. It is preferable to use a mixture solvent if there is no solvent fulfilling such requirements. This method is useful for improving the dispersion and dispersion stability of the filler used and the film qualities of the resultant layer.

Suitable dispersing elements include known media such as zirconia, alumina, agate, glass, etc. Among these media, alumina is preferable in view of dispersion efficiency and residual potential decreasing effect. When zirconia is used as a dispersing element, zirconia is abraded during the dispersion process, resulting in contamination of zirconia in the coating liquid, and thereby residual potential of the resultant photoreceptor tends to increase and the filler tends to easily precipitate in the resultant coating liquid.

When alumina is used as a dispersing element, the abrasion amount of alumina is much less than zirconia, and therefore the influence on residual potential is very little. Therefore alumina is preferable as the dispersing element. In addition, it is preferable to use alumina as a filler when alumina balls are used as the dispersing element.

It is preferable to disperse a filler and an organic compound having an acid value of from 10 to 700 mgKOH/g in an organic solvent before mixing a binder resin to prevent agglomeration and precipitation of the filler, i.e., to improve dispersion of the filler. A binder resin, a CTM and an antioxidant may be added in the mixture of the filler, organic compound and solvent before the dispersion process, however dispersion of the filler often deteriorates slightly. Therefore, it is preferable that a solution in which the binder resin, CTM and antioxidant are dissolved in an organic solvent is added to the dispersion of the filler, organic compound and solvent.

The thus prepared outermost layer coating liquid can be coated by a coating liquid such as dip coating methods, spray coating methods, bead coating methods, nozzle coating methods, spinner coating methods and ring coating methods. Among these coating methods, dip coating methods, ring coating methods and spray coating methods are preferably used for coating the photosensitive layer or CTL, which is the outermost layer and includes a filler, as shown in FIGS. 1 and 2. When a filler is included such a photosensitive layer or CTL, the concentration of the filler may change by gradation such that the concentration in the surface portion is higher than that in the bottom portion of the layer. Alternatively, the photosensitive or CTL may include plural layers such that the concentration of the filler in a layer is heightened by gradation in the upward (surface) direction.

On the other hand, when forming the protective layer, which is the outermost layer and includes a filler, as shown in FIGS. 3 to 5, spray coating methods are preferably used. This is because the layer thickness can be easily controlled, dispersion of the filler in the resultant layer is good, and coating properties are good. The protective layer may be formed by performing the coating operation once, however it is preferable to perform the coating operation plural times to form a protective layer in which a filler is uniformly dispersed, resulting in decrease of residual potential, and improvement of resolution of the resultant images and abrasion resistance of the resultant protective layer. In addition, coating properties can be improved, i.e., occurrence of coating defects can be prevented.

In the photoreceptor of the present invention, an undercoat layer may be formed between the substrate 31 and the photosensitive layer (i.e., the photosensitive layer 33 in FIGS. 1 and 3, the CGL 35 in FIGS. 2 and 4, and the CTL in FIG. 5).

The undercoat layer typically includes a resin as a main component. Since a photosensitive layer is typically formed on the undercoat layer by coating a liquid including an organic solvent, the resin in the undercoat layer preferably has good resistance to general organic solvents.

Specific examples of such resins include water-soluble resins such as polyvinyl alcohol resins, casein and polyacrylic acid sodium salts; alcohol soluble resins such as nylon copolymers and methoxymethylated nylon resins; and thermosetting resins capable of forming a three-dimensional network such as polyurethane resins, melamine resins, alkyd-melamine resins, epoxy resins and the like.

The undercoat layer may include a fine powder of metal oxides such as titanium oxide, silica, alumina, zirconium oxide, tin oxide and indium oxide to prevent occurrence of moiré in the resultant images and to decrease residual potential of the resultant photoreceptor.

The undercoat layer can also be formed by coating a coating liquid using a proper solvent and a proper coating method mentioned above for use in the photosensitive layer.

The undercoat layer may be formed using a silane coupling agent, titanium coupling agent or a chromium coupling agent.

In addition, a layer of aluminum oxide which is formed by an anodic oxidation method and a layer of an organic compound such as polyparaxylylene or an inorganic compound such as SiO, $SnO_2$, $TiO_2$, ITO or $CeO_2$ which is formed by a vacuum evaporation method is also preferably used as the undercoat layer.

The thickness of the undercoat layer is preferably 0 to 5 μm.

In the photoreceptor of the present invention, an intermediate layer may be formed between the undercoat layer and the photosensitive layer, or the photosensitive layer and the protective layer. The intermediate layer includes a resin as a main component. Specific examples of the resin include polyamides, alcohol soluble nylons, water-soluble polyvinyl butyral, polyvinyl butyral, polyvinyl alcohol, and the like. The intermediate layer can be formed by one of the above-mentioned known coating methods. The thickness of the intermediate layer is preferably from 0.05 to 2 μm.

In the photoreceptor of the present invention, one or more additives such as antioxidants, plasticizers, lubricants, ultraviolet absorbents, low molecular weight charge transport materials and leveling agents can be used in one or more layers of the CGL, CTL, undercoat layer, protective layer and intermediate layers to improve the stability to withstand environmental conditions, namely to avoid decrease of photosensitivity and increase of residual potential.

Suitable antioxidants for use in the layers of the photoreceptor include the following compounds but are not limited thereto.

(a) Phenolic Compounds 2,6-di-t-butyl-p-cresol, butylated hydroxyanisole, 2,6-di-t-butyl-4-ethylphenol, n-octadecyl-3-(4'-hydroxy-3',5'-di-t-butylphenol), 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl)propionate]methane, bis[3,3'-bis(4'-hydroxy-3'-t-butylphenyl)butyric acid]glycol ester, tocophenol compounds, and the like.

(b) Paraphenylenediamine Compounds

N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, N,N'-dimethyl-N,N'-di-t-butyl-p-phenylenediamine, and the like.

(c) Hydroquinone Compounds 2,5-di-t-octylhydroquinone, 2,6-didodecylhydroquinone, 2-dodecylhydtoquinone, 2-dodecyl-5-chlorohydroquinone, 2-t-octyl-5-methylhydroquinone, 2-(2-octadecenyl)-5-methylhydroquinone and the like.

(d) Organic Sulfur-Containing Compounds dilauryl-3,3'-thiodipropionate, distearyl-3,3'-thiodipropionate, ditetradecyl-3,3'-thiodipropionate, and the like.

(e) Organic Phosphorus-Containing Compounds triphenylphosphine, tri(nonylphenyl)phosphine, tri(dinonylphenyl)phosphine, tricresylphosphine, tri(2,4-dibutylphenoxy)phosphine and the like.

Suitable plasticizers for use in the layers of the photoreceptor include the following compounds but are not limited thereto:

(a) Phosphoric Acid Esters triphenyl phosphate, tricresyl phosphate, trioctyl phosphate, octyldiphenyl phosphate, trichloroethyl phosphate, cresyldiphenyl phosphate, tributyl phosphate, tri-2-ethylhexyl phosphate, triphenyl phosphate, and the like.

(b) Phthalic Acid Esters dimethyl phthalate, diethyl phthalate, diisobutyl phthalate, dibutyl phthalate, diheptyl phthalate, di-2-ethylhexyl phthalate, diisooctyl phthalate, di-n-octyl phthalate, dinonylphthalate, diisononylphthalate, diisodecyl phthalate, diundecyl phthalate, ditridecyl phthalate, dicyclohexyl phthalate, butylbenzyl phthalate, butyllauryl phthalate, methyloleyl phthalate, octyldecyl phthalate, dibutyl fumarate, dioctyl fumarate, and the like.

(c) Aromatic Carboxylic Acid Esters trioctyl trimellitate, tri-n-octyl trimellitate, octyl oxybenzoate, and the like.

(d) Dibasic Fatty Acid Esters dibutyl adipate, di-n-hexyl adipate, di-2-ethylhexyl adipate, di-n-octyl adipate, n-octyl-n-decyl adipate, diisodecyl adipate, dialkyl adipate, dicapryl adipate, di-2-etylhexyl azelate, dimethyl sebacate, diethyl sebacate, dibutyl sebacate, di-n-octyl sebacate, di-2-ethylhexyl sebacate, di-2-ethoxyethyl sebacate, dioctyl succinate, diisodecyl succinate, dioctyl tetrahydrophthalate, di-n-octyl tetrahydrophthalate, and the like.

(e) Fatty Acid Ester Derivatives butyl oleate, glycerin monooleate, methyl acetylricinolate, pentaerythritol esters, dipentaerythritol hexaesters, triacetin, tributyrin, and the like.

(f) Oxyacid Esters methyl acetylricinolate, butyl acetylricinolate, butylphthalylbutyl glycolate, tributyl acetylcitrate, and the like.

(g) Epoxy Compounds epoxydized soybean oil, epoxydized linseed oil, butyl epoxystearate, decyl epoxystearate, octyl epoxystearate, benzyl epoxystearate, dioctyl epoxyhexahydrophthalate, didecyl epoxyhexahydrophthalate, and the like.

(h) Dihydric Alcohol Esters diethylene glycol dibenzoate, triethylene-glycol di-2-ethylbutyrate, and the like.

(i) Chlorine-Containing Compounds chlorinated paraffin, chlorinated diphenyl, methyl esters of chlorinated fatty acids, methyl esters of methoxychlorinated fatty acids, and the like.

(j) Polyester Compounds polypropylene adipate, polypropylene sebacate, acetylated polyesters, and the like.

(k) Sulfonic Acid Derivatives p-toluene sulfonamide, o-toluene sulfonamide, p-toluene sulfoneethylamide, o-toluene sulfoneethylamide, toluene sulfone-N-ethylamide, p-toluene sulfone-N-cyclohexylamide, and the like.

(l) Citric Acid Derivatives triethyl citrate, triethyl acetylcitrate, tributyl citrate, tributyl acetylcitrate, tri-2-ethylhexyl acetylcitrate, n-octyldecyl acetylcitrate, and the like.

(m) Other Compounds terphenyl, partially hydrated terphenyl, camphor, 2-nitro diphenyl, dinonyl naphthalene, methyl abietate, and the like.

Suitable lubricants for use in the layers of the photoreceptor include the following compounds but are not limited thereto.

(a) Hydrocarbons liquid paraffins, paraffin waxes, micro waxes, low molecular weight polyethylenes, and the like.

(b) Fatty Acids lauric acid, myristic acid, palmitic acid, stearic acid, arachidic acid, behenic acid, and the like.

(c) Fatty Acid Amides

Stearic acid amide, palmitic acid amide, oleic acid amide, methylenebisstearamide, ethylenebisstearamide, and the like.

(d) Ester Compounds lower alcohol esters of fatty acids, polyhydric alcohol esters of fatty acids, polyglycol esters of fatty acids, and the like.

(e) Alcohols cetyl alcohol, stearyl alcohol, ethylene glycol, polyethylene glycol, polyglycerol, and the like.

(f) Metallic Soaps lead stearate, cadmium stearate, barium stearate, calcium stearate, zinc stearate, magnesium stearate, and the like.

(g) Natural Waxes

Carnauba wax, candelilla wax, beeswax, spermaceti, insect wax, montan wax, and the like.

(h) Other Compounds silicone compounds, fluorine compounds, and the like.

Suitable ultraviolet absorbing agents for use in the layers of the photoreceptor include the following compounds but are not limited thereto.

(a) Benzophenone Compounds 2-hydroxybenzophenone, 2,4-dihydroxybenzophenone, 2,2',4-trihydroxybenzophenone, 2,2',4,4'-tetrahydroxybenzophenone, 2,2'-dihydroxy-4-methoxybenzophenone, and the like.

(b) Salicylate Compounds phenyl salicylate, 2,4-di-t-butylphenyl-3,5-di-t-butyl-4-hydroxybenzoate, and the like.

(c) Benzotriazole Compounds (2'-hydroxyphenyl)benzotriazole, (2'-hydroxy-5'-methylphenyl)benzotriazole, (2'-hydroxy-3'-t-butyl-5'-methylphenyl)-5-chlorobenzotriazole, and the like.

(d) Cyano Acrylate Compounds ethyl-2-cyano-3,3-diphenyl acrylate, methyl-2-carbomethoxy-3-(paramethoxy)acrylate, and the like.

(e) Quenchers (Metal Complexes)

nickel (2,2'-thiobis(4-t-octyl)phenolate)-n-butylamine, nickeldibutyldithiocarbamate, cobaltdicyclohexyldithiophosphate, and the like.

(f) HALS (Hindered Amines)

bis(1,2,2,6,6-tetramethyl-4-piperidyl) sebacate, bis(1,2,2,6,6-pentamethyl-4-piperidyl)sebacate, 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetrametylpyridine, 8-benzyl-7,7,9,9-tetramethyl-3-octyl-1,3,8-triazaspiro[4,5]undecane-2,4-dione, 4-benzoyloxy-2,2,6,6-tetramethylpiperidine, and the like.

Hereinafter the image forming method and image forming apparatus of the present invention will be explained referring to drawings.

Figure 6:
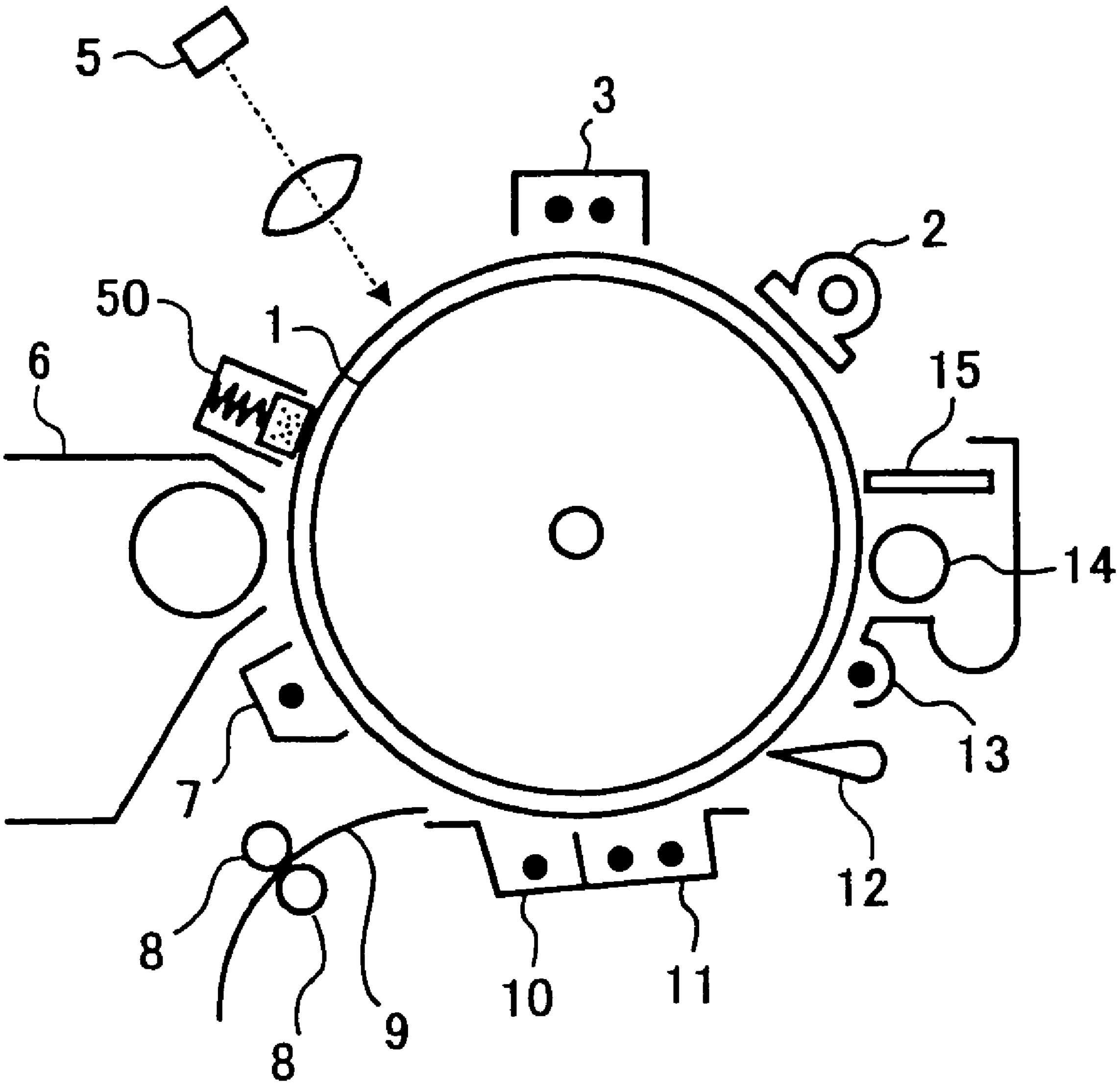
FIG. 6 is a schematic view illustrating an embodiment of the image forming apparatus of the present invention and for explaining the image forming method of the present invention.

FIG. 6 is a schematic view for explaining an embodiment of the image forming method and apparatus of the present invention.

In FIG. 6, numeral 1 denotes a photoreceptor. The photoreceptor 1 is the photoreceptor of the present invention which includes at least a photosensitive layer located on an electroconductive substrate, wherein the outermost layer includes a filler, a binder resin and an organic compound having an acid value of from 10 to 700 mgKOH/g.

Around the photoreceptor 1, a discharging lamp 2, a charger 3 configured to charge the photoreceptor 1, an imagewise light irradiator 5 configured to irradiate the photoreceptor 1 with imagewise light to form an electrostatic latent image on the photoreceptor 1, an image developer 6 configured to develop the latent image with a toner to form a toner image on the photoreceptor 1, a cleaning unit including a cleaning brush 14 and a cleaning blade 15 configured to clean the surface of the photorerceptor 1 are arranged while contacting or being set closely to the photoreceptor 1. In addition, a lubricant applicator 50 configured to apply a lubricant such as zinc stearate and fluorine-containing compounds, e.g., polytetrafluoroethylene, to the surface of the photoreceptor 1 may be provided. The toner image formed on the photoreceptor 1 is transferred on a receiving paper 9 fed by a pair of registration rollers 8 at the transfer device (i.e., a pair of a transfer charger 10 and a separating charger 11). The receiving paper 9 having the toner image thereon is separated from the photoreceptor 1 by a separating pick 12.

In the image forming apparatus of the present invention, a pre-transfer charger 7 and a pre-cleaning charger 13 may be arranged if desired.

Although the photoreceptor 1 has a cylindrical shape, but sheet photoreceptors or endless belt photoreceptors can be used.

As the charger 3, the pre-transfer charger 7, the transfer charger 10, the separating charger 11 and the pre-cleaning charger 13, all known chargers such as corotrons, scorotrons, solid state chargers, roller chargers and brush chargers can be used.

As the charging devices, non-contact chargers such as corona chargers, and contact chargers such as charging rollers and charging brushes are typically used. In the present invention, both non-contact and contact chargers can be used. In particular, by using charging rollers, the amount of generated ozone can be drastically reduced, and therefore the photoreceptor can be maintained to be stable and deterioration of image qualities can be prevented-when the photoreceptor is repeatedly used.

However, when a charging roller is repeatedly used while contacting a photoreceptor, the charging roller tends to be contaminated, and thereby the photoreceptor is also contaminated, resulting in production of undesired images and deterioration of abrasion resistance of the photoreceptor. In particular, when a photoreceptor having good abrasion resistance is used, the surface of the photoreceptor is hardly refaced. Therefore it is needed to improve the contamination of the charging roller.

In the present invention, it is preferable to use a proximity charger in which a charging roller is preferably set closely to the photoreceptor of the present invention such that pollutants do not adhere to the charging roller or the pollutants can be easily removed. In this proximity charger, the gap between the charging roller and the photoreceptor is preferably not greater than 80 μm, and preferably not greater than 50 μm.

However, when this proximity charging roller is used, there is a case in which charging becomes uneven and therefore the photoreceptor is unevenly charged. In order to improve this uneven charging problem, a DC voltage overlapped with an AC voltage is preferably applied to the charging roller. By using this method, contamination of the photoreceptor due to ozone, contamination of the charging roller and uneven charging can be lightened at the same time. Therefore, by using this method and a photoreceptor having good abrasion resistance, the durability of the photoreceptor can be further improved and high quality images can be produced for a long period of time.

As the transfer device, the above-mentioned chargers can be used. Among the chargers, a combination of the transfer charger 10 and the separating charger 11 as shown in FIG. 6 is preferably used. In FIG. 6, a toner image formed on the photoreceptor 1 is directly transferred onto the receving paper 9. However, it is preferable to transfer a toner image on the photoreceptor 1 onto an intermediate transfer medium and then retransfer the toner image onto a paper to improve the durability of the photoreceptor and produce high quality images.

Since the photoreceptor of the present invention has good abrasion resistance, i.e., the photoreceptor is hardly refaced, the pollutants adhered on the surface of the photoreceptor is hardly removed. Among the pollutants adhered on the surface of the photoreceptor, pollutants such as materials generated by charging and external additives included in the toner used cause undesired images particularly under high humidity conditions. In addition, paper dust is also a pollutant, and not only causes undesired images but deteriorates abrasion resistance and unevenly abrades the photoreceptor. Therefore, the non-contact charging method mentioned above in which the photoreceptor does not directly contact a paper is preferable to produce high quality images.

In addition, the image forming method using an intermediate transfer medium is particularly useful for producing full color images. Namely, by transferring plural color toner images on an intermediate transfer medium and then transferring the color toner images on a receiving paper at the same time on a paper, a high quality full color image with less positional variation of the color images. However, this method needs four scanning processes to form a full color image, and therefore a trouble which occurs is that conventional photoreceptors have too low durability to be used for the method.

The photoreceptor of the present invention not only has high durability but can produce high quality images without blurring without using a drum heater. Therefore, the photoreceptor is preferably used for the image forming apparatus using an intermediate transfer medium. As the intermediate transfer medium in the present invention, various known media such as drum transfer media and belt transfer media can be used.

Suitable light sources for use in the imagewise light irradiator 5 and the discharging lamp 2 include fluorescent lamps, tungsten lamps, halogen lamps, mercury lamps, sodium lamps, light emitting diodes (LEDs), laser diodes (LDs), light sources using electroluminescence (EL), and the like. In addition, in order to obtain light having a desired wave length range, filters such as sharp-cut filters, band pass filters, near-infrared cutting filters, dichroic filters, interference filters, color temperature converting filters and the like can be used.

The above-mentioned lamps can be used for not only the processes mentioned above and illustrated in FIG. 6, but also other processes using light irradiation, such as a transfer process including light irradiation, a discharging process, a cleaning process including light irradiation and a pre-exposure process. In the discharging process, irradiating the photoreceptor with light tends to fatigue the photoreceptor, resulting in deterioration of charging properties and increase of residual potential of the photoreceptor. Therefore, it is preferable to apply an opposite bias to the photoreceptor in the charging process or cleaning process to prolong the life of the photoreceptor.

When the toner image formed on the photoreceptor 1 by the developing unit 6 is transferred onto the receiving paper 9, all of the toner image are not transferred on the receiving paper 9, and residual toner particles remain on the surface of the photoreceptor 1. The residual toner is removed from the photoreceptor 1 by the fur blush 14 or the cleaning blade 15. The residual toner remaining on the photoreceptor 1 can be removed by only a cleaning brush. Suitable cleaning blushes include known cleaning blushes such as fur blushes and mag-fur blushes.

When the cleaning process is performed, the surface of the photoreceptor tends to be acceleratedly abraded or hurt, resulting in production of undesired images. In addition, when the surface of the photoreceptor is contaminated due to insufficient cleaning, not only undesired images are produced but the life of the photoreceptor is seriously shortened. In particular, in the case of the photoreceptor having an outermost layer including a filler to improve the abrasion resistance thereof, the pollutants adhered to the outermost layer are hardly removed. Therefore, a filming problem in which a toner film is formed on the surface of the photoreceptor occurs and production of undesired images is accelerated. Therefore, to improve the cleaning ability of the surface of the photoreceptor is very effective for prolonging the life of the photoreceptor and producing high quality images.

As the method for improving the cleaning ability of a photoreceptor, methods in which the friction coefficient of the surface of the photoreceptor is decreased are known. The friction coefficient decreasing methods include a method in which a lubricant is included in the surface of a photoreceptor and a method in which a lubricant is applied to a photoreceptor from outside.

The former method has an advantage in that various devices can be arranged around a photoreceptor relatively freely. Therefore this method is advantageously used for small-size photoreceptors. However, the method has a drawback in that the friction coefficient increases after long repeated use. To the contrary, in the latter method, the friction coefficient of the photoreceptor can be stably maintained although it is needed to provide a lubricant applicator.

Another friction coefficient decreasing method is to include a lubricant in the toner used. The lubricant included in the toner adheres to the photoreceptor in the developing process. This method has advantages in that various devices can be arranged around a photoreceptor relatively freely and the friction coefficient of the photoreceptor can be stably maintained. Therefore this method is effective for prolonging the life of the photoreceptor and producing high quality images.

Suitable lubricants for use in the present invention include lubricating liquid such as silicone oils and fluorine-containing oils; fluorine-containing resins such as polytetrafluoroethylene (PTFE), perfluoroalkylvinyl ether (PFA) and polyvinylidene fluoride (PVDF); silicone resins, polyolefin resins, silicone greases, fluorine-containing greases, paraffin waxes, fatty acid esters, fatty acid metal salts such as zinc stearate, graphite, molybdenum disulfide, and the like lubricating liquids, solids and powders.

When a lubricant is included in a toner, the lubricant is needed to be a powder. In this case, zinc stearate is preferably used because of hardly producing adverse effects. The content of zinc stearate in a toner is preferably from 0.01 to 0.5% by weight, and more preferably from 0.1 to 0.3% by weight.

When the photoreceptor 1 which is previously charged positively (or negatively) is exposed to imagewise light, an electrostatic latent image having a positive or negative charge is formed on the photoreceptor 1. When the latent image having a positive (or negative) charge is developed with a toner having a negative (or positive) charge, a positive image can be obtained. In contrast, when the latent image having a positive (negative) charge is developed with a toner having a positive (negative) charge, a negative image (i.e., a reversal image) can be obtained. As the developing method, known developing methods can be used. In addition, as the discharging methods, known discharging methods can also be used.

The photoreceptor of the present invention has high durability, and therefore is preferably used for small size photoreceptors. Namely, the photoreceptor of the present invention is very useful for so-called tandem-type electrophotographic image forming apparatus which include plural photoreceptors and corresponding developing units to form plural color toner images in parallel.

Tandem type electrophotographic image forming apparatus typically include yellow, magenta, cyan and black toners and corresponding developing units and photoreceptors. Such tandem-type image forming apparatus have an advantage such that full color images can be produced at a much higher speed than conventional full color image forming apparatus.

Figure 7:
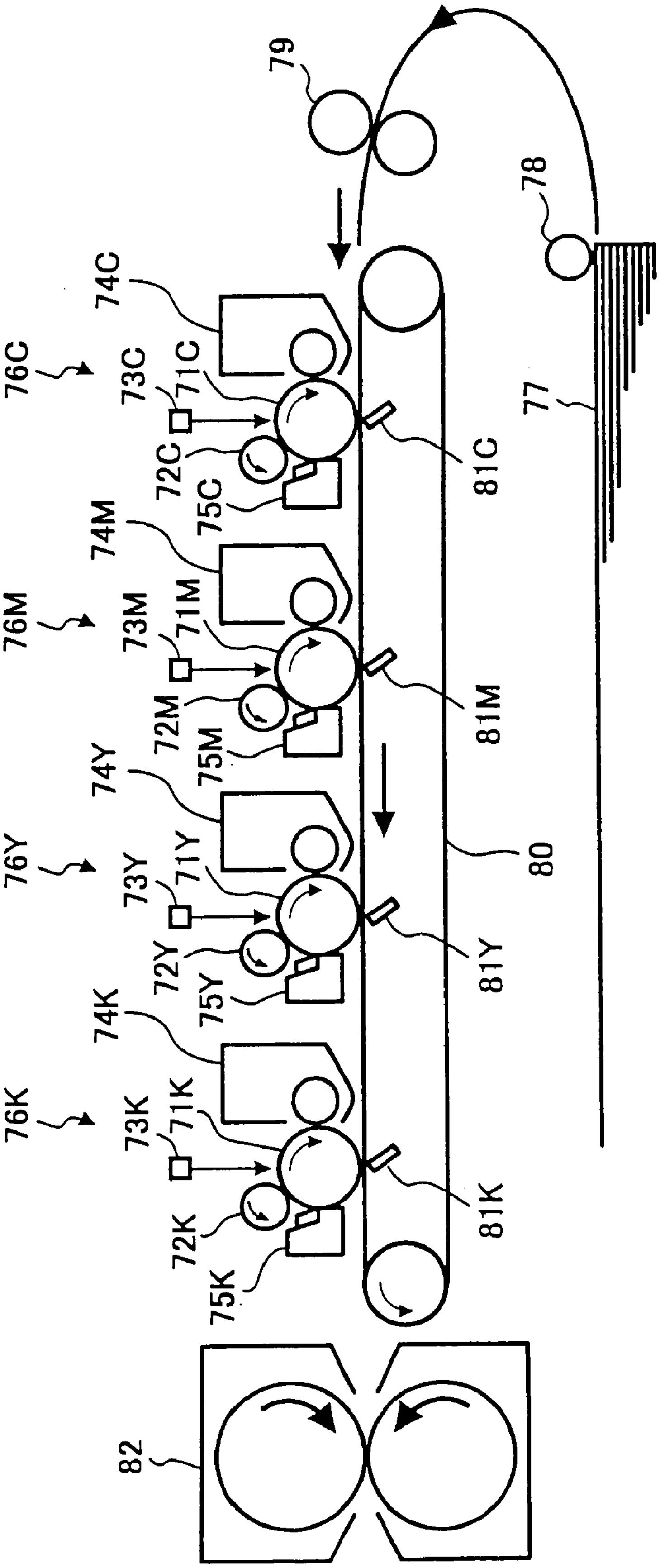
FIG. 7 is a schematic view illustrating another embodiment of the image forming apparatus of the present invention and for explaining the image forming method of the present invention.

FIG. 7 is a schematic view illustrating an embodiment of the tandem type image forming apparatus of the present invention. However, the tandem type image forming apparatus of the present invention is not limited thereto.

In FIG. 7, the tandem type image forming apparatus has a cyan image forming unit 76C, a magenta image forming unit 76M, a yellow image forming unit 76Y and a black image forming unit 76K. Drum photoreceptors 71C, 71M, 71Y and 71K rotate in the direction indicated by the respective arrow. Around the photoreceptors 71C, 71M, 71Y and 71K, chargers 72C, 72M, 72Y and 72K, image developers 74C, 74M, 74Y and 74K, and cleaners 75C, 75M, 75Y and 75K are arranged in this order in the clockwise direction. As the chargers, the above-mentioned chargers which can uniformly charge the surface of the photoreceptors are preferably used. Imagewise light irradiators 73C, 73M, 73Y and 73K irradiate with laser light a surface point of the respective photoreceptors located between the chargers and the image developers to form an electrostatic latent image on the respective photoreceptor. The four image forming units 76C, 76M, 76Y and 76K are arranged along an intermediate transfer belt 80. The intermediate transfer belt 80 contacts the respective photoreceptor 71C, 71M, 71Y or 71K at an image transfer point located between the respective image developer and the respective cleaner to receive color images formed on the photoreceptors. At the backside of each image transfer point of the intermediate transfer belt 80, transfer brushes 81C, 81M, 81Y and 81K are arranged to apply a transfer bias to the intermediate transfer belt 80.

The above-mentioned tandem type image forming apparatus can transfer plural color images at the same time, and therefore full color images can be produced at a high speed. Since the image forming apparatus needs at least four photoreceptors, the apparatus becomes large in size. In addition, the abrasions of the four photoreceptors tend to be different when the consumption of the color toners is different, resulting in occurrence of problems such that color reproducibility deteriorates and undesired images are produced.

The photoreceptor of the present invention has good abrasion resistance. Therefore, when the photoreceptor is used as a small size photoreceptor, the difference in abrasion amount between the four photoreceptors can be minimized, and thereby deterioration of photosensitivity and production of undesired images can be prevented, resulting in formation of high quality full color images. In addition, since it is not needed to use a drum heater for preventing the blurred image problem, the tandem type image forming apparatus can be minimized. Therefore, the tandem type image forming apparatus of the present invention can produce full color images at a high speed while the size of the apparatus is almost the same as the conventional monochrome image forming apparatus.

Namely, by using the photoreceptor of the present invention for a combination of the above-mentioned tandem type image forming method and the intermediate transfer method, the life of the photoreceptor can be further prolonged while high quality full color images can be produced for a long period of time.

In FIG. 7, numerals 77, 78 and 79 denote a receiving paper, a feeding roller configured to feed the receiving paper 77, and a pair of registration rollers configured to timely feed the receiving paper to the image transfer points. Numeral 82 denotes a fixer to fix the full color toner image on the receiving paper.

Figure 8:
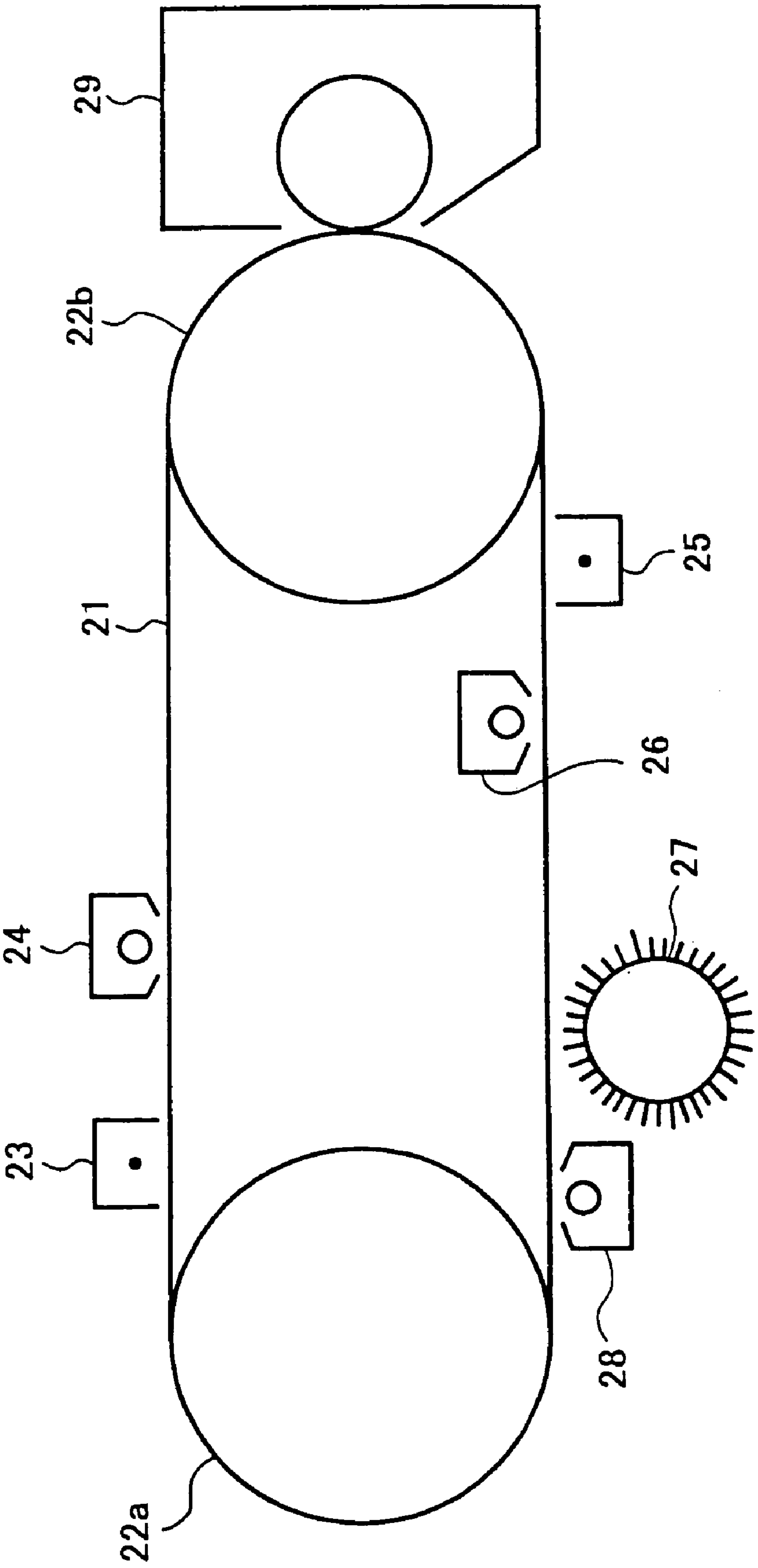
FIG. 8 is a schematic view illustrating yet another embodiment of the image forming apparatus of the present invention and for explaining the image forming method of the present invention.

FIG. 8 is a schematic view illustrating another embodiment of the image forming apparatus of the present invention. In this embodiment, a belt-shaped photoreceptor 21 is used. The photoreceptor 21 is the photoreceptor of the present invention and includes at least a photosensitive layer on an electroconductive substrate, wherein the outermost layer includes at least a filler, a binder resin and an organic compound having an acid value of from 10 to 700 mgKOH/g.

The belt-shaped photoreceptor 21 is rotated by rollers 22*a* and 22*b*. The photoreceptor 21 is charged with a charger 23, and then exposed to imagewise light emitted by an imagewise light irradiator 24 to form an electrostatic latent image on the photoreceptor 21. The latent image is developed with a developing unit 29 to form a toner image on the photoreceptor 21. The toner image is transferred onto a receiving paper (not shown) using a transfer charger 25. After the toner image transferring process, the surface of the photoreceptor 21 is cleaned with a cleaning brush 27 after performing a pre-cleaning light irradiating operation using a pre-cleaning light irradiator 26. Then the photoreceptor 21 is discharged by being exposed to light emitted by a discharging light source 28. In the pre-cleaning light irradiating process, light irradiates the photoreceptor 21 from the side of the substrate thereof. In this case, the substrate has to be light-transmissive.

The image forming apparatus of the present invention is not limited to the image forming units as shown in FIGS. 6-8. For example, in FIG. 8, the pre-cleaning light irradiating operation can be performed from the photosensitive layer side of the photoreceptor 21. In addition, the light irradiation in the light image irradiating process and the discharging process may be performed from the substrate side of the photoreceptor 21.

Further, a pre-transfer light irradiation operation, which is performed before the transferring of the toner image, and a preliminary light irradiation operation, which is performed before the imagewise light irradiation, and other light irradiation operations may also be performed.

The above-mentioned image forming unit may be fixedly set in a copier, a facsimile or a printer. However, the image forming unit may be set therein as a process cartridge. The process cartridge means an image forming unit which includes at least a photoreceptor and a housing. The process cartridge may include one or more of a charger, an imagewise light irradiator, an image developer, an image transferer, a cleaner, and a discharger.

Figure 9:
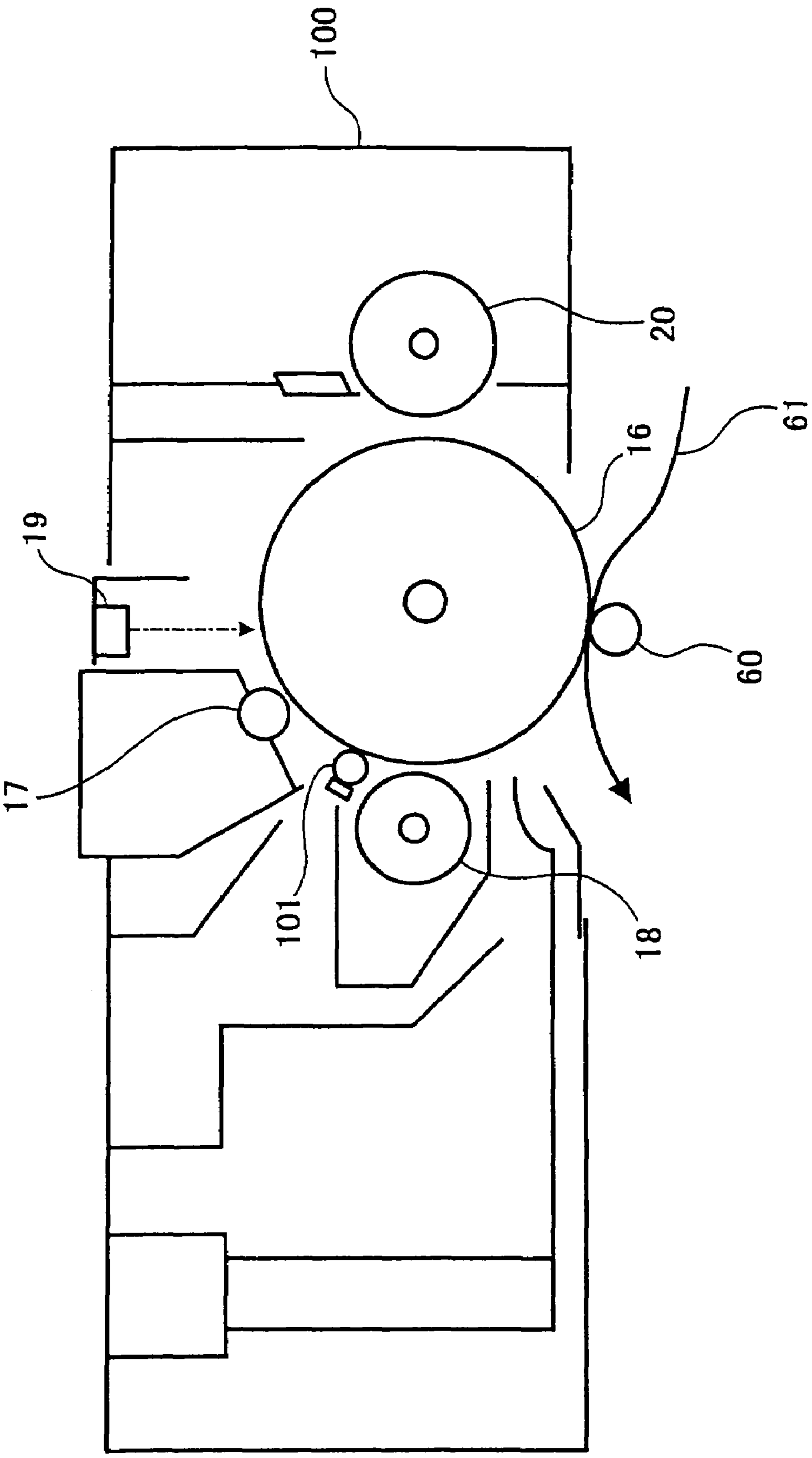
FIG. 9 is a schematic view illustrating an embodiment of the process cartridge of the present invention.

FIG. 9 is a schematic view illustrating an embodiment of the process cartridge of the present invention. In FIG. 9, the process cartridge includes a photoreceptor 16, a charger 17 configured to charge the photoreceptor 16, a cleaning brush 18 configured to clean the surface of the photoreceptor 16, an imagewise light irradiator 19 configured to irradiate the photoreceptor 16 with imagewise light to form an electrostatic latent image on the photoreceptor 16, an image developer (a developing roller) 20 configured to develop the latent image with a toner, an image transferer 60 configured to transfer the toner image onto a receiving paper 61, and a housing 100. The photoreceptor 16 is the photoreceptor of the present invention, and includes at least a photosensitive layer on an electroconductive substrate, wherein the outermost layer includes at least a filler, a binder resin and an organic compound having an acid value of from 10 to 700 mgKOH/g. The process cartridge of the present invention is not limited thereto. For example, a lubricant applicator 101 configured to apply a lubricant to the surface of the photoreceptor 16 can be provided therein.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Protective Layer Coating Liquid Preparation Example 1

The following filler, organic compound having an acid of from 10 to 700 mgKOH/g, and organic solvents were mixed and dispersed for 12 hours using a ball mill containing alumina balls to prepare a dispersion. Then the binder resin and CTM were dissolved in the residue of the solvents and mixed with the above prepared dispersion.

| | |
|---|---|
| α-alumina<br>(SUMICORUNDUM-AA-03 from Sumitomo Chemical Co., Ltd., average primary particle diameter of about 0.3 μm, resistivity of not less than $10^{10}$ Ω · cm, and pH of from 8 to 9) | 3 |
| Polyester resin<br>(acid value of about 35 mgKOH/g) | 0.6 |
| Cyclohexanone | 80 |
| Tetrahydrofuran | 220 |
| Polycarbonate resin<br>(Z-form polycarbonate resin from Teijin Chemical Co., Ltd.) | 6 |
| CTM having the following formula (12)<br>(ionization potential of about 5.4 eV) | 4 |

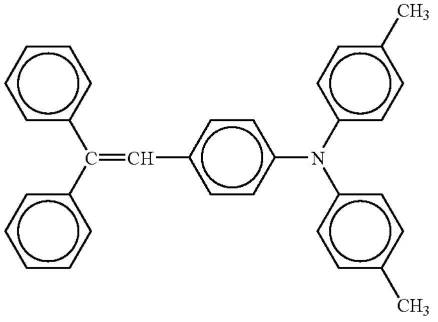

(12)

The pH of the filler is the pH at the isoelectric point of zeta potential. The zeta potential was measured using a zeta potential meter manufactured by Otsuka Electric Co., Ltd.

In addition, the ionization potential was measured with respect to a film of the CTM using an instrument AC-1 manufactured by Riken Keiki Co., Ltd.

Thus, a protective layer coating liquid 1 was prepared.

Protective Layer Coating Liquid Preparation Example 1

The procedure for preparation of the protective layer coating liquid 1 was repeated except that the polyester resin was replaced with the following acrylic resin.

| | |
|---|---|
| Acrylic resin<br>(DIANAL BR-605 from Mitsubishi Rayon Co., Ltd., acid value of about 65 mgKOH/g) | 0.3 |

Thus a protective layer coating liquid 2 was prepared.

Protective Layer Coating Liquid Preparation Example 3

The procedure for preparation of the protective layer coating liquid 2 was repeated except that the acrylic resin was replaced with the following styrene-acrylic resin.

| | |
|---|---|
| Styrene-acrylic resin<br>(FB-1522 from Mitsubishi Rayon Co., Ltd., acid value of about 200 mgKOH/g) | 0.2 |

Thus a protective layer coating liquid 3 was prepared.

Protective Layer Coating Liquid Preparation Example 4

The procedure for preparation of the protective layer coating liquid 3 was repeated except that the styrene-acrylic resin was replaced with the following acrylic acid-hydroxyethyl methacrylate copolymer.

| | |
|---|---|
| Acrylic acid-hydroxyethyl methacrylate copolymer<br>(acid value of about 130 mgKOH/g) | 0.2 |

Thus a protective layer coating liquid 4 was prepared.

Protective Layer Coating Liquid Preparation Example 5

The procedure for preparation of the protective layer coating liquid 3 was repeated except that the styrene-acrylic resin was replaced with the following methacrylic acid-butyl methacrylate copolymer.

| | |
|---|---|
| Methacrylic acid-butyl methacrylate copolymer<br>(acid value of about 95 mgKOH/g) | 0.2 |

Thus a protective layer coating liquid 5 was prepared.

Protective Layer Coating Liquid Preparation Example 6

The procedure for preparation of the protective layer coating liquid 3 was repeated except that the styrene-acrylic resin was replaced with the following monocarboxylic acid derivative.

| | |
|---|---|
| Monocarboxylic acid ester compound having a carboxyl group at the end position<br>(acid value of about 160 mgKOH/g, and solid content of 25%) | 0.12 |

Thus a protective layer coating liquid 6 was prepared.

Protective Layer Coating Liquid Preparation Example 7

The procedure for preparation of the protective layer coating liquid 6 was repeated except that the monocarboxylic acid derivative was replaced with the following wetting dispersant.

| | |
|---|---|
| Wetting dispersant (DISPERBYK-111 from BYK Chemie, copolymer including an acid group, acid value of about 129 mgKOH/g, and solid content of not less than 90%) | 0.03 |

Thus a protective layer coating liquid 7 was prepared.

Protective Layer Coating Liquid Preparation Example 8

The procedure for preparation of the protective layer coating liquid 7 was repeated except that the filler was replaced with the following filler.

| | |
|---|---|
| Titanium oxide (CR-97 from Ishihara Sangyo Kaisha, Ltd., average primary particle diameter of 0.3 μm) | 3 |

Thus a protective layer coating liquid 8 was prepared.

Protective Layer Coating Liquid Preparation Example 9

The procedure for preparation of the protective layer coating liquid 7 was repeated except that the wetting dispersant was replaced with the following wetting dispersant.

| | |
|---|---|
| Wetting dispersant (BYK-P104S from BYK Chemie, solution of copolymer of an unsaturated polycarboxylic acid polymer with a polysiloxane, acid value of about 150 mgKOH/g, and solid content of 50%) | 0.06 |

Thus, a protective layer coating liquid 9 was prepared.

Protective Layer Coating Liquid Preparation Example 10

The procedure for preparation of the protective layer coating liquid 9 was repeated except that the wetting dispersant was replaced with the following wetting dispersant.

| | |
|---|---|
| Wetting dispersant (BYK-P104 from BYK Chemie, solution of unsaturated polycarboxylic acid polymer, acid value of about 180 mgKOH/g, and solid content of 50%) | 0.06 |

Thus a protective layer coating liquid 10 was prepared.

Protective Layer Coating Liquid Preparation Example 11

The procedure for preparation of the protective layer coating liquid 10 was repeated except that the wetting dispersant was replaced with the following wetting dispersant.

| | |
|---|---|
| Wetting dispersant (BYK-P105 from BYK Chemie, solution of unsaturated polycarboxylic acid polymer, acid value of about 365 mgKOH/g, and solid content of about 98%) | 0.03 |

Thus a protective layer coating liquid 11 was prepared.

Protective Layer Coating Liquid Preparation Example 12

The procedure for preparation of the protective layer coating liquid 10 was repeated except that the addition amount of the wetting dispersant BYK-P104 was changed from 0.06 parts to 0.01 parts.

Thus a protective layer coating liquid 12 was prepared.

Protective Layer Coating Liquid Preparation Example 13

The procedure for preparation of the protective layer coating liquid 10 was repeated except that the addition amount of the wetting dispersant BYK-P104 was changed from 0.06 parts to 0.2 parts.

Thus a protective layer coating liquid 13 was prepared.

Protective Layer Coating Liquid Preparation Example 14

The procedure for preparation of the protective layer coating liquid 10 was repeated except that the filler was replaced with the following filler.

| | |
|---|---|
| α-alumina (AKP-50 from Sumitomo Chemical Co., Ltd., average primary particle diameter of about 0.2 μm. | 3 |

Thus a protective layer coating liquid 14 was prepared.

Protective Layer Coating Liquid Preparation Example 15

The procedure for preparation of the protective layer coating liquid 10 was repeated except that the filler was replaced with the following filler.

| | |
|---|---|
| α-alumina (SUMICORUNDUM AA-07 from Sumitomo Chemical Co., Ltd., average primary particle diameter of about 0.9 μm. | 3 |

Thus a protective layer coating liquid 15 was prepared.

Protective Layer Coating Liquid Preparation Example 16

The procedure for preparation of the protective layer coating liquid 10 was repeated except that the filler was replaced with the following filler.

| | |
|---|---|
| δ-alumina (ALUMINUM OXIDE C from Nippon Aerosil Co., average primary particle diameter of about 0.013 μm and pH of from 8 to 9). | 2 |

Thus a protective layer coating liquid 16 was prepared.

Protective Layer Coating Liquid Preparation Example 17

The procedure for preparation of the protective layer coating liquid 10 was repeated except that the filler was replaced with the following filler.

| | |
|---|---|
| Titanium oxide (CR-97 from Ishihara Sangyo Kaisha, Ltd., average primary particle diameter of about 0.3 μm, resistivity of not less than $10^{10}$ Ω · cm, and pH of from 6 to 7) | 3 |

Thus a protective layer coating liquid 17 was prepared.

Protective Layer Coating Liquid Preparation Example 18

The procedure for preparation of the protective layer coating liquid 10 was repeated except that the filler was replaced with the following filler.

| | |
|---|---|
| α-alumina coated with a titanate coupling agent (α-alumina: AA-03 from Sumitomo Chemical Co., Ltd., average primary particle diameter of about 0.3 μm) | 3 |

Thus a protective layer coating liquid 18 was prepared.

Protective Layer Coating Liquid Preparation Example 19

The procedure for preparation of the protective layer coating liquid 10 was repeated except that the filler was replaced with the following filler.

-continued

| | |
|---|---|
| Titanium oxide coated with aluminum stearate (titanium oxide: MT150HD from Tayca Corp., average primary particle diameter of about 0.03 μm) | 3 |

Thus a protective layer coating liquid 19 was prepared.

Protective Layer Coating Liquid Preparation Example 20

The procedure for preparation of the protective layer coating liquid 10 was repeated except that the filler was replaced with the following filler.

| | |
|---|---|
| Titanium oxide coated with a silane coupling agent (titanium oxide: MT100SA from Tayca Corp., average primary particle diameter of about 0.015 μm) | 3 |

Thus a protective layer coating liquid 20 was prepared.

Protective Layer Coating Liquid Preparation Example 21

The procedure for preparation of the protective layer coating liquid 10 was repeated except that the addition amount of the filler was changed from 3 parts to 10 parts.

Thus a protective layer coating liquid 21 was prepared.

Protective Layer Coating Liquid Preparation Example 22

The procedure for preparation of the protective layer coating liquid 10 was repeated except that the CTM was replaced with the following CTM.

| | |
|---|---|
| CTM having the following formula (13) (Ionization potential of 5.5 eV) | 4 |

(13)

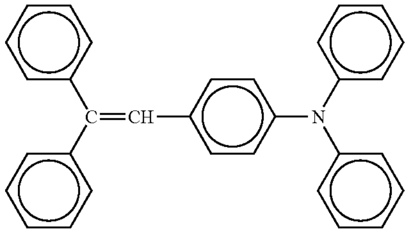

Thus a protective layer coating liquid 22 was prepared.

Protective Layer Coating Liquid Preparation Example 23

The procedure for preparation of the protective layer coating liquid 10 was repeated except that the polycarbonate resin (binder resin) and the CTM were replaced with the following charge transport polymer.

| | |
|---|---|
| Charge transport polymer having the following formula (14) (weight average molecular weight of 150,000, ionization potential of 5.4 eV) | 9 |

(14)

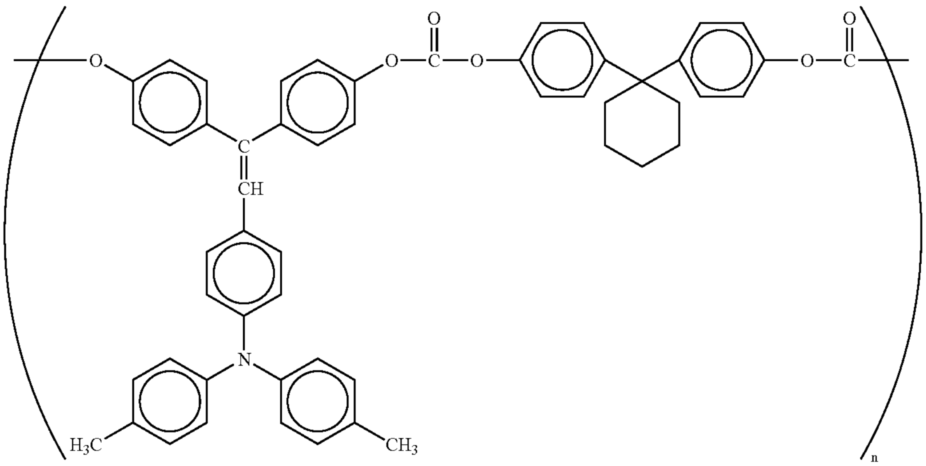

Thus, a protective layer coating liquid 23 was prepared.

Protective Layer Coating Liquid Preparation Example 24

The procedure for preparation of the protective layer coating liquid 10 was repeated except that cyclohexanone was not added (i.e., only tetrahydrofuran was used as a solvent).

Thus, a protective layer coating liquid 24 was prepared.

Protective Layer Coating Liquid Preparation Example 25

The procedure for preparation of the protective layer coating liquid 10 was repeated except that the alumina balls included in the ball mill were changed to zirconia balls.

Thus, a protective layer coating liquid 25 was prepared.

Protective Layer Coating Liquid Preparation Example 26

The procedure for preparation of the protective layer coating liquid 10 was repeated except that the dispersion machine was changed from the ball mill to a shaker.

Thus, a protective layer coating liquid 26 was prepared.

Protective Layer Coating Liquid Comparative Example 1

The procedure for preparation of the protective layer coating liquid 10 was repeated except that the wetting dispersant BYK-P104 was not added.

Thus, a comparative protective layer coating liquid 1 was prepared.

Protective Layer Coating Liquid Comparative Example 2

The procedure for preparation of the comparative protective layer coating liquid 1 was repeated except that the filler was replaced with the following filler.

| | |
|---|---|
| Titanium oxide. (CR-97 from Ishihara Sangyo Kaisha, Ltd., average particle diameter of about 0.3 μm) | 3 |

Thus, a comparative protective layer coating liquid 2 was prepared.

Protective Layer Coating Liquid Comparative Example 3

The procedure for preparation of the comparative protective layer coating liquid 1 was repeated except that the filler was replaced with the following filler.

| | |
|---|---|
| α-alumina treated with a titanate coupling agent (α-alumina: AA-03 from Sumitomo Chemical Co., Ltd., average particle diameter of about 0.3 μm) | 3 |

Thus, a comparative protective layer coating liquid 3 was prepared.

Protective Layer Coating Liquid Comparative Example 4

The procedure for preparation of the comparative protective layer coating liquid 1 was repeated except that the filler was replaced with the following filler.

| | |
|---|---|
| Titanium oxide treated with a silane coupling agent (titanium oxide: MT-100SA from Tayca Corp., average particle diameter of about 0.015 μm) | 2 |

Thus, a comparative protective layer coating liquid 4 was prepared.

Protective Layer Coating Liquid Comparative Example 5

The procedure for preparation of the comparative protective layer coating liquid 1 was repeated except that the addition quantity of the filler was changed from 3 parts to 1 part.

Thus, a comparative protective layer coating liquid 5 was prepared.

Protective Layer Coating Liquid Comparative Example 6

The procedure for preparation of the protective layer coating liquid 2 was repeated except that the polyester resin was replaced with the following polyester resin.

| | |
|---|---|
| Polyester resin (acid value of 7 mgKOH/g) | 0.6 |

Thus, a comparative protective layer coating liquid 6 was prepared.

Protective Layer Coating Liquid Comparative Example 7

The procedure for preparation of the comparative protective layer coating liquid 6 was repeated except that the addition amount of the polyester resin was changed from 0.6 parts to 1.2 parts.

Thus, a comparative protective layer coating liquid 7 was prepared.

Protective Layer Coating Liquid Comparative Example 8

The procedure for preparation of the comparative protective layer coating liquid 6 was repeated except that the filler-was replaced with the following filler.

| | |
|---|---|
| δ-alumina (ALUMINUM OXIDE C from Nippon Aerosil Co., average primary particle diameter of 0.013 μm) | 2 |

Thus, a comparative protective layer coating liquid 8 was prepared.

Protective Layer Coating Liquid Comparative Example 9

The procedure for preparation of the comparative protective layer coating liquid 6 was repeated except that the filler was replaced with the following filler.

| | |
|---|---|
| α-alumina treated with a titanate coupling agent (α-alumina: AA-03 from Sumitomo Chemical Co., Ltd., average primary particle diameter of 0.03 μm) | 3 |

Thus, a comparative protective layer coating liquid 9 was prepared.

Protective Layer Coating Liquid Comparative Example 10

The procedure for preparation of the comparative protective layer coating liquid 6 was repeated except that the polyester resin was replaced with the following wetting dispersant.

| | |
|---|---|
| Wetting dispersant (DISPERBYK-103 from BYK Chemie, solution of copolymer having affinity to the pigment, solid content of about 40%) | 0.06 |

Thus, a comparative protective layer coating liquid 10 was prepared.

Methods of evaluating the protective layer coating liquids are as follows.

Average Particle Diameter of Protective Layer Coating Liquids

The average particle diameter of the solid components in each protective layer coating liquid was measured using an instrument, CAPA500 manufactured by Horiba Ltd.

Precipitation of Filler Used

Each of the protective layer coating liquids was observed whether the filler was precipitated at the bottom of the coating liquid after being settled for one day after the preparation.

The coating liquids were evaluated by being classified to the following four precipitation grades:

◎: the coating liquid had no precipitation.

○: a small amount of the filler was precipitated.

Δ: filler was precipitated and the upper part of the liquid was clear.

×: almost all the filler particles were precipitated and the entire part of the liquid was clear.

The results are shown in Table 1.

TABLE 1

| | Filler | AV*1 (mgKOH/g) | Addition amount*2 (parts) | PD*3 of filler (μm) | PD*4 Of Liquid (μm) | Precipitation |
|---|---|---|---|---|---|---|
| Example | | | | | | |
| 1 | Alumina | 35 | 0.60 | 0.3 | 0.71 | ○ |
| 2 | Alumina | 65 | 0.30 | 0.3 | 0.65 | ○ |
| 3 | Alumina | 200 | 0.20 | 0.3 | 0.61 | ○ |
| 4 | Alumina | 130 | 0.20 | 0.3 | 0.59 | ○ |
| 5 | Alumina | 95 | 0.20 | 0.3 | 0.50 | ◎ |
| 6 | Alumina | 160 | 0.12 | 0.3 | 0.53 | ◎ |
| 7 | Alumina | 129 | 0.03 | 0.3 | 0.47 | ◎ |
| 8 | Titanium oxide | 129 | 0.03 | 0.3 | 0.51 | ◎ |
| 9 | Alumina | 150 | 0.06 | 0.3 | 0.48 | ◎ |
| 10 | Alumina | 180 | 0.06 | 0.3 | 0.42 | ◎ |
| 11 | Alumina | 365 | 0.03 | 0.3 | 0.39 | ◎ |
| 12 | Alumina | 180 | 0.01 | 0.3 | 0.57 | ◎ |
| 13 | Alumina | 180 | 0.20 | 0.3 | 0.40 | ◎ |
| 14 | Alumina | 180 | 0.06 | 0.2 | 0.37 | ◎ |
| 15 | Alumina | 180 | 0.06 | 0.9 | 1.06 | ○ |
| 16 | Alumina | 180 | 0.06 | 0.013 | 0.21 | ◎ |
| 17 | Titanium oxide | 180 | 0.06 | 0.3 | 0.46 | ◎ |
| 18 | Alumina treated with titanate coupling agent | 180 | 0.06 | 0.3 | 0.36 | ◎ |
| 19 | Titanium oxide treated with aluminum stearate | 180 | 0.06 | 0.03 | 0.27 | ◎ |
| 20 | Titanium oxide treated with silane coupling agent | 180 | 0.06 | 0.015 | 0.31 | ○ |
| 21 | Alumina | 180 | 0.06 | 0.3 | 0.62 | ○ |
| 22 | Alumina | 180 | 0.06 | 0.3 | 0.45 | ◎ |
| 23 | Alumina | 180 | 0.06 | 0.3 | 0.52 | ◎ |

TABLE 1-continued

| | Filler | AV*1 (mgKOH/g) | Addition amount*2 (parts) | PD*3 of filler (μm) | PD*4 Of Liquid (μm) | Precipitation |
|---|---|---|---|---|---|---|
| 24 | Alumina | 180 | 0.06 | 0.3 | 0.70 | ○ |
| 25 | Alumina | 180 | 0.06 | 0.3 | 0.51 | ○ |
| 26 | Alumina | 180 | 0.06 | 0.3 | 0.48 | ○ |
| Comparative Example | | | | | | |
| 1 | Alumina | — | 0 | 0.3 | 1.23 | X |
| 2 | Titanium oxide | — | 0 | 0.3 | 1.15 | X |
| 3 | Alumina treated with titanate coupling agent | — | 0 | 0.3 | 0.88 | Δ |
| 4 | Titanium oxide treated with silane coupling agent | — | 0 | 0.015 | 0.51 | X |
| 5 | Alumina | — | 0 | 0.3 | 1.16 | X |
| 6 | Alumina | 7 | 0.60 | 0.3 | 1.08 | X |
| 7 | Alumina | 7 | 1.20 | 0.3 | 0.96 | X |
| 8 | Alumina | 7 | 0.60 | 0.013 | 0.58 | X |
| 9 | Alumina treated with titanate coupling agent | 7 | 0.60 | 0.3 | 0.75 | ○ |
| 10 | Alumina | — | 0.06 | 0.3 | 0.92 | X |

*1Acid value of the organic compound
*2Addition amount of the organic compound
*3Average primary particle diameter of the filler
*4Average particle diameter of the solid components in the coating liquid As can be understood from Table 1, by adding an organic compound having an acid value of from 10 to 700 mgKOH/g, the average particle diameter of the solid components of the coating liquids can be decreased, and thereby precipitation of the filler can be prevented and dispersion of the filler can be improved. In addition, a wetting dispersant is used as the organic compound having an acid value of from 10 to 700 mgKOH/g, dispersion of the filler can be further improved and stability of the dispersion of the filler can also be enhanced.

To the contrary, when such an organic compound is not added or an organic compound having an acid value less than 10 mgKOH/g is added, the average particle diameter of the solid components increases and precipitation of the filler increases (i.e., dispersion of the filler seriously deteriorates due to agglomeration of the filler).

Example 1

Each of the following undercoat layer coating liquid, a CGL coating liquid and a CTL coating liquid was coated on an aluminum cylinder by dip coating and then dried to overlay an undercoat layer having a thickness of 3.5 μm, a CGL having a thickness of 0.2 μm, and CTL having a thickness of 23 μm.

Undercoat Layer Coating Liquid

| | |
|---|---|
| Titanium dioxide | 400 |
| Melamine resin | 65 |
| Alkyd resin | 120 |
| 2-butanone | 400 |

CGL Coating Liquid

Polyvinyl butyral 5

Bisazo pigment having the following formula (15)

(15)

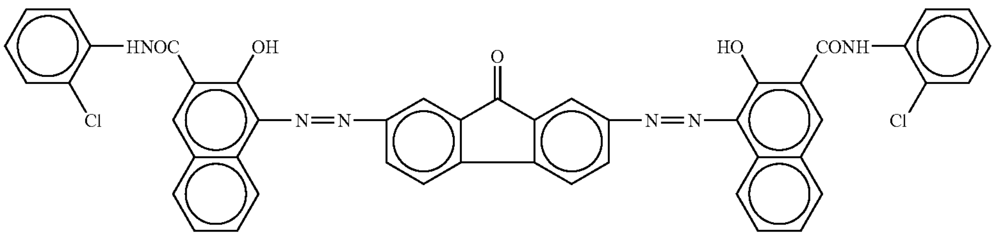

2-butanone 200

Cyclohexanone 400

CTL Coating Liquid

| | |
|---|---|
| Polycarbonate (Z-form polycarbonate from Teijin Chemical Co., Ltd.) | 10 |
| CTM having formula (12) | 10 |
| (ionization potential of 5.4 eV) | 10 |
| Tetrahydrofuran | 100 |

Then the following protective layer coating liquid was coated by spray coating on the CTL and then dried to form a protective layer having a thickness of about 4 μm.

Protective Layer Coating Liquid

| | |
|---|---|
| α-alumina (SUMICORUNDUM AA-03 from Sumitomo Chemical Co., Ltd., average primary particular diameter of 0.3 μm, resistivity of not less than $10^{10}$ Ω · cm, and pH of from 8 to 9) | 3 |
| Polyester resin (acid value of about 35 mgKOH/g) | 0.8 |
| CTM having formula (12) | 4 |
| Polycarbonate resin (Z-form polycarbonate resin from Teijin Chemical Co., Ltd.) | 6 |
| Tetrahydrofuran | 220 |
| Cyclohexanone | 80 |

Thus, a photoreceptor 1 was prepared.

Example 2

The procedure for preparation of the photoreceptor 1 was repeated except-that-the-polyester resin included in the protective layer coating liquid was replaced with the following polyester resin.

| | |
|---|---|
| Polyester resin (acid value of about 50 mgKOH/g) | 0.6 |

Thus, a photoreceptor 2 was prepared.

Example 3

The procedure for preparation of the photoreceptor 1 was repeated except that the polyester resin included in the protective layer coating liquid was replaced with the following acrylic resin.

| | |
|---|---|
| Acrylic resin (DIANAL BR-605 from Mitsubishi Rayon Co., Ltd., acid value of about 65 mgKOH/g) | 0.5 |

Thus, a photoreceptor 3 was prepared.

Example 4

The procedure for preparation of the photoreceptor 1 was repeated except that the polyester resin included in the protective layer coating liquid was replaced with the following acrylic resin.

| | |
|---|---|
| Acrylic acid-hydroxyetyl methacrylate copolymer (acid value of about 100 mgKOH/g) | 0.3 |

Thus, a photoreceptor 4 was prepared.

Example 5

The procedure for preparation of the photoreceptor 1 was repeated except that the polyester resin included in the protective layer coating liquid was replaced with the following compound.

| | |
|---|---|
| Ester compound having a carboxyl group at the end position (acid value of about 160 mgKOH/g, and solid content of about 25%) | 0.12 |

Thus, a photoreceptor 5 was prepared.

Example 6

The procedure for preparation of the photoreceptor 1 was repeated except that the polyester resin included in the protective layer coating liquid was replaced with the following wetting dispersant.

| | |
|---|---|
| Wetting dispersant (BYK-P104 from BYK Chemie, unsaturated polycarboxylic acid polymer solution, acid value of about 180 mgKOH/g, and solid content of about 50%) | 0.03 |

Thus, a photoreceptor 6 was prepared.

Example 7

The procedure for preparation of the photoreceptor 6 was repeated except that the addition amount of the wetting dispersant included in the protective layer coating liquid was changed from 0.03 to 0.06.

Thus, a photoreceptor 7 was prepared.

Example 8

The procedure for preparation of the photoreceptor 6 was repeated except that the addition amount of the wetting dispersant included in the protective layer coating liquid was changed from 0.03 to 0.09.

Thus, a photoreceptor 8 was prepared.

Example 9

The procedure for preparation of the photoreceptor 6 was repeated except that the wetting dispersant included in the protective layer coating liquid was replaced with the following wetting dispersant.

| | |
|---|---|
| Wetting dispersant (BYK-P105 from BYK Chemie, unsaturated polycarboxylic acid polymer, acid value of about 365 mgKOH/g, and solid content of about 98%) | 0.01 |

Thus, a photoreceptor 9 was prepared.

Example 10

The procedure for preparation of the photoreceptor 9 was repeated except that the addition amount of the wetting dispersant included in the protective layer coating liquid was changed from 0.01 to 0.03.

Thus, a photoreceptor 10 was prepared.

Example 11

The procedure for preparation of the photoreceptor 9 was repeated except that the addition amount of the wetting dispersant included in the protective layer coating liquid was changed from 0.01 to 0.2.

Thus, a photoreceptor 11 was prepared.

Example 12

The procedure for preparation of the photoreceptor 7 was repeated except that the filler included in the protective layer coating liquid was replaced with the following filler.

| | |
|---|---|
| Titanium oxide (CR-97 from Ishihara Sangyo Kaisha, Ltd., average primary particle diameter of about 0.3 μm, resistivity of not less than $10^{10}$ Ω · cm, and pH of from 6 to 7) | 3 |

Thus, a photoreceptor 12 was prepared.

Example 13

The procedure for preparation of the photoreceptor 7 was repeated except that the filler included in the protective layer coating liquid was replaced with the following filler.

| | |
|---|---|
| α-alumina (AKP-50 from Sumitomo Chemical Co., Ltd., average primary particle diameter of about 0.2 μm) | 3 |

Thus, a photoreceptor 13 was prepared.

Example 14

The procedure for preparation of the photoreceptor 7 was repeated except that the filler included in the protective layer coating liquid was replaced with the following filler.

| | |
|---|---|
| α-alumina (SUMICORUNDUM AA-07 from Sumitomo Chemical Co., Ltd., average primary particle diameter of about 0.9 μm) | 3 |

Thus, a photoreceptor 14 was prepared.

Example 15

The procedure for preparation of the photoreceptor 7 was repeated except that the filler included in the protective layer coating liquid was replaced with the following filler.

| | |
|---|---|
| α-alumina with a titanate coupling agent (SUMICORUNDUM AA-03 from Sumitomo Chemical Co., Ltd. treated with a titanate coupling agent in an amount of 5% by weight, average primary particle diameter of about 0.3 μm) | 2.5 |

Thus, a photoreceptor 15 was prepared.

Example 16

The procedure for preparation of the photoreceptor 7 was repeated except that the filler included in the protective layer coating liquid was replaced with the following filler.

| | |
|---|---|
| Titanium oxide treated with a silane coupling agent (MT100SA from Tayca Corp. treated with a silane coupling agent in an amount of 20% by weight, average primary particle diameter of about 0.015 μm) | 2 |

Thus, a photoreceptor 16 was prepared.

Example 17

The procedure for preparation of the photoreceptor 7 was repeated except that the filler included in the protective layer coating liquid was replaced with the following filler.

| | |
|---|---|
| Silica (KMPX100 from Shin-Etsu Silicone Co., Ltd., average primary particle diameter of about 0.1 μm, resistivity of not less than $10^{10}$ Ω · cm, and pH of from 4 to 5) | 2 |

Thus, a photoreceptor 17 was prepared.

Example 18

The procedure for preparation of the photoreceptor 7 was repeated except that the filler included in the protective layer coating liquid was replaced with the following filler.

| | |
|---|---|
| Tin oxide (S-1 from Mitsubishi Metal Corp., average primary particle diameter of about 0.15 μm, resistivity of less than $10^{10}$ Ω · cm, and pH of from 4 to 5) | 3 |

Thus, a photoreceptor 18 was prepared.

Example 19

The procedure for preparation of the photoreceptor 7 was repeated except that the addition amount of the filler was changed from 3 to 10 parts.

Thus, a photoreceptor 19 was prepared.

Example 20

The procedure for preparation of the photoreceptor 7 was repeated except that the CTM included in the protective layer was replaced with the following compound.

| | |
|---|---|
| CTM having the following formula (16) (ionization potential of 5.3 eV) | 4 |

(16)

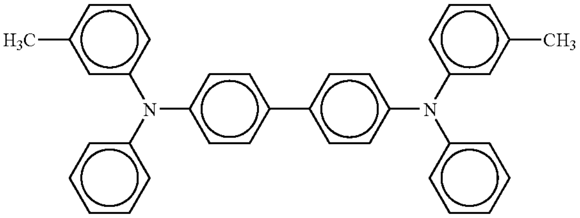

Thus, a photoreceptor 20 was prepared.

Example 21

The procedure for preparation of the photoreceptor 7 was repeated except that the CTM included in the protective layer was replaced with the following compound.

| | |
|---|---|
| CTM having formula (13) (ionization potential of 5.5 eV) | 4 |

Thus, a photoreceptor 21 was prepared.

Example 22

The procedure for preparation of the photoreceptor 8 was repeated except that the CTM having formula (12) was not added to the protective layer coating liquid.

Thus, a photoreceptor 22 was prepared.

Example 23

The procedure for preparation of the photoreceptor 22 was repeated except that the addition quantity of the wetting dispersant included in the protective layer coating liquid was changed from 0.09 to 0.2.

Thus, a photoreceptor 23 was prepared.

Example 24

The procedure for preparation of the photoreceptor 7 was repeated except that the binder resin included in the protective layer coating liquid was replaced with the following resin.

| | |
|---|---|
| Polyarylate resin (U-POLYMER U6000 from Unitika Ltd.) | 10 |

Thus, a photoreceptor 24 was prepared.

Example 25

The procedure for preparation of the photoreceptor 7 was repeated except that the binder resin and the CTM included in the protective layer coating liquid were replaced with the following charge transport polymer.

| | |
|---|---|
| Charge transport polymer having formula (14) (weight average molecular weight of 150,000 and ionization potential of 5.4 eV) | 20 |

Thus, a photoreceptor 25 was prepared.

Example 26

The procedure for preparation of the photoreceptor 8 was repeated except that the following antioxidant was added to the protective layer coating liquid.

| | |
|---|---|
| Antioxidant having formula (11) | 0.24 |

Thus, a photoreceptor 26 was prepared.

Example 27

The procedure for preparation of the photoreceptor 26 was repeated except that the antioxidant was replaced with the following antioxidant.

| | |
|---|---|
| Antioxidant having the following formula (17) | 0.22 |

(17)

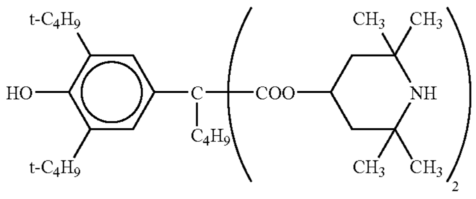

Thus, a photoreceptor 27 was prepared.

Example 28

The procedure for preparation of the photoreceptor 26 was repeated except that the addition amount of the antioxidant included in the protective layer coating liquid was changed from 0.24 to 0.08.

Thus, a photoreceptor 28 was prepared.

Example 29

The procedure for preparation of the photoreceptor 1 was repeated except that the CGL coating liquid, CTL coating liquid and protective layer coating liquid were replaced with the following coating liquids, respectively, and the thickness of the CTL and protective layer was changed to about 20 μm and about 5 μm, respectively.

CGL Coating Liquid

Titanyl phthalocyanine having such an X-ray diffraction

Figure 10:
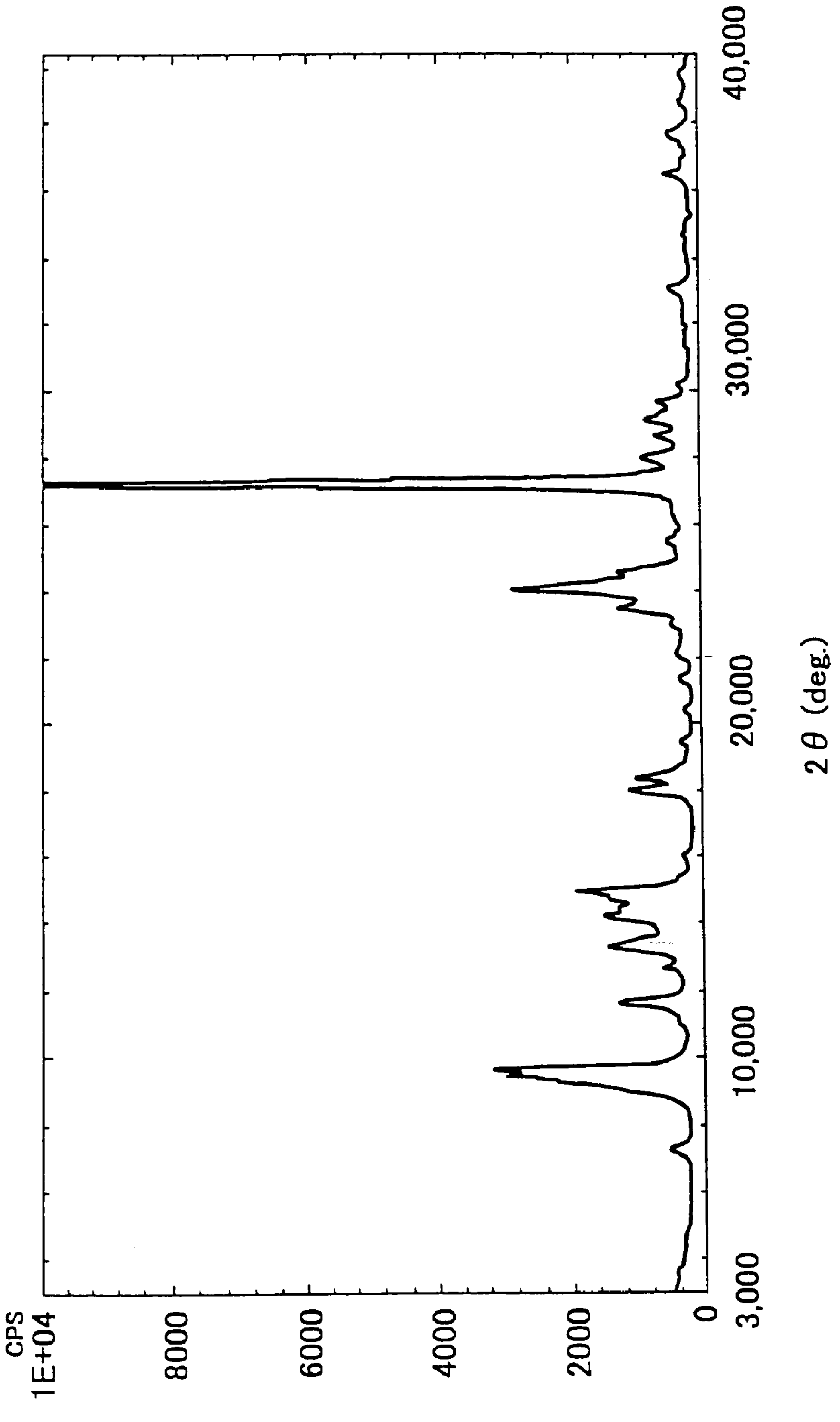
FIG. 10 is an X-ray diffraction spectrum of the titanyl phthalocyanine used in Example 18 of the present application.

| | |
|---|---|
| Titanyl phthalocyanine having such an X-ray diffraction spectrum as shown in FIG. 10 | 8 |
| Polyvinyl butyral | 5 |
| 2-butanone | 400 |

CTL Coating Liquid

| | |
|---|---|
| Polycarbonate (C-form polycarbonate resin from Teijin Chemical Co., Ltd.) | 10 |
| CTM having formula (16) | 8 |
| Toluene | 70 |

Protective Layer Coating Liquid

| | |
|---|---|
| α-alumina (AKP-50 from Sumitomo Chemical Co., Ltd., average particle diameter of about 0.2 μm) | 3 |
| Wetting dispersant (BYK-P104 from BYK Chemie, unsaturated polycarboxylic acid polymer solution, acid value of about 180 mgKOH/g, and solid content of about 50%) | 0.06 |
| Polycarbonate resin (C-form polycarbonate resin from Teijin Chemical Co., Ltd.) | 6 |
| CTM having formula (16) | 4 |
| Tetrahydrofuran | 250 |
| Cyclohexanone | 50 |
| Thus, a photoreceptor 29 was prepared. | |

Example 30

The procedure for preparation of the photoreceptor 29 was repeated except that the wetting dispersant included in the protective layer coating liquid was replaced with the following compound.

| | |
|---|---|
| Ester compound having a carboxyl group at the end position (acid value of about 160 mgKOH/g, and solid content of about 25%) | 0.12 |

Thus, a photoreceptor 30 was prepared.

Example 31

The procedure for preparation of the photoreceptor 29 was repeated except that the addition amount of the wetting dispersant was changed from 0.06 to 0.1 parts.

Thus, a photoreceptor 31 was prepared.

Example 32

The procedure for preparation of the photoreceptor 29 was repeated except that the filler included in the protective layer coating liquid was changed to the following filler.

| | |
|---|---|
| α-alumina (SUMICORUNDUM AA-03 from Sumitomo Chemical Co., Ltd., average particle diameter of about 0.3 μm, resistivity of not less than $10^{10}$ Ω · cm, and pH of from 8 to 9) | 1 |

Thus, a photoreceptor 32 was prepared.

Example 33

The procedure for preparation of the photoreceptor 29 was repeated except that the filler included in the protective layer coating liquid was replaced with the following filler.

| | |
|---|---|
| Titanium oxide (CR-97 from Ishihara Sangyo Kaisha, Ltd., average particle diameter of about 0.3 μm, resistivity of not less than $10^{10}$ Ω · cm, and pH of from 6 to 7) | 3 |

Thus, a photoreceptor 33 was prepared.

Example 34

The procedure for preparation of the photoreceptor 29 was repeated except that the filler included in the protective layer coating liquid was replaced with the following filler.

| | |
|---|---|
| Spherical silicone resin particles (TOSPEARL 105 from Toshiba Silicone Co., Ltd., average particle diameter of about 0.5 μm) | 3 |

Thus, a photoreceptor 34 was prepared.

Example 35

The procedure for preparation of the photoreceptor 29 was repeated except that the binder resin and CTM included in the protective layer coating liquid were replaced with the following charge transport polymer.

| | |
|---|---|
| Charge transport polymer having formula (14) | 20 |

-continued

| | |
|---|---|
| (Weight average molecular weight of 150,000, and ionization potential of 5.4 eV) | |

Thus, a photoreceptor 35 was prepared.

Example 36

The procedure for preparation of the photoreceptor 29 was repeated except that the following antioxidant was further added to the protective layer coating liquid.

| | |
|---|---|
| Antioxidant having formula (11) | 0.24 |

Thus, a photoreceptor 36 was prepared.

Example 37

The procedure for preparation of the undercoat layer and CGL of the photoreceptor 29 was repeated. The following CTL coating liquid was coated on the CGL and dried to form a CTL having a thickness of about 25 μm, which is the outermost layer.

CTL Coating Liquid

| | |
|---|---|
| Polycarbonate (Z-form polycarbonate from Teijin Chemical Co., Ltd.) | 10 |
| CTM having formula (12) | 8 |
| α-alumina (SUMICORUNDUM AA-03 from Sumitomo Chemical Co., Ltd., average primary particle diameter of 0.3 μm) | 1.5 |
| Wetting dispersant (BYK-P104 from BYK Chemie, unsaturated polycarboxylic acid polymer solution, acid value of 180 mgKOH/g, and solid content of about 50%) | 0.04 |
| Tetrahydrofuran | 80 |
| Cyclohexanone | 15 |

Thus, a photoreceptor 37 having no protective layer was formed.

Comparative Example 1

The procedure for preparation of the photoreceptor 1 was repeated except that the polyester resin in the protective layer coating liquid was replaced with the following resin.

| | |
|---|---|
| Polyester resin (acid value of 7 mgKOH/g) | 0.6 |

Thus a comparative photoreceptor 1 was prepared.

Comparative Example 2

The procedure for preparation of the comparative photoreceptor 1 was repeated except that the addition amount of the polyester resin in the protective layer coating liquid was changed from 0.6 to 1.2 parts.

Thus a comparative photoreceptor 2 was prepared.

Comparative Example 3

The procedure for preparation of the comparative photoreceptor 1 was repeated except that the filler in the protective layer coating liquid was replaced with the following filler.

| | |
|---|---|
| δ-alumina (ALUMINUM OXIDE C from Nippon Aerosil Co., average primary particle diameter of about 0.013 μm) | 2 |

Thus a comparative photoreceptor 3 was prepared.

Comparative Example 4

The procedure for preparation of the comparative photoreceptor 1 was repeated except that the filler in the protective layer coating liquid was replaced with the following filler.

| | |
|---|---|
| α-alumina treated with a titanate coupling agent (α-alumina: AA-03 from Sumitomo Chemical Co., Ltd., average primary particle diameter of about 0.3 μm) | 3 |

Thus a comparative photoreceptor 4 was prepared.

Comparative Example 5

The procedure for preparation of the photoreceptor 7 was repeated except that the wetting dispersant in the protective layer coating liquid was removed therefrom.

Thus a comparative photoreceptor 5 was prepared.

Comparative Example 6

The procedure for preparation of the comparative photoreceptor 5 was repeated except that the filler in the protective layer coating liquid was replaced with the following filler.

| | |
|---|---|
| Titanium oxide (CR-97 from Ishihara Sangyo Kaisha, Ltd., average primary particle diameter of about 0.3 μm) | 3 |

Thus a comparative photoreceptor 6 was prepared.

Comparative Example 7

The procedure for preparation of the comparative photoreceptor 5 was repeated except that the filler in the protective layer coating liquid was replaced with the following filler.

| | |
|---|---|
| α-alumina treated with a titanate coupling agent | 3 |

-continued

| | |
|---|---|
| (α-alumina: AA-03 from Sumitomo Chemical Co., Ltd., average primary particle diameter of about 0.3 μm) | |

Thus a comparative photoreceptor 7 was prepared.

Comparative Example 8

The procedure for preparation of the comparative photoreceptor 5 was repeated except that the filler in the protective layer coating liquid was replaced with the following filler.

| | |
|---|---|
| Titanium oxide treated with a silane coupling agent (titanium oxide: MT-100SA from Tayca Corp., average primary particle diameter of about 0.015 μm) | 2 |

Thus a comparative photoreceptor 8 was prepared.

Comparative Example 9

The procedure for preparation of the comparative photoreceptor 5 was repeated except that the addition amount of the filler was changed from 3 to 1 part.

Thus a comparative photoreceptor 9 was prepared.

Comparative Example 10

The procedure for preparation of the comparative photoreceptor 5 was repeated except that the CTM in the protective layer coating liquid was not included.

Thus a comparative photoreceptor 10 was prepared.

Comparative Example 11

The procedure for preparation of the photoreceptor 7 was repeated except that the wetting dispersant in the protective layer coating liquid was replaced with the following wetting dispersant.

| | |
|---|---|
| Wetting dispersant (DISPERBYK-103 from BYK Chemie, solution of a copolymer having an affinity to the filler used, acid value of 0 mgKOH/g, and solid content of about 40%) | 0.06 |

Thus a comparative photoreceptor 11 was prepared.

Comparative Example 12

The procedure for preparation of the comparative photoreceptor 11 was repeated except that the addition amount of the wetting dispersant in the protective layer coating liquid was changed from 0.06 to 0.12.

Thus a comparative photoreceptor 12 was prepared.

Comparative Example 13

The procedure for preparation of the photoreceptor 37 was repeated except that the wetting dispersant in the protective layer coating liquid was removed therefrom.

Thus a comparative photoreceptor 13 was prepared.

Comparative Example 14

The procedure for preparation of the photoreceptor 37 was repeated except that the wetting dispersant in the protective layer coating liquid was replaced with the following resin.

| | |
|---|---|
| Polyester resin (acid value of 7 mgKOH/g) | 0.6 |

Thus a comparative photoreceptor 14 was prepared.

Comparative Example 15

The procedure for preparation of the photoreceptor 37 was repeated except that the filler in the protective layer coating liquid was removed therefrom.

Thus a comparative photoreceptor 15 was prepared.

Evaluation Method

Each of the photoreceptors 1 to 37 and comparative photoreceptors 1 to 15 was set in a process cartridge, and the cartridge was set in an image forming apparatus, IMAGIO MF2200 manufactured by Ricoh Co., Ltd., which had been modified such that a charging roller was used as the charger and a laser diode emitting light having a wavelength of 655 nm was used as a light source for the imagewise light irradiator. A running test in which 10,000 images were continuously produced was performed while the pre-cleaning light irradiation process was not performed.

At the beginning and end of the running test, the lighted-area potential (VL) of each photoreceptor was measured at the developing section, and the qualities of the images produced by each photoreceptor were visually evaluated. In addition, the abrasion quantity of each photoreceptor was also determined by measuring the thickness of the layers of the photoreceptor before and after the running test.

With respect to the photoreceptor, which could produce good images even after the 10,000-copy running test, the running test was continued to produce 50,000 copies in total.

The results are shown in Table 2.

TABLE 2

| | Initial image | | $10,000^{th}$ image | | | $50,000^{th}$ image |
|---|---|---|---|---|---|---|
| | $P_L$(−V) | Image quality | $P_L$(−V) | Image quality | AB (μm) | Image quality |
| Example | | | | | | |
| 1 | 85 | ◎ | 105 | ◎ | 0.51 | ◎ |
| 2 | 80 | ◎ | 100 | ◎ | 0.48 | ◎ |
| 3 | 90 | ◎ | 115 | ◎ | 0.46 | ◎ |
| 4 | 65 | ◎ | 85 | ◎ | 0.43 | ◎ |
| 5 | 70 | ◎ | 95 | ◎ | 0.44 | ◎ |
| 6 | 85 | ◎ | 110 | ◎ | 0.56 | ◎ |
| 7 | 70 | ◎ | 90 | ◎ | 0.41 | ◎ |
| 8 | 55 | ◎ | 75 | ◎ | 0.42 | ◎ |
| 9 | 90 | ◎ | 115 | ◎ | 0.51 | ◎ |

TABLE 2-continued

| | Initial image | | 10,000th image | | | 50,000th image |
|---|---|---|---|---|---|---|
| | $P_L$(−V) | Image quality | $P_L$(−V) | Image quality | AB (μm) | Image quality |
| 10 | 65 | ⊚ | 80 | ⊚ | 0.38 | ⊚ |
| 11 | 50 | ⊚ | 70 | ⊚ | 0.52 | ⊚ |
| 12 | 65 | ⊚ | 85 | ⊚ | 0.63 | ⊚ |
| 13 | 70 | ⊚ | 90 | ⊚ | 0.43 | ⊚ |
| 14 | 70 | ⊚ | 95 | ⊚ | 0.59 | ⊚ |
| 15 | 80 | ⊚ | 100 | ⊚ | 0.41 | ⊚ |
| 16 | 65 | ⊚ | 85 | ○ | 0.52 | Not produced |
| 17 | 60 | ⊚ | 80 | ○ | 0.57 | Not produced |
| 18 | 60 | ○ | 80 | Δ | 0.55 | Not produced |
| 19 | 90 | ⊚ | 130 | ○ (ID) | 0.78 | Not produced |
| 20 | 65 | ⊚ | 85 | ⊚ | 0.43 | ⊚ |
| 21 | 80 | ⊚ | 100 | ⊚ | 0.41 | ⊚ |
| 22 | 90 | ⊚ | 115 | ⊚ | 0.33 | ⊚ |
| 23 | 60 | ⊚ | 80 | ⊚ | 0.34 | ⊚ |
| 24 | 60 | ⊚ | 80 | ⊚ | 0.38 | ⊚ |
| 25 | 70 | ⊚ | 95 | ⊚ | 0.45 | ⊚ |
| 26 | 75 | ⊚ | 95 | ⊚ | 0.42 | ⊚ |
| 27 | 80 | ⊚ | 100 | ⊚ | 0.45 | ⊚ |
| 28 | 65 | ⊚ | 85 | ⊚ | 0.45 | ⊚ |
| 29 | 65 | ⊚ | 85 | ⊚ | 0.47 | ⊚ |
| 30 | 70 | ⊚ | 90 | ⊚ | 0.50 | ⊚ |
| 31 | 60 | ⊚ | 80 | ⊚ | 0.44 | ⊚ |
| 32 | 60 | ⊚ | 80 | ⊚ | 0.61 | ⊚ |
| 33 | 70 | ⊚ | 90 | ⊚ | 0.65 | ⊚ |
| 34 | 75 | ⊚ | 100 | ⊚ | 0.84 | ○ |
| 35 | 65 | ⊚ | 95 | ⊚ | 0.43 | ⊚ |
| 36 | 70 | ⊚ | 90 | ⊚ | 0.44 | ⊚ |
| 37 | 75 | ⊚ | 100 | ⊚ | 0.54 | ⊚ |
| Comparative Example | | | | | | |
| 1 | 205 | X | 190 | X | 1.02 | Not produced |
| 2 | 190 | X | 185 | X | 0.98 | Not produced |
| 3 | 215 | X | 205 | X | 0.93 | Not produced |
| 4 | 220 | X | 215 | X | 0.84 | Not produced |
| 5 | 270 | X | 260 | X | 0.97 | Not produced |
| 6 | 210 | X | 200 | X | 0.98 | Not produced |
| 7 | 275 | X | 260 | X | 0.88 | Not produced |
| 8 | 195 | X | 190 | X | 0.84 | Not produced |
| 9 | 160 | X | 210 | X | 1.01 | Not produced |
| 10 | 360 | X | — | Not produced | — | Not produced |
| 11 | 210 | X | 200 | X | 0.91 | Not produced |
| 12 | 240 | X | 210 | X | 0.93 | Not produced |
| 13 | 200 | X | 190 | X | 0.88 | Not produced |
| 14 | 195 | X | 180 | X | 0.85 | Not produced |
| 15 | 50 | ⊚ | 70 | ⊚ | 1.61 | X(BF) |

$P_L$: Potential of a lighted area of a photoreceptor which is exposed to imagewise light.
AB: Abrasion quantity of the outermost layer
⊚: The image qualities are good and hardly deteriorate
○: Resolution slightly deteriorates but the image qualities are still acceptable
○ (ID) : Image density slightly decreases but the image qualities are still acceptable
Δ: Resolution apparently deteriorates
X: Image density seriously deteriorates
X(BF): The image has serious background fouling As can be understood from Table 2, the photoreceptors of the present invention, which have an outermost layer including a filler and an organic compound having an acid value of from 10 to 700 mgKOH/g, has a low potential after being exposed to imagewise light. In addition, even after the 10,000-copy running test, the lighted-area potential thereof hardly increases, and thereby the photoreceptors can produce high quality images. Further, the abrasion quantity of the outermost layer of the photoreceptors is small, namely, the photoreceptors have good abrasion resistance.

However, when an acidic filler or a filler treated with an acidic treating agent is used, resolution of the resultant images deteriorates. It is found that it is preferable to use a filler having a pH not less than 5 in the outermost layer. In addition, when an electroconductive filler is used, the resultant initial images are blurred. Further, it is found that when a filler is included in the outermost layer in a very large amount, resolution of the resultant images deteriorates.

When a CTM is not included in the protective layer (i.e., outermost layer), the residual potential of the resultant photoreceptor increases. However, even when the outermost layer has no CTM, increase of residual potential can be avoided if the addition amount of the organic compound having an acid value of from 10 to 700 mgKOH/g is increased.

To the contrary, when such an organic compound is not included or an organic compound having an acid value less than 10 mgKOH/g is used, the lighted-area potential is very high even at the beginning of the running test, resulting in occurrence of a problem in which the image density seriously decreases. In addition, the abrasion quantity of the outermost layer of the comparative photoreceptors is very large, namely the comparative photoreceptors have poor abrasion resistance.

It is also found that a photoreceptor of the present invention capable of producing good images even after 10,000-copy running test can produce good images even after 50,000-copy running test. Namely, the photoreceptor of the present invention capable of producing good images after 10,000-copy running test has good durability. However, if a photoreceptor including no filler in the outermost layer can produce good images at the begging and end of the 10,000-copy running test, the photoreceptor cannot produce good images after 50,000-copy running test because of having poor abrasion resistance.

Examples 38 to 68

The photoreceptors which could produce good images after the 50,000-copy running test were then subjected to NOx gasses exposure test in which the photoreceptors were settled for 24 hours in an atmosphere including NOx gasses in an amount of about 20 ppm. Then images were produced by setting each of the photoreceptors in the modified IMAGIO MF2200 mentioned above.

The results are shown in Table 3.

TABLE 3

| Example | Photo-receptor No. | Image quality: 50,000th image | | Image quality: After NOx exposure test | |
|---|---|---|---|---|---|
| 38 | 1 | ◎ | Good | ○ | Resolution slightly deteriorates |
| 39 | 2 | ◎ | Good | ○ | Resolution slightly deteriorates |
| 40 | 3 | ◎ | Good | ○ | Resolution slightly deteriorates |
| 41 | 4 | ◎ | Good | ◎ | Good |
| 42 | 5 | ◎ | Good | Δ | Resolution deteriorates |
| 43 | 6 | ◎ | Good | ○ | Resolution slightly deteriorates |
| 44 | 7 | ◎ | Good | Δ | Resolution deteriorates |
| 45 | 8 | ◎ | Good | Δ | " |
| 46 | 9 | ◎ | Good | ○ | Resolution slightly deteriorates |
| 47 | 10 | ◎ | Good | Δ | Resolution deteriorates |
| 48 | 11 | ◎ | Good | X | Blurred image problem occurred |
| 49 | 12 | ◎ | Good | Δ | Resolution deteriorates |
| 50 | 13 | ◎ | Good | Δ | " |
| 51 | 14 | ◎ | Good | ○ | Resolution slightly deteriorates |
| 52 | 15 | ◎ | Good | ○ | Resolution slightly deteriorates |
| 53 | 20 | ◎ | Good | Δ | Resolution deteriorates |
| 54 | 21 | ◎ | Good | Δ | " |
| 55 | 22 | ◎ | Good | ◎ | Good |
| 56 | 23 | ◎ | Good | Δ | Resolution deteriorates |
| 57 | 24 | ◎ | Good | ○ | Resolution slightly deteriorates |
| 58 | 25 | ◎ | Good | ○ | Resolution slightly deteriorates |
| 59 | 26 | ◎ | Good | ◎ | Good |
| 60 | 27 | ◎ | Good | ○ | Resolution slightly deteriorates |
| 61 | 28 | ◎ | Good | ○ | Resolution slightly deteriorates |
| 62 | 29 | ◎ | Good | ○ | Resolution slightly deteriorates |
| 63 | 30 | ◎ | Good | ○ | Resolution slightly deteriorates |
| 64 | 31 | ◎ | Good | Δ | Resolution deteriorates |
| 65 | 32 | ◎ | Good | ◎ | Good |
| 66 | 33 | ◎ | Good | ○ | Resolution slightly deteriorates |
| 67 | 34 | ◎ | Good | ○ | Resolution slightly deteriorates |
| 68 | 35 | ◎ | Good | ◎ | Good |
| 69 | 36 | ◎ | Good | Δ | Resolution deteriorates |

◎: Image qualities are good and hardly deteriorate.
○: Image qualities slightly deteriorate but are still acceptable.
Δ: Image qualities apparently deteriorate.
X: Image densities seriously deteriorate.

As can be understood from Table 3, the resolution of the images produced by the photoreceptors tends to deteriorate in general. However, when an antioxidant having both a hindered phenol structure and a hindered amine structure is included, the deterioration of resolution can be prevented. It is observed that the deterioration of resolution can also be prevented by using a proper organic compound having an acid value of from 10 to 700 mgKOH/g and/or a proper binder resin. In addition, it is also found that when a CTM is not included in the outermost layer, the deterioration can also be lightened.

Example 70

The photoreceptor 26 was set in a process cartridge, and the cartridge was set in an image forming apparatus, IMAGIO MF2200 from Ricoh Co., Ltd., which had been modified such that a charging roller was used as the charger and a laser diode emitting light having a wavelength of 655 nm was used as the light source for the imagewise light irradiator. A running test in which 100,000 images were continuously produced while the pre-cleaning light irradiation process was not performed.

At the beginning and end of the running test, the lighted-area potential ($V_L$) of each photoreceptor was measured at the developing section, and the qualities of the images produced by each photoreceptor were visually evaluated. In addition, the abrasion quantity of each photoreceptor was also determined by measuring the thickness of the layers of the photoreceptor before and after the running test.

Example 71

The procedure for image formation in Example 70 was repeated except that a polytetrafluoroethylene tape having a thickness of 50 μm was wound around both the edge portions of the charging roller to perform proximity charging.

Example 72

The procedure for image formation in Example 71 was repeated except that a DC voltage of −750 V overlapped with an AC voltage having a peak-to-peak voltage of 1.8 kV and a frequency of 2 kHz was applied to the charging roller.

Example 72

The procedure for image formation in Example 72 was repeated except that the developer included zinc stearate in an amount of 0.1 parts by weight per 100 parts by weight of the toner.

The results are shown in Table 4.

TABLE 4

| | PR NO. * | Initial image: $P_L$ (−V) | Initial image: Image quality | | At the end of running test: $P_L$ (−V) | At the end of running test: Image quality | | AB*2 (μm) |
|---|---|---|---|---|---|---|---|---|
| Ex. 70 | 26 | 70 | ◎ | Good | 110 | Δ | Background fouling, black streak image | 3.87 |
| Ex. 71 | 26 | 70 | ◎ | Good | 110 | ○ | Slightly uneven image density | 3.71 |
| Ex. 72 | 26 | 70 | ◎ | Good | 120 | ◎ | Good | 4.13 |
| Ex. 73 | 26 | 70 | ◎ | Good | 120 | ◎ | Good | 2.04 |

PR No. *: Photoreceptor Number
AB*2: Abrasion quantity of outermost layer

As can be understood from Table 4, background fouling and black streak images tend to be produced when the charging roller contacts the surface of the photoreceptor. By performing proximity charging, such problems can be avoided but slightly uneven density images are produced. The uneven density images can be prevented when a DC voltage overlapped with an AC voltage is applied to the charger. When such a DC voltage overlapped with an AC voltage is applied, the abrasion amount of the photoreceptor increases. The abrasion problem can be prevented by including zinc stearate in the developer (toner).

Example 74

Four pieces of the photoreceptor 26 were set in a tandem type full color laser printer manufactured by Ricoh Co., Ltd. which uses a charging roller as a charger and a laser diode emitting light having a wavelength of 655 nm as an imagewise light source to perform a 100,000-copy running test. A polytetrafluoroethylene tape having a thickness of 50 μm was wound around both the edge portions of the charger to perform proximity charging; a DC voltage of −750 V overlapped with an AC voltage having a peak-to-peak voltage of 1.8 kV and a frequency of 2 kHz was applied to the charger; and zinc stearate was included in the developer in an amount of 0.1 parts by weight per 100 parts by weight of the toner.

The images at the beginning and end of the running test were evaluated.

Comparative Example 16

The procedure for image formation in Example 74 was repeated except that the photoreceptor 26 was replaced with the comparative photoreceptor 16.

Example 75

The following undercoat layer coating liquid, CGL coating liquid, and CTL coating liquid were coated by dip coating on a nickel seamless belt and dried one by one to form an undercoat layer having a thickness of 3.5 μm, a CGL having a thickness of 0.2 μm and a CTL having a thickness of 22 μm.

Undercoat Layer Coating Liquid

| | |
|---|---|
| Titanium dioxide | 400 |
| Melamine resin | 65 |
| Alkyd resin | 120 |
| 2-butanone | 400 |

CGL Coating Liquid

| | |
|---|---|
| Polyvinyl butyral | 2 |
| Trisazo pigment having the following formula (18) | 6 |
| (18) 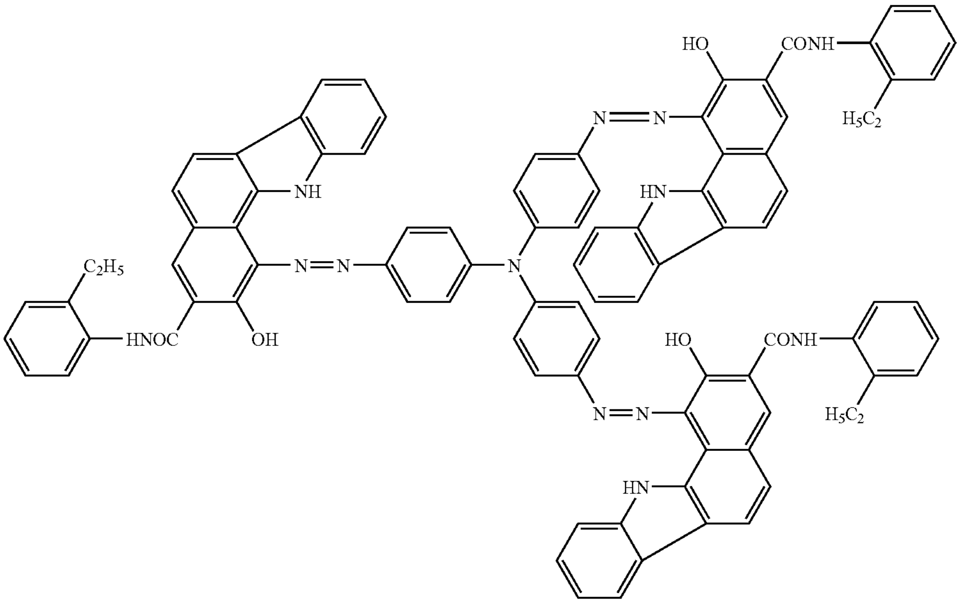 | |
| 2-butanone | 120 |
| Cyclohexanone | 240 |

CTL Layer Coating Liquid

| | |
|---|---|
| Polycarbonate resin (A-form polycarbonate resin from Teijin Chemical Co., Ltd.) | 10 |
| CTM having formula (13) (ionization potential of 5.4 eV) | 7 |
| Tetrahydrofuran | 100 |

Then the following protective layer coating liquid was coated on the CTL by spray coating and dried to form a protective layer having a thickness of about 5 μm.

Protective Layer Coating Liquid

| | |
|---|---|
| α-alumina (SUMICORUNDUM AA-03 from Sumitomo Chemical Co., Ltd., average primary particle diameter of 0.3 μm) | 2 |
| Wetting dispersant (BYK-P104 from BYK Chemie, unsaturated polycarboxylic acid polymer solution, acid value of about 180 mgKOH/g, solid content of about 50%) | 0.06 |
| CTM having formula (13) | 4 |
| Polycarbonate resin (A-form polycarbonate resin from Teijin Chemical Co., Ltd.) | 6 |
| Tetrahydrofuran | 220 |
| Cyclohexanone | 80 |

Thus a photoreceptor 38 was prepared.

Comparative Example 17

The procedure for preparation of the photoreceptor 38 was repeated except that the thickness of the CTL was changed to 27 μm and the protective layer was not formed.

Thus a comparative photoreceptor 16 was prepared.

Each of the photoreceptor 38 and comparative photoreceptor 16 was set in a full color copier, modified IPSIO COLOR 5000, using a laser diode emitting light having a wavelength of 780 nm and an intermediate transfer medium to perform a 25,000-copy running test. The images at the beginning and end of the running test were evaluated.

The results are shown in Table 5.

TABLE 5

| | Photoreceptor No. | Image qualities | | | |
|---|---|---|---|---|---|
| | | Initial image | | $25,000^{th}$ image | |
| Ex. 74 | Photoreceptor 26 | ⊚ | Good | ⊚ | Good |
| Comp. Ex. 16 | Comp. Photoreceptor 15 | ⊚ | Good | X | Background fouling occurred. Color reproduction deteriorated. |
| Ex. 75 | Photoreceptor 38 | ⊚ | Good | ⊚ | Good |
| Comp. Ex. 17 | Comp. Photoreceptor 16 | ⊚ | Good | X | Background fouling occurred. Resolution deteriorated. |

As can be understood from Table 5, the photoreceptor of the present invention can produce images in which the color tones of the images are well reproduced. However, the comparative photoreceptor including no filler in the outermost layer produced images having background fouling. In addition, the comparative photoreceptor 15 produces color images having poor color reproducibility, which is caused by deterioration of the photosensitivity thereof, after long repeated use.

In addition, when the photoreceptor of the present invention is used for a full color printer using an intermediate transfer medium, good full color images can be produced after long repeated use. When a comparative photoreceptor including no filler in the outermost layer was used, background fouling was produced and resolution deteriorated.

EFFECTS OF THE PRESENT INVENTION

As mentioned above, the residual potential increase problem of a photoreceptor, which includes a filler in the outermost layer to enhance its durability, can be prevented by including an organic compound having an acid value of from 10 to 700 mgKOH/g. Such organic compounds, particularly wetting dispersants having such a specific acid value, not only prevent increase of residual potential but improve dispersion of the filler used together therewith (i.e., prevent precipitation of the filler). Thereby the light scattering and uneven abrasion can be prevented and abrasion resistance can be improved. Therefore a photoreceptor having a high durability and capable of producing high quality images can be provided.

I addition, since occurrence of coating defects can also be prevented and the coating liquid has long life, the photoreceptor having a high durability and capable of producing high quality images can be stably manufactured.

Further, basic fillers, which have not been used because of causing the high residual potential problem, can also be used in the present invention, the blurred image problem can be prevented. Therefore, an image forming method and apparatus by which high quality images can be stably produced without using a drum heater even when repeatedly used for a long period of time and which has an advantages such that it is hardly necessary to frequently replace the photoreceptor can be provided.

This document claims priority and contains subject matter related to Japanese Patent Applications Nos. 2000-340884, 2000-342902 and 2001-255906, filed on Nov. 8, 2000, Nov. 10, 2000 and Aug. 27, 2001, respectively, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by letters patent of the United State is:

1. A coating liquid for an outermost layer of an electrophotographic photoreceptor, comprising:

a filler;

an organic compound having an acid value of from 10 to 700 mgKOH/g, the organic compound being a saturated or unsaturated fatty acid;

a binder resin; and plural organic solvents.

2. The coating liquid according to claim 1, prepared by mixing the filler, the organic compound, the binder resin and plural organic solvents using a ball mill containing alumina balls.

3. The coating liquid according to claim 1, wherein the organic compound is selected from the group consisting of lauric acid, stearic acid, arachidic acid, behenic acid, adipic acid, oleic acid, maleic acid and salicylic acid.

4. The coating liquid according to claim 1, wherein the filler is an inorganic filler.

5. The coating liquid according to claim 4, wherein the inorganic filler is a metal oxide.

6. The coating liquid according to claim 1, wherein the filler is a hydrophilic metal oxide.

7. The coating liquid according to claim 1, wherein the filler is a basic filler.

8. The coating liquid according to claim 1, wherein the filler is alumina, zirconia, titanium oxide or silica.

9. The coating liquid according to claim 1, wherein the filler is a powder of a metal, tin oxide doped with antimony, indium oxide doped with tin, a metal fluoride, potassium titanate or boron nitride.

10. The coating liquid according to claim 1, wherein the filler has a resistivity not less than $10^{10}$ Ω·cm.

11. The coating liquid according to claim 1, wherein the filler has a surface that is treated with a surface treating agent.

* * * * *